(12) United States Patent
Morita et al.

(10) Patent No.: US 12,319,141 B2
(45) Date of Patent: Jun. 3, 2025

(54) STEERING WHEEL AND VEHICLE CONTROL DEVICE

(71) Applicant: TOYODA GOSEI CO., LTD., Kiyosu (JP)

(72) Inventors: Bunpei Morita, Kiyosu (JP); Kenji Fujimura, Kiyosu (JP); Yuki Miyasaka, Kiyosu (JP); Akitoshi Naganawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/607,779

(22) Filed: Mar. 18, 2024

(65) Prior Publication Data

US 2024/0336132 A1    Oct. 10, 2024

(30) Foreign Application Priority Data

Apr. 5, 2023  (JP) ................. 2023-061729
Apr. 5, 2023  (JP) ................. 2023-061730
Apr. 7, 2023  (JP) ................. 2023-062801

(51) Int. Cl.
*B60K 28/02*   (2006.01)
*B60K 28/06*   (2006.01)
(Continued)

(52) U.S. Cl.
CPC ............. *B60K 28/02* (2013.01); *B60K 28/06* (2013.01); *B60W 50/12* (2013.01); *B62D 1/04* (2013.01); *B62D 1/183* (2013.01)

(58) Field of Classification Search
CPC ........ B60K 28/02; B60K 28/04; B60K 28/06; B60K 2026/028; B60K 2026/029;
(Continued)

(56) References Cited

U.S. PATENT DOCUMENTS 7,806,224 B2 *  10/2010  Maeda .................. B62D 1/181
                                                                74/495
9,393,867 B2 *   7/2016  Downey ................. G05G 1/04
(Continued)

FOREIGN PATENT DOCUMENTS

JP    2008-014204 A    1/2008
JP    2021-020581 A    2/2021
JP    2021-046192 A    3/2021

*Primary Examiner* — Laura Freedman
(74) *Attorney, Agent, or Firm* — Posz Law Group, PLC

(57) ABSTRACT

A steering wheel includes a control unit that executes an acceleration control or a deceleration control of a vehicle based on results of detections by a first contact detecting portion, a second contact detecting portion, a first operation detecting portion, and a second operation detecting portion. The control unit does not execute the acceleration control or the deceleration control based on an operation of a first operating portion when the first operating portion is operated in a state in which the first contact detecting portion is not detecting contact by a driver with a first gripping portion, and does not execute the acceleration control or the deceleration control based on an operation of a second operating portion when the second operating portion is operated in a state in which the second contact detecting portion is not detecting contact by the driver with a second gripping portion.

6 Claims, 34 Drawing Sheets

(51) Int. Cl.
*B60W 50/12* (2012.01)
*B62D 1/04* (2006.01)
*B62D 1/183* (2006.01)

(58) Field of Classification Search
CPC ......... G05G 9/02; G05G 11/00; B60W 50/12; B62D 1/04; B62D 1/046; B62D 1/183
See application file for complete search history.

(56) References Cited

U.S. PATENT DOCUMENTS

| | | | |
|---|---|---|---|
| 9,505,430 B2* | 11/2016 | Burcar | B62D 6/10 |
| 10,322,741 B2* | 6/2019 | Clochard | B60K 35/10 |
| 2004/0108161 A1* | 6/2004 | Ohno | B60W 10/06 |
| | | | 180/315 |
| 2021/0031823 A1 | 2/2021 | Watanabe et al. | |
| 2021/0080949 A1* | 3/2021 | Takeda | B62D 1/06 |
| 2023/0294678 A1* | 9/2023 | Oka | B60W 30/09 |
| | | | 701/26 |
| 2024/0025465 A1* | 1/2024 | Morita | B60T 7/102 |
| 2024/0025466 A1* | 1/2024 | Morita | G05G 9/02 |

* cited by examiner

STEERING WHEEL AND VEHICLE CONTROL DEVICE

CROSS REFERENCE TO RELATED APPLICATIONS

The present application claims priority from Japanese Patent Application No. 2023-061729 of Morita, filed on Apr. 5, 2023, Japanese Patent Application No. 2023-061730 of Morita et al., filed on Apr. 5, 2023, and Japanese Patent Application No. 2023-062801 of Miyasaka et al., filed on Apr. 7, 2023, the disclosures of which are hereby incorporated into the present application by reference.

BACKGROUND

Technical Field

The present invention relates to a steering wheel including an operating portion for causing a vehicle to accelerate or decelerate, and to a vehicle control device including the steering wheel.

Description of Related Art

A configuration that includes an operating portion for causing a vehicle to accelerate or decelerate, as does a configuration described in JP2008-14204, is already known for a steering wheel mounted in a vehicle.

However, the configuration described in JP2008-14204 is such that when the operating portion is operated, a control unit always executes a vehicle acceleration control or a vehicle deceleration control in the same way, meaning that there is concern that when a driver unexpectedly touches the operating portion, the vehicle will carry out an operation not intended by the driver.

SUMMARY

An object of the present disclosure is to provide a steering wheel that includes an operating portion for causing a vehicle to accelerate or decelerate, and is such that a vehicle can be restricted from carrying out an operation not intended by a driver when the driver unexpectedly touches the operating portion.

A representative configuration of a steering wheel according to the present disclosure is as follows.

A steering wheel mounted in a vehicle includes:
a first gripping portion gripped by a driver;
a first contact detecting portion that detects contact by the driver with the first gripping portion;
a first operating portion that is disposed in a vicinity of the first gripping portion and is operated by the driver in order to cause the vehicle to accelerate or decelerate;
a first operation detecting portion that detects that the first operating portion has been operated;
a second gripping portion that is disposed in a position differing from that of the first gripping portion and is gripped by the driver;
a second contact detecting portion that detects contact by the driver with the second gripping portion;
a second operating portion that is disposed in a vicinity of the second gripping portion and is operated by the driver in order to cause the vehicle to accelerate or decelerate;
a second operation detecting portion that detects that the second operating portion has been operated; and
a control unit that executes an acceleration control or a deceleration control of the vehicle based on results of detections by the first contact detecting portion, the second contact detecting portion, the first operation detecting portion, and the second operation detecting portion,
wherein the control unit does not execute the acceleration control or the deceleration control of the vehicle based on an operation of the first operating portion when the first operating portion is operated in a state in which the first contact detecting portion is not detecting contact by the driver with the first gripping portion, and
wherein the control unit does not execute the acceleration control or the deceleration control of the vehicle based on an operation of the second operating portion when the second operating portion is operated in a state in which the second contact detecting portion is not detecting contact by the driver with the second gripping portion.

DESCRIPTION OF THE PREFERRED EMBODIMENTS

First Embodiment

Hereafter, a steering wheel 10 according to a first embodiment of the present disclosure will be described. The scope of the present disclosure is not limited to dimensions, materials, forms, and relative dispositions of components described hereafter, unless otherwise stated.

Figure 1:
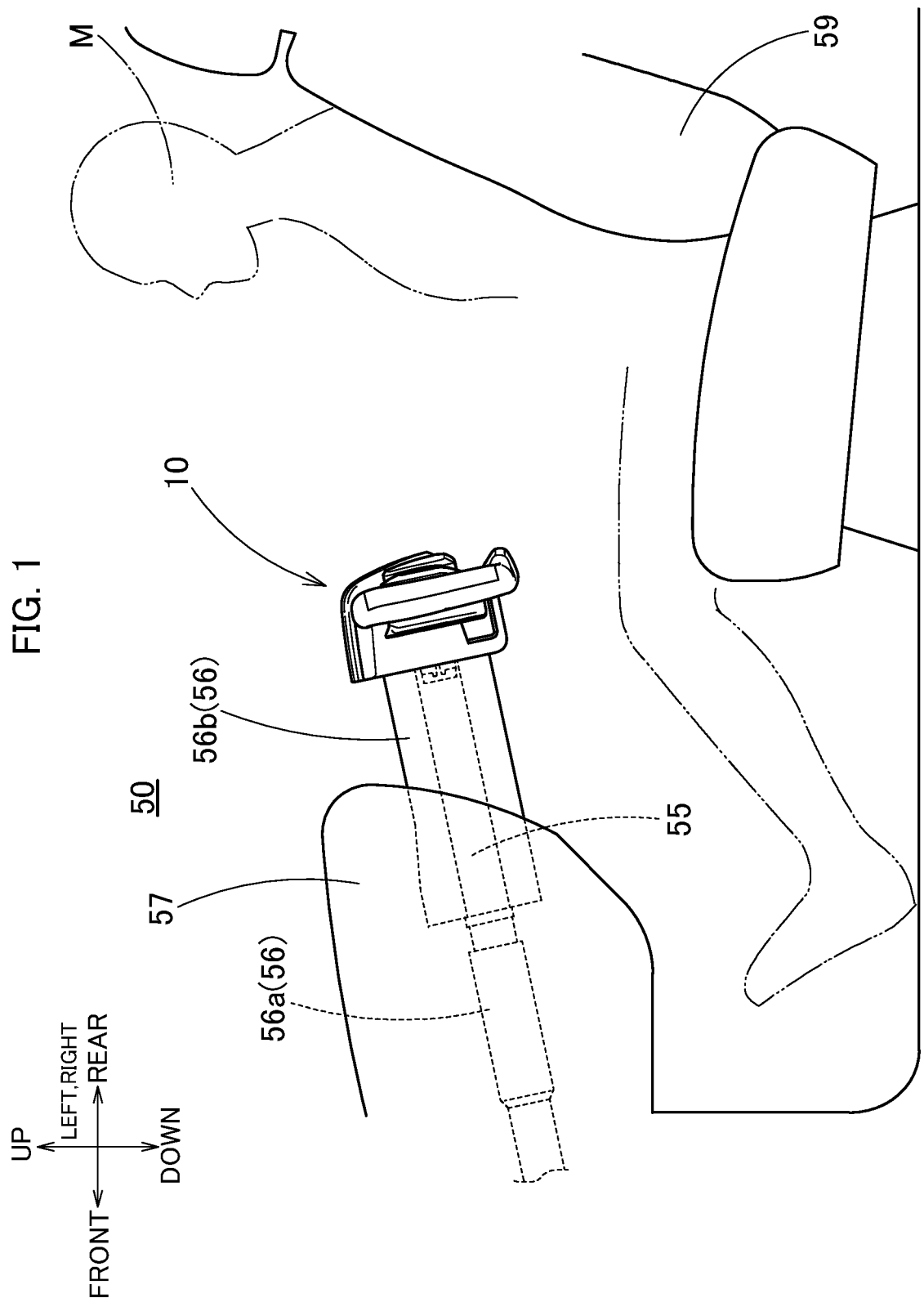
FIG. 1 is a view, seen from a left side, of a periphery of a driver's seat of a vehicle in which a steering wheel is mounted.

FIG. 1 is a view, seen from a left side, of a periphery of a driver's seat 59 of a vehicle 50 in which the steering wheel 10 according to the present embodiment is mounted.

Figure 2:
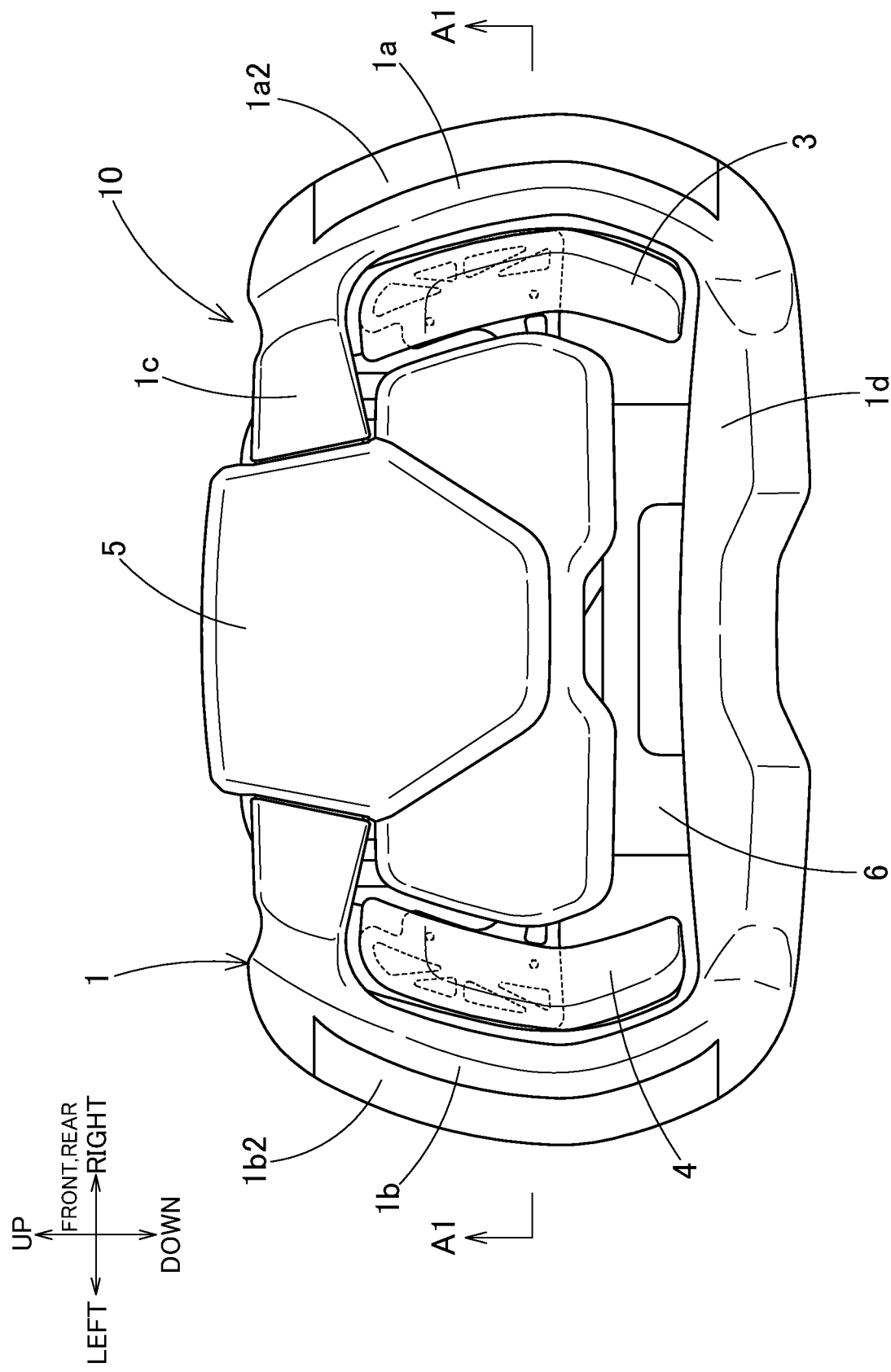
FIG. 2 is a front view of the steering wheel.

FIG. 2 is a front view of the steering wheel 10.

Figure 3:
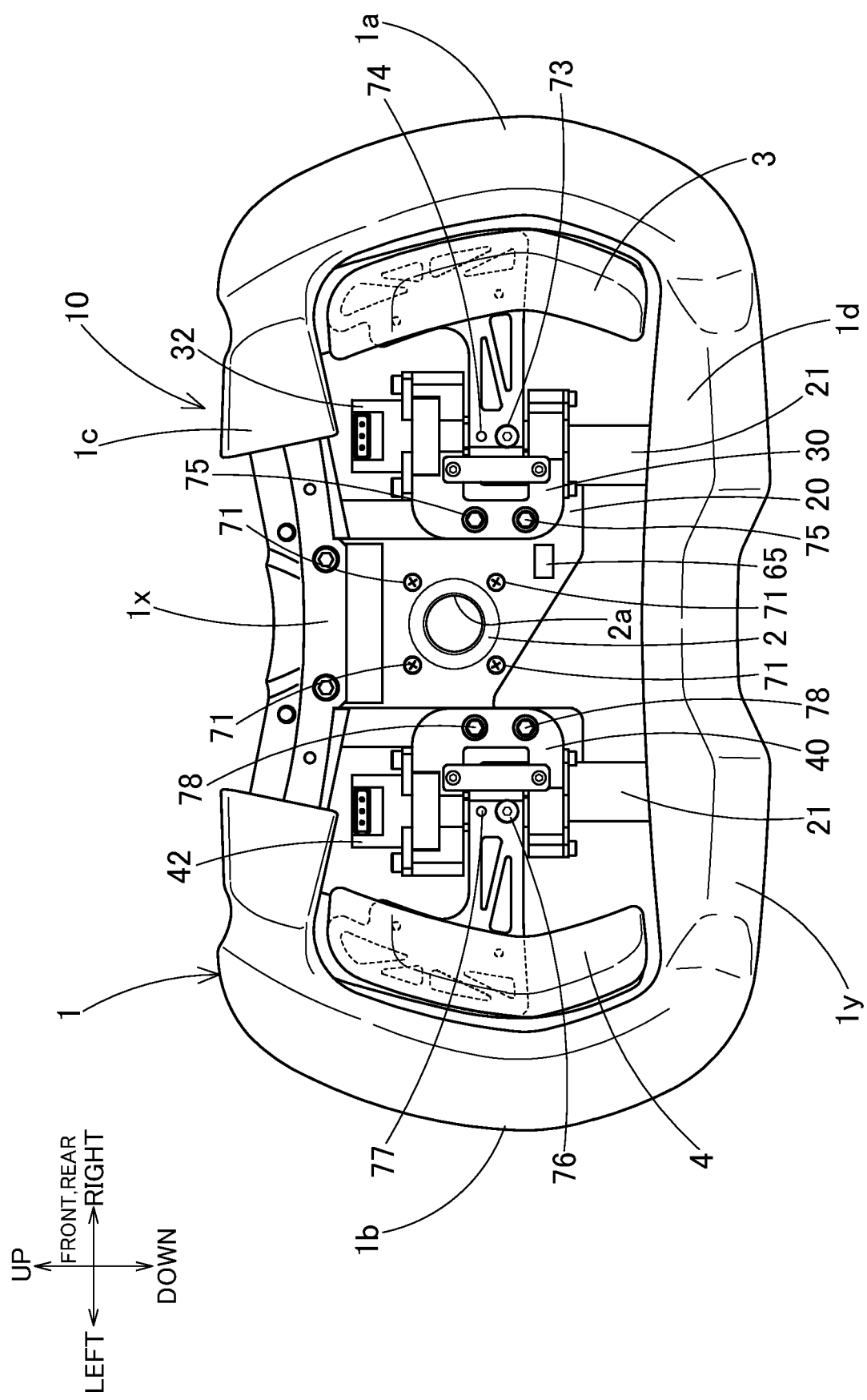
FIG. 3 is a front view of the steering wheel in a state in which a pad and a lower cover have been removed.

FIG. 3 is a front view of the steering wheel 10 in a state in which a pad 5 and a lower cover 6 have been removed.

Figure 4:
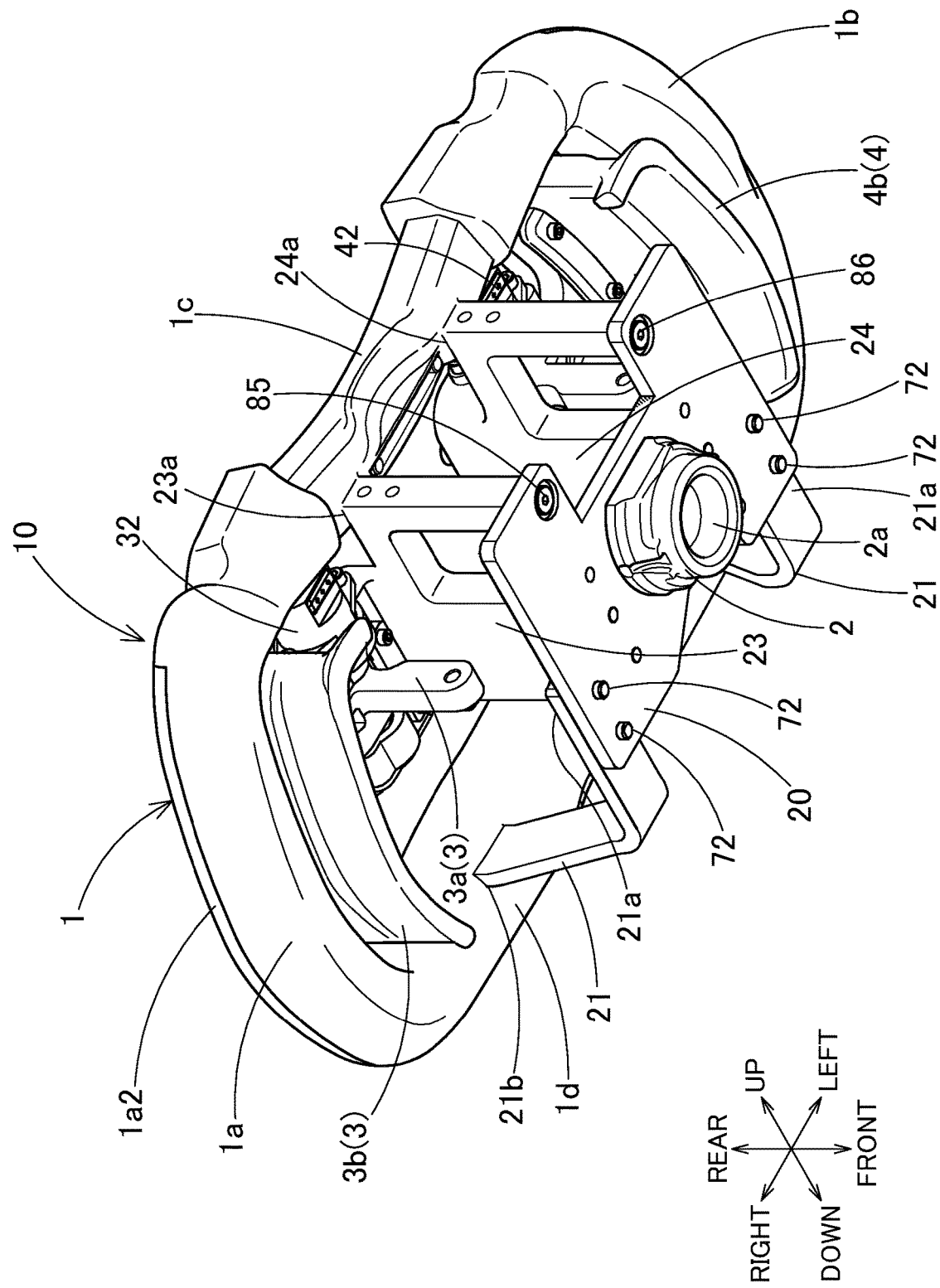
FIG. 4 is a perspective view of the steering wheel in a state in which the pad and the lower cover have been removed.

FIG. 4 is a perspective view of the steering wheel 10 in a state in which the pad 5 and the lower cover 6 have been removed.

Figure 5:
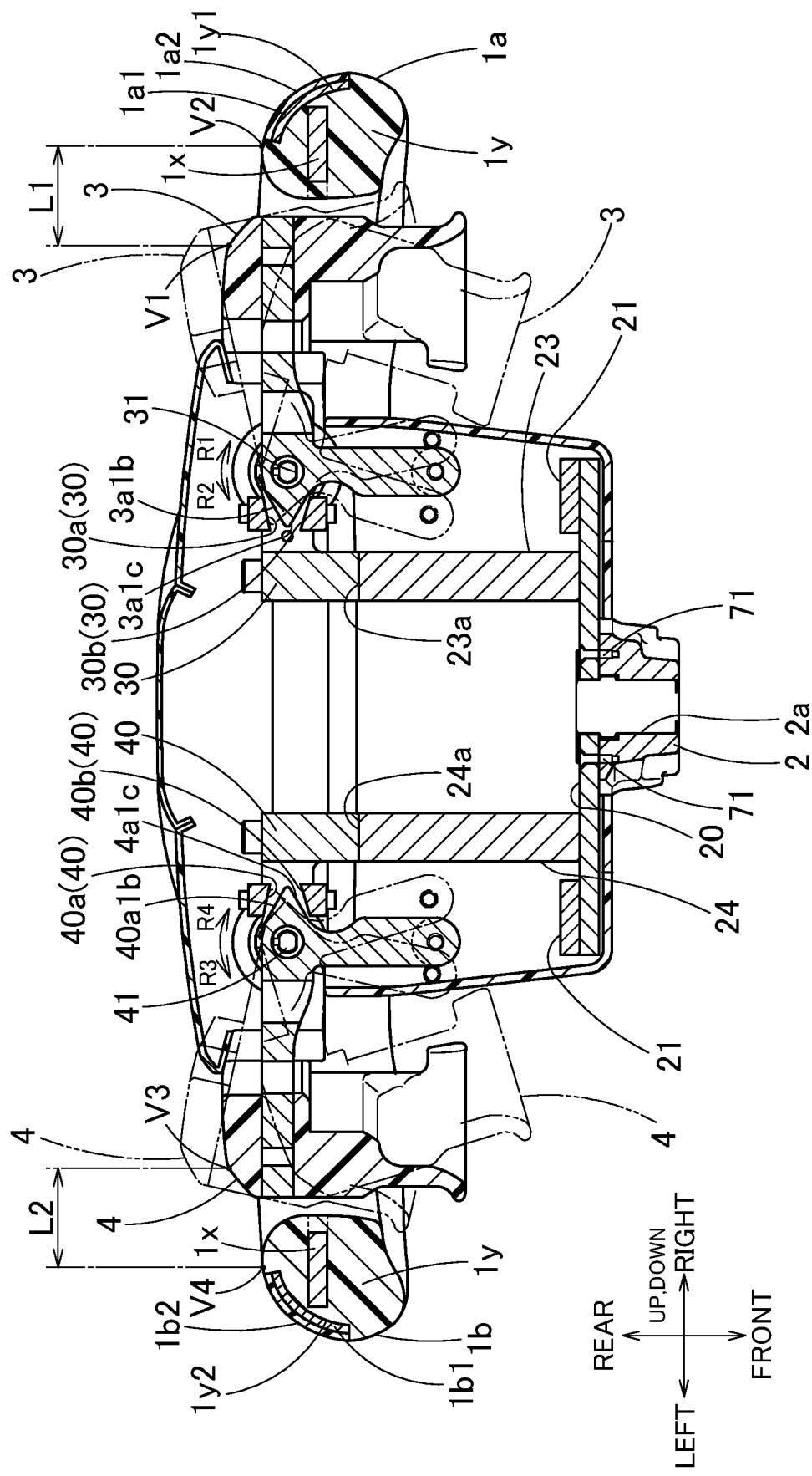
FIG. 5 is a sectional view wherein the steering wheel is cut along an A1-A1 cross-section shown in FIG. 2.
Figure 6:
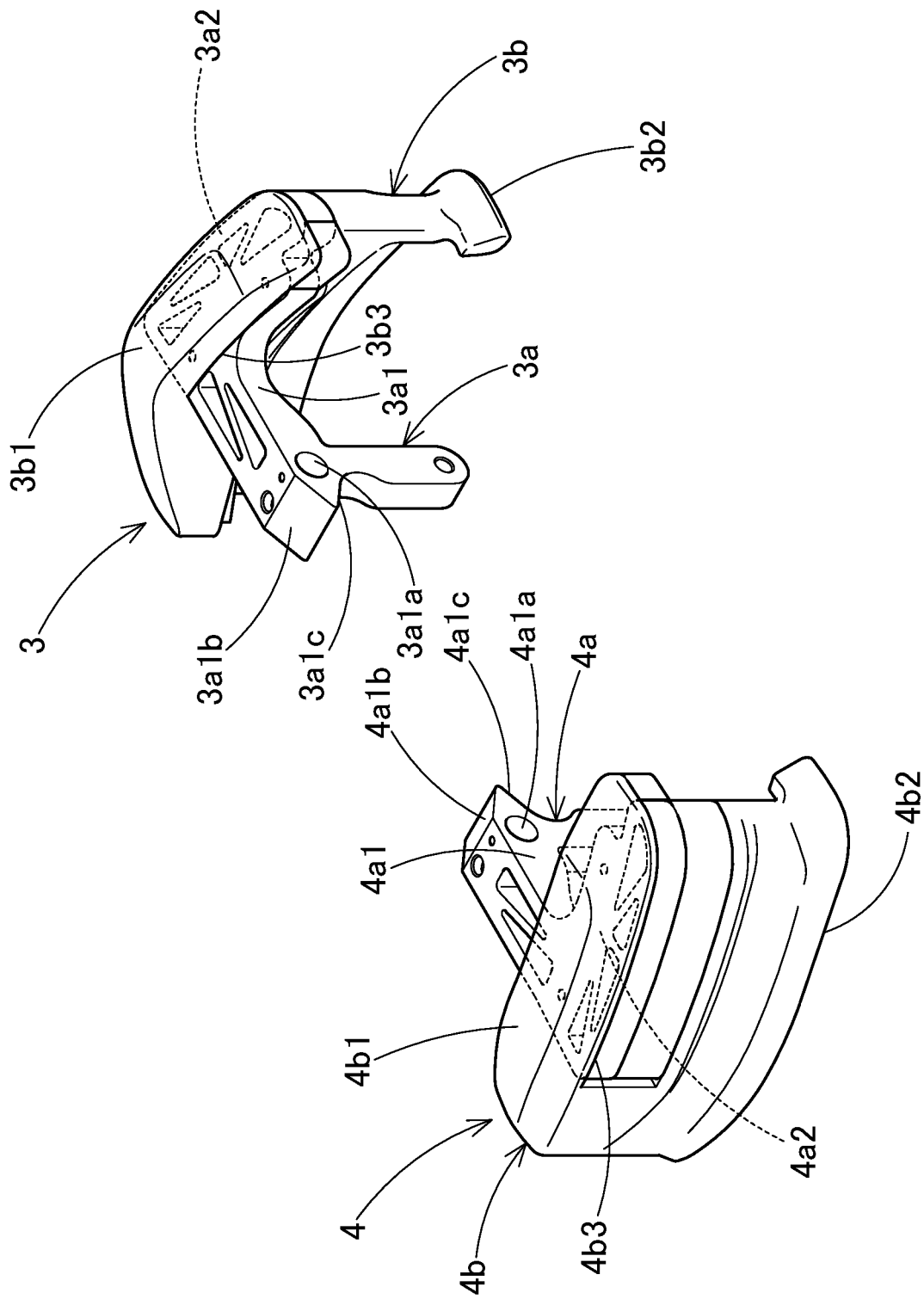
FIG. 6 is a perspective view of operating levers included in the steering wheel.

FIG. 5 is a sectional view wherein the steering wheel 10 is cut along an A1-A1 cross-section shown in FIG. 2. FIG. 6 is a perspective view of operating levers 3 and 4 included in the steering wheel 10.

In the following description, each direction mentioned in relation to the steering wheel 10 refers to a direction in a state wherein the steering wheel 10 is mounted in the vehicle 50 shown in FIG. 1. That is, left and right directions refer to a left direction and a right direction of the vehicle 50 in which the steering wheel 10 is mounted, and refer specifically to a left direction and a right direction as seen from a driver M. Forward and rearward directions refer to a forward direction and a rearward direction of the vehicle 50, and refer specifically to a forward direction and a rearward direction as seen from the driver M. Upward and downward directions refer to vertically upward and vertically downward directions.

As shown in FIG. 1, the steering wheel 10 is mounted in the vehicle 50 by being coupled to a steering shaft 55 that acts as a steering axle. The vehicle 50 includes a steering column 56 configured of a column tube 56a, which partially covers an outer peripheral portion of the steering shaft 55 and supports the steering shaft 55, and a column cover 56b, which covers a portion of the steering shaft 55 that protrudes rearward from an instrument panel 57. The steering wheel 10 is attached to a leading end of the steering shaft 55 protruding rearward from the instrument panel 57.

As shown in FIGS. 2 to 6, the steering wheel 10 includes a boss portion 2, which is to be coupled to the steering shaft 55, and a steering portion 1, which is disposed in a periphery of the boss portion 2, and is rotationally operated by being gripped by the driver M. Also, the steering wheel 10 includes the pad 5, which covers a region behind the boss portion 2, and the lower cover 6, which is disposed on a front face side of the steering wheel 10. Also, the steering wheel 10 includes the operating levers 3 and 4, which are disposed one each on a left and a right of the boss portion 2, and are operated by the driver M in order to cause the vehicle 50 to accelerate or decelerate.

The steering portion 1 is a member of an approximately elliptical form having a left-right direction as a long axis, and, except for a portion of an upper coupling portion 1c, to be described hereafter, covered by the pad 5, is formed of a core metal 1x made of metal and a resin cover 1y that covers the core metal 1x. A region of the steering portion 1 on the right side of the boss portion 2 is a gripping portion 1a (a first gripping portion) gripped by a right hand of the driver M when driving normally. A region of the steering portion 1 on the left side of the boss portion 2 is a gripping portion 1b (a second gripping portion) gripped by a left hand of the driver M when driving normally. The gripping portion 1a and the gripping portion 1b are coupled by the upper coupling portion 1c, which extends in the left and right directions in an upper portion of the steering portion 1, and are coupled by a lower coupling portion 1d, which extends in the left and right directions in a lower portion of the steering portion 1. The portion of the upper coupling portion 1c covered by the pad 5 is formed of only the core metal 1x with no resin cover 1y.

A touch sensor 1a1 (a first contact detecting portion), which detects contact with the gripping portion 1a by the driver M, is provided in the gripping portion 1a. The touch sensor 1a1 is affixed with an adhesive to an outer peripheral portion of a recessed portion 1y1 formed in the gripping portion 1a portion of the resin cover 1y. A cover member 1a2 made of resin is affixed with an adhesive to an outer peripheral portion of the touch sensor 1a1 in order that the touch sensor 1a1 is not exposed to an exterior. In the present embodiment, a capacitive type of sensor is used as the touch sensor 1a1, and the touch sensor 1a1 is configured of an electrode, a detection circuit that detects a capacitance, a sheet-form substrate that holds the electrode and the detection circuit, and the like. A configuration wherein another type of sensor, such as a pressure sensor or an infrared sensor, is used as the touch sensor 1a1 may be adopted.

A touch sensor 1b1 (a second contact detecting portion), which detects contact with the gripping portion 1b by the driver M, is provided in the gripping portion 1b. The touch sensor 1b1 is affixed with an adhesive to an outer peripheral portion of a recessed portion 1y2 formed in the gripping portion 1b portion of the resin cover 1y. A cover member 1b2 made of resin is affixed with an adhesive to an outer peripheral portion of the touch sensor 1b1 in order that the touch sensor 1b1 is not exposed to the exterior. In the present embodiment, a capacitive type of sensor is used as the touch sensor 1b1, and the touch sensor 1b1 is configured of an electrode, a detection circuit that detects a capacitance, a sheet-form substrate that holds the electrode and the detection circuit, and the like. A configuration wherein another type of sensor, such as pressure sensor or an infrared sensor, is used as the touch sensor 1b1 may be adopted.

The boss portion 2 is a metal member disposed in an approximate center of the steering wheel 10, is supported in a supporting metal plate 20 by being fitted into an unshown boss supporting hole in the supporting metal plate 20, which is a flat metal plate, and is fixed to the supporting metal plate 20 with a screw 71. The boss portion 2 has a shaft hole 2a into which the steering shaft 55 is fully inserted and fitted. The boss portion 2 and the steering shaft 55 are coupled by the leading end of the steering shaft 55 being fixed with a nut in a state in which the leading end of the steering shaft 55 is inserted through and fitted into the shaft hole 2a of the boss portion 2.

Also, the boss portion 2 is coupled to the steering portion 1 across the supporting metal plate 20, two coupling members 21, and supporting stands 23 and 24. The coupling member 21 is a metal plate that has been bent into an L-form, one end portion 21a thereof is fixed to the supporting metal plate 20 with a screw 72, and an other end portion 21b is fixed to a lower face of the core metal 1x of the steering portion 1 with an unshown screw. The supporting stands 23 and 24 are metal members that extend in the forward and rearward directions, front end portions thereof are fixed to the supporting metal plate 20 with screws 85 and 86 respectively, and rear end portions are fixed to a lower face of the upper coupling portion 1c of the steering portion 1 with unshown screws. In this way, the boss portion 2 and the steering portion 1 are coupled. The supporting stand 23 is coupled to the upper coupling portion 1c of the steering portion 1 in a portion on an upper side of the rear end portion thereof, and is coupled to a lever supporting member 30, to be described hereafter, in a portion on a lower side. Similarly, the supporting stand 24 is coupled to the upper coupling portion 1c of the steering portion 1 in a portion on an upper side of the rear end portion thereof, and is coupled to a lever supporting member 40, to be described hereafter, in a portion on a lower side.

Also, a circuit substrate 65 is provided in the supporting metal plate 20. A CPU 61 shown in FIG. 7 (not shown in FIG. 3), a memory 62 (not shown in FIG. 3), and a multiple of connectors (not shown) are mounted on the circuit substrate 65. The detection circuits of the touch sensors 1a1 and 1b1 are electrically connected to the CPU 61 via an unshown cable connected to the relevant connector. Also, lever sensors 32 and 42, to be described hereafter, that detect an angle of pivot of the operating levers 3 and 4 are electrically connected to the CPU 61 via an unshown cable connected to the relevant connector.

The driver M changes a direction of travel of the vehicle 50 by gripping the gripping portion 1a with the right hand, gripping the gripping portion 1b with the left hand, and rotationally operating the steering portion 1, centered on the steering shaft 55 coupled to the boss portion 2. In the present embodiment, the vehicle 50 is such that a steer-by-wire system is mounted, an angle of rotation of the steering shaft 55, which rotates in accordance with a rotational operating of the steering portion 1, is detected by an unshown sensor, and the vehicle 50 changes the direction of travel by causing wheels to turn in accordance with a result of the detection. The vehicle 50 may also be of a configuration such that the wheels are mechanically caused to turn via the steering shaft 55 when the steering wheel 10 is rotationally operated.

The operating lever 3 (a first operating portion) is disposed in a vicinity of the gripping portion 1a, and is configured in such a way as to be able to pivot with respect to the gripping portion 1a. Specifically, the operating lever 3 is disposed in a position to the right of the boss portion 2 and neighboring the gripping portion 1a on an inner side of the steering portion 1. Also, in order that the operating lever 3 can be operated with the right hand in a state in which the driver M grips the gripping portion 1a with the right hand, a distance L1 between a switching point V1 between an upper face and an inclined face of the operating lever 3 and an apex V2 on the rear side of the gripping portion 1a is set to be within 40 mm. Provided that the operating lever 3 is disposed in a vicinity of the steering portion 1, the operating lever 3 may also be disposed on an outer side of the steering portion 1. Owing to the operating lever 3 being disposed on the inner side of the steering portion 1, however, the operating lever 3 does not protrude to the outer side of the steering portion 1, and a freedom of disposition of members in a periphery of the steering wheel 10 can be increased, meaning that the operating lever 3 is preferably disposed on the inner side of the steering portion 1.

The operating lever 3 is configured of a metal core metal 3a and a resin operating cover 3b, and is supported by the lever supporting member 30. The lever supporting member 30 is fixed to a rear end portion 23a of the supporting stand 23 with a screw 75, supports a pivot shaft 31 in a state able to rotate in an interior of the lever supporting member 30, and supports the operating lever 3 across the pivot shaft 31. The core metal 3a has a supported portion 3a1, which extends in the left and right directions and is supported by the pivot shaft 31, and a cover attachment portion 3a2, which extends in the upward and downward directions from a right end portion of the supported portion 3a1 and to which the operating cover 3b is attached. A shaft hole 3a1a is formed in the supported portion 3a1 of the core metal 3a, and the pivot shaft 31 is inserted through the shaft hole 3a1a. The supported portion 3a1 and the pivot shaft 31 are fixed with a screw 73 and a positioning pin 74 in such a way as not to move relative to each other. In this way, the operating lever 3 is configured in such a way as to be able to pivot in an arrow R1 direction shown in FIG. 5, and in an arrow R2 direction opposite to the arrow R1 direction, centered on the pivot shaft 31.

Also, a pivoting in the arrow R1 direction of the operating lever 3 is regulated to a predetermined pivoting angle by a regulating face 3a1b formed in the supported portion 3a1 of the core metal 3a coming into contact with a pivot regulating portion 30a of the lever supporting member 30. Also, a pivoting in the arrow R2 direction of the operating lever 3 is regulated to a predetermined angle of pivot by a regulating face 3a1c formed in the supported portion 3a1 of the core metal 3a coming into contact with a pivot regulating portion 30b of the lever supporting member 30. Also, a magnetic lever sensor 32 (a first operation detecting portion) that detects an angle of rotation of the pivot shaft 31 is attached to the lever supporting member 30 in a vicinity of the pivot shaft 31. By detecting the angle of rotation of the pivot shaft 31, the lever sensor 32 detects that the operating lever 3 has been operated by the driver M, and detects an angle of pivot, which is an operation amount, of the operating lever 3. Although a magnetic rotation angle sensor is used as the lever sensor 32 in the present embodiment, a configuration wherein another sensor that can detect an operation amount of the operating lever 3 is used may be adopted.

The operating cover 3b has an accelerator operating face 3b1, which is a region on a rear face side of the operating cover 3b and is a region pressed by a palm or a thumb of the right hand when the driver M carries out an operation of causing the vehicle 50 to accelerate, a brake operating face 3b2, which is a region on a front face side and is pressed by the four fingers other than the thumb when the driver M causes the vehicle 50 to decelerate, and a fitting hole 3b3 into which the cover attachment portion 3a2 of the core metal 3a is fitted, and fixed with an unshown screw. In order to improve operability for the driver M, at least one portion of the accelerator operating face 3b1 of the operating cover 3b is positioned rearward with respect to a rear end face of the gripping portion 1a, and at least one portion of the brake operating face 3b2 is positioned forward with respect to a front end face of the gripping portion 1a.

The driver M carries out an acceleration operation, causing the vehicle 50 to accelerate, by pressing the accelerator operating face 3b1 of the operating lever 3 forward with the palm or the thumb of the right hand, causing the operating lever 3 to pivot in the arrow R1 direction (a first direction). Also, the driver M carries out a braking operation, causing the vehicle 50 to decelerate, by pressing the brake operating face 3b2 of the operating lever 3 rearward with the four fingers other than the thumb, causing the operating lever 3 to pivot in the arrow R2 direction (a second direction). A method of controlling speed of the vehicle 50 when an acceleration operation or a braking operation is carried out will be described hereafter.

The operating lever 4 (a second operating portion) is a member having bilateral symmetry with the operating lever 3, is disposed in a position bilaterally symmetrical to the operating lever 3 with the boss portion 2 as a reference, and carries out an operation bilaterally symmetrical to that of the operating lever 3. That is, the operating lever 4 is disposed in a vicinity of the gripping portion 1b, and is configured in such a way as to be able to pivot with respect to the gripping portion 1b. Specifically, the operating lever 4 is disposed in a position to the left of the boss portion 2 and neighboring the gripping portion 1b on the inner side of the steering portion 1. Also, in order that the operating lever 4 can be operated with the left hand in a state in which the driver M grips the gripping portion 1b with the left hand, a distance L2 between a switching point V3 between an upper face and an inclined face of the operating lever 4 and an apex V4 on the rear side of the gripping portion 1b is set to be within 40 mm. Provided that the operating lever 4 is disposed in a vicinity of the steering portion 1, the operating lever 4 may also be disposed on the outer side of the steering portion 1. Owing to the operating lever 4 being disposed on the inner side of the steering portion 1, however, the operating lever 4 does not protrude to the outer side of the steering portion 1, and a freedom of disposition of members in the periphery of the steering wheel 10 can be increased, meaning that the operating lever 4 is preferably disposed on the inner side of the steering portion 1.

The operating lever 4 is configured of a metal core metal 4a and a resin operating cover 4b, and is supported by the lever supporting member 40. The lever supporting member 40 is fixed to a rear end portion 24a of the supporting stand 24 with a screw 78, supports a pivot shaft 41 in a state able to rotate in an interior of the lever supporting member 40, and supports the operating lever 4 across the pivot shaft 41. The core metal 4a has a supported portion 4al, which extends in the left and right directions and is supported by the pivot shaft 41, and a cover attachment portion 4a2, which extends in the upward and downward directions from a right end portion of the supported portion 4al and to which the operating cover 4b is attached. A shaft hole 4a1a is formed in the supported portion 4al of the core metal 4a, and the pivot shaft 41 is inserted through the shaft hole 4a1a. The supported portion 4al and the pivot shaft 41 are fixed with a screw 76 and a positioning pin 77 in such a way as not to move relative to each other. In this way, the operating lever 4 is configured in such a way as to be able to pivot in an arrow R3 direction shown in FIG. 5, and in an arrow R4 direction opposite to the arrow R3 direction, centered on the pivot shaft 41.

Also, a pivoting in the arrow R3 direction of the operating lever 4 is regulated to a predetermined pivoting angle by a regulating face 4a1b formed in the supported portion 4al of the core metal 4a coming into contact with a pivot regulating portion 40a of the lever supporting member 40. Also, a pivoting in the arrow R4 direction of the operating lever 4 is regulated to a predetermined angle of pivot by a regulating face 4a1c formed in the supported portion 4al of the core metal 4a coming into contact with a pivot regulating portion 40b of the lever supporting member 40. Also, a magnetic lever sensor 42 (a second operation detecting portion) that detects an angle of rotation of the pivot shaft 41 is attached to the lever supporting member 40 in a vicinity of the pivot shaft 41. By detecting the angle of rotation of the pivot shaft 41, the lever sensor 42 detects that the operating lever 4 has been operated by the driver M, and detects an angle of pivot, which is an operation amount, of the operating lever 4. Although a magnetic rotation angle sensor is used as the lever sensor 42 in the present embodiment, a configuration wherein another sensor that can detect an operation amount of the operating lever 4 is used may be adopted.

The operating cover 4b has an accelerator operating face 4b1, which is a region on a rear face side of the operating cover 4b and is a region pressed by a palm or a thumb of the left hand when the driver M carries out an operation of causing the vehicle 50 to accelerate, a brake operating face 4b2, which is a region on a front face side and is pressed by the four fingers other than the thumb when the driver M causes the vehicle 50 to decelerate, and a fitting hole 4b3 into which the cover attachment portion 4a2 of the core metal 4a is fitted, and fixed with an unshown screw. In order to improve operability for the driver M, at least one portion of the accelerator operating face 4b1 of the operating cover 4b is positioned rearward with respect to a rear end face of the gripping portion 1b, and at least one portion of the brake operating face 4b2 is positioned forward with respect to a front end face of the gripping portion 1b.

The driver M carries out an acceleration operation, causing the vehicle 50 to accelerate, by pressing the accelerator operating face 4b1 of the operating lever 4 forward with the palm or the thumb of the left hand, causing the operating lever 4 to pivot in the arrow R3 direction (a third direction). Also, the driver M carries out a braking operation, causing the vehicle 50 to decelerate, by pressing the brake operating face 4b2 of the operating lever 4 rearward with the four fingers other than the thumb, causing the operating lever 4 to pivot in the arrow R4 direction (a fourth direction). A method of controlling speed of the vehicle 50 when an acceleration operation or a braking operation is carried out will be described hereafter.

In this way, the steering wheel 10 of the present embodiment is such that an acceleration operation for causing the vehicle 50 to accelerate is carried out by the operating lever 3 being pivoted in the arrow R1 direction, and a braking operation for causing the vehicle 50 to decelerate is carried out by the operating lever 3 being pivoted in the arrow R2 direction. Similarly, an acceleration operation for causing the vehicle 50 to accelerate is carried out by the operating lever 4 being pivoted in the arrow R3 direction, and a braking operation for causing the vehicle 50 to decelerate is carried out by the operating lever 4 being pivoted in the arrow R4 direction. Because of this, the driver M can carry out both an acceleration operation and a braking operation without changing a grip between the operating levers 3 and 4, meaning that a driving operation by the driver M can be restricted from becoming more complex.

In the present embodiment, a description has been given of a configuration wherein an acceleration operation is carried out by the operating levers 3 and 4 being pivoted in the arrow R1 direction and the arrow R3 direction, and a braking operation is carried out by the operating levers 3 and 4 being pivoted in the arrow R2 direction and the arrow R4 direction opposite to the arrow R1 direction and the arrow R3 direction. The present disclosure not being limited to this, however, pivoting directions of the operating levers 3 and 4 when an acceleration operation is carried out and when a braking operation is carried out may be reversed. This is decided by, for example, the following points being considered. That is, when driving, a frequency of an acceleration operation is generally greater than a frequency of a braking operation. Also, as the driver M drives with a forward leaning posture, utilizing his or her own weight to press the operating levers 3 and 4 using a palm or a thumb causes pivoting more easily than pressing the operating levers 3 and 4 using the four fingers other than the thumb. Consequently, by adopting the pivoting directions of the present embodiment, the driver M can comfortably carry out an acceleration operation, whose frequency is relatively high, because of which an operating burden on the driver M can be reduced. Meanwhile, for example, when the vehicle 50 has a constant speed control function of traveling at a speed set by the driver M, the frequency of a braking operation becomes greater than the frequency of an acceleration operation during the control. In this case, the driver M can comfortably carry out a braking operation, whose frequency is relatively high, by the pivoting directions when an acceleration operation is carried out and when a braking operation is carried out being reversed with respect to the directions of the present embodiment, because of which an operating burden on the driver M can be reduced. Taking these points and the like into consideration, a relationship between the pivoting directions of the operating levers 3 and 4 and an acceleration operation and braking operation is decided.

Figure 7:
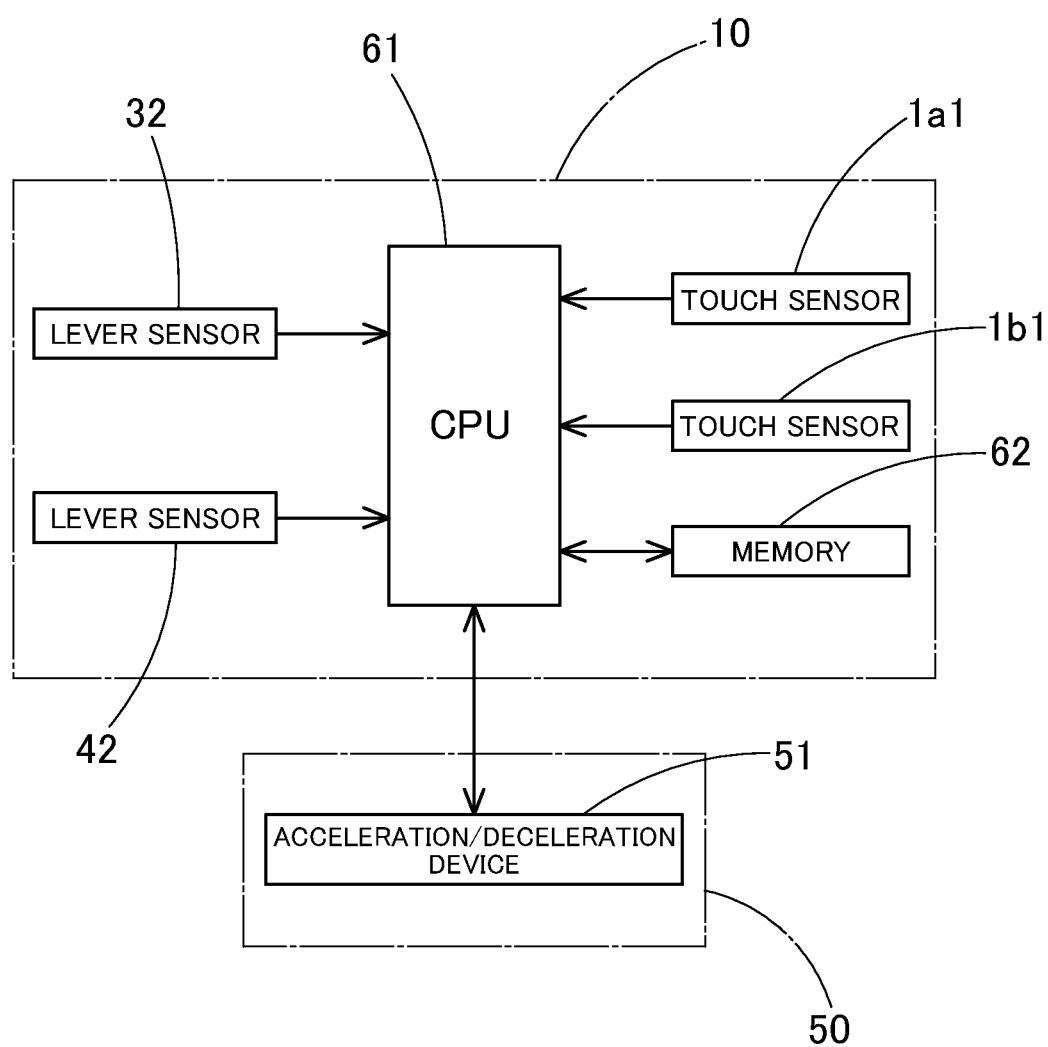
FIG. 7 is a block diagram showing a system configuration of the steering wheel.

Next, a system configuration of the steering wheel 10 will be described, using a block diagram shown in FIG. 7. As shown in FIG. 7, the steering wheel 10 includes a memory 62, in which various kinds of control program, data, and the like are stored, and a CPU 61 (a control unit), which is electrically connected to the memory 62 and controls each member in accordance with a control program stored in the memory 62. The touch sensors 1a1 and 1b1 and the lever sensors 32 and 42 are electrically connected to the CPU 61.

The touch sensor 1a1, using a detection circuit, detects a capacitance that rises in accordance with the driver M coming into contact with the gripping portion 1a, detects a contact by the driver M with the gripping portion 1a when the capacitance reaches a threshold or higher, and transmits a detection signal to the CPU 61. Similarly, the touch sensor 1b1, using a detection circuit, detects capacitance that rises in accordance with the driver M coming into contact with the gripping portion 1b, detects a contact by the driver M with the gripping portion 1b when the capacitance reaches a threshold or higher, and transmits a detection signal to the CPU 61.

The lever sensor 32 transmits an angle of rotation of the pivot shaft 31 when the operating lever 3 is pivoted in the arrow R1 direction or the arrow R2 direction shown in FIG. 5 to the CPU 61 as a detection signal. Similarly, the lever sensor 42 transmits an angle of rotation when the operating lever 4 is pivoted in the arrow R3 direction or the arrow R4 direction shown in FIG. 5 to the CPU 61 as a detection signal.

Also, an acceleration/deceleration device 51, which is mounted in the vehicle 50 and carries out an acceleration or a deceleration of the vehicle 50, is electrically connected to the CPU 61. The acceleration/deceleration device 51 includes a driving force control device and a braking force control device. The braking force control device is, for example, an unshown brake pad of the vehicle 50. Also, the driving force control device is a motor or the like when the vehicle 50 is an electric vehicle, an engine or the like when the vehicle 50 is a gasoline-powered vehicle, and a hydrogen engine or the like when the vehicle 50 is a hydrogen-powered vehicle. The CPU 61 executes an acceleration control, causing the vehicle 50 to accelerate, or a deceleration control, causing the vehicle 50 to decelerate, via a control by the acceleration/deceleration device 51.

Next, a control by the CPU 61 when the operating levers 3 and 4 are operated will be described. Firstly, a control by the CPU 61 when the operating levers 3 and 4 are operated in a state in which the driver M grips the gripping portions 1a and 1b with both hands will be described. When the operating lever 3 is pivoted in the arrow R1 direction shown in FIG. 5 in a state in which the touch sensor 1al is detecting contact by the driver M with the gripping portion 1a, the CPU 61 controls the vehicle 50 in such a way as to accelerate by controlling the acceleration/deceleration device 51 in accordance with an angle of rotation of the pivot shaft 31 detected by the lever sensor 32. Specifically, the CPU 61 controls the vehicle 50 in such a way as to accelerate via the acceleration/deceleration device 51 in such a way that the greater the angle of rotation of the pivot shaft 31 detected by the lever sensor 32, the greater the acceleration of the vehicle 50. Also, when the operating lever 3 is pivoted in the arrow R2 direction shown in FIG. 5 in a state in which the touch sensor 1a1 is detecting contact by the driver M with the gripping portion 1a, the CPU 61 controls the vehicle 50 in such a way as to decelerate by controlling the acceleration/deceleration device 51 in accordance with an angle of rotation of the pivot shaft 31 detected by the lever sensor 32. Specifically, the CPU 61 controls the vehicle 50 in such a way as to decelerate via the acceleration/deceleration device 51 in such a way that the greater the angle of rotation of the pivot shaft 31 detected by the lever sensor 32, the greater the deceleration of the vehicle 50.

Similarly, when the operating lever 4 is pivoted in the arrow R3 direction shown in FIG. 5 in a state in which the touch sensor 1b1 is detecting contact by the driver M with the gripping portion 1b, the CPU 61 controls the vehicle 50 in such a way as to accelerate by controlling the acceleration/deceleration device 51 in accordance with an angle of rotation of the pivot shaft 41 detected by the lever sensor 42. Specifically, the CPU 61 controls the vehicle 50 in such a way as to accelerate via the acceleration/deceleration device 51 in such a way that the greater the angle of rotation of the pivot shaft 41 detected by the lever sensor 42, the greater the acceleration of the vehicle 50. Also, when the operating lever 4 is pivoted in the arrow R4 direction shown in FIG.

5 in a state in which the touch sensor 1b1 is detecting contact by the driver M with the gripping portion 1b, the CPU 61 controls the vehicle 50 in such a way as to decelerate by controlling the acceleration/deceleration device 51 in accordance with an angle of rotation of the pivot shaft 41 detected by the lever sensor 42. Specifically, the CPU 61 controls the vehicle 50 in such a way as to decelerate via the acceleration/deceleration device 51 in such a way that the greater the angle of rotation of the pivot shaft 41 detected by the lever sensor 42, the greater the deceleration of the vehicle 50.

Meanwhile, when the operating levers 3 and 4 are operated in a state in which the driver M is not gripping the gripping portions 1a and 1b, the CPU 61 carries out the following control. That is, when the operating lever 3 is pivoted in the arrow R1 direction or arrow R2 direction shown in FIG. 5 in a state in which the touch sensor 1a1 is not detecting contact by the driver M with the gripping portion 1a, the CPU 61 does not execute the acceleration control or the deceleration control of the vehicle 50 based on the operation. Also, when the operating lever 4 is pivoted in the arrow R3 direction or arrow R4 direction shown in FIG. 5 in a state in which the touch sensor 1b1 is not detecting contact by the driver M with the gripping portion 1b, the CPU 61 does not execute the acceleration control or the deceleration control of the vehicle 50 based on the operation.

This kind of configuration is such that, when, for example, the operating lever 4 on the left side comes into contact with the left hand, a left arm, or the like of the driver M, and is unintentionally operated, in a state in which the driver M grips the steering wheel 10 with only the right hand and is not gripping the gripping portion 1b on the left side, no acceleration control or deceleration control of the vehicle 50 is carried out. Similarly, when the operating lever 3 on the right side comes into contact with the right hand, a right arm, or the like of the driver M, and is unintentionally operated, in a state in which the driver M grips the steering wheel 10 with only the left hand and is not gripping the gripping portion 1a on the right side, no acceleration control or deceleration control of the vehicle 50 is carried out. Also, when the vehicle 50 has, for example, an automatic driving function, and the operating levers 3 and 4 are unintentionally operated in a state in which the driver M is not gripping the gripping portions 1a and 1b, no acceleration control or deceleration control of the vehicle 50 is carried out. Because of this, the steering wheel 10 of the present embodiment is such that when the driver M unexpectedly comes into contact with the operating levers 3 and 4, the vehicle 50 can be restricted from carrying out an operation unintended by the driver M.

In the present embodiment, a configuration wherein the operating levers 3 and 4 can execute both an acceleration operation and a braking operation has been described, but the present disclosure is not limited to this. That is, even when a configuration wherein the operating levers 3 and 4 can execute only one of an acceleration operation or a braking operation is adopted, advantages the same as those heretofore described can be obtained by the CPU 61 carrying out the heretofore described controls. However, adopting a configuration wherein the operating levers 3 and 4 can execute both an acceleration operation and a braking operation, as is the case with the configuration of the present embodiment, is preferable, as a driving operation by the driver M can be restricted from becoming more complex.

Figure 8:
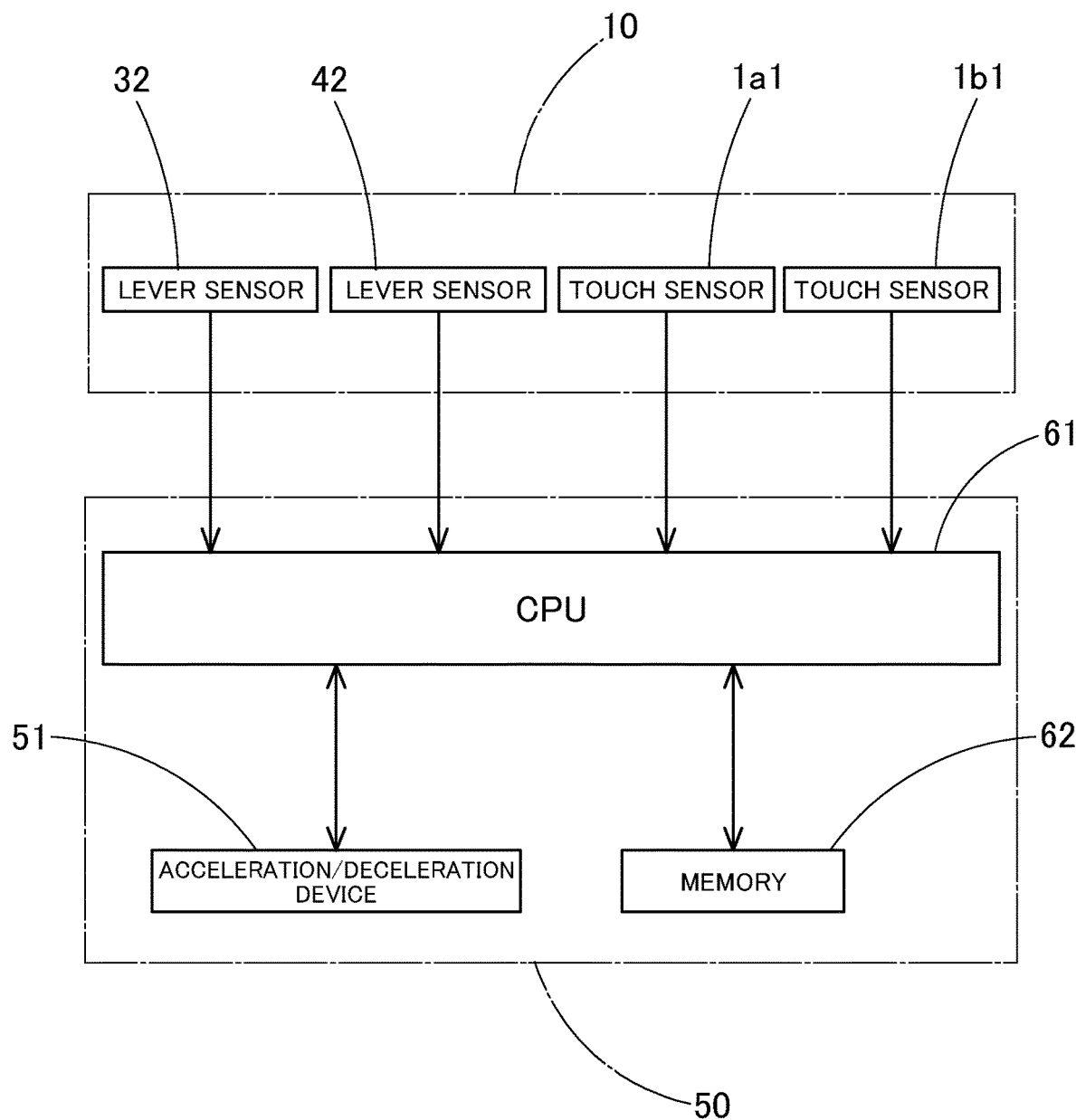
FIG. 8 is a block diagram showing a system configuration of the steering wheel.

Also, in the present embodiment, a configuration wherein the CPU 61 is provided in the steering wheel 10 has been described, but the present disclosure is not limited to this. That is, even when adopting a configuration wherein the CPU 61 and the memory 62 are provided in the vehicle 50, as shown in FIG. 8, and the CPU 61 provided in the vehicle 50 carries out controls the same as those heretofore described, advantages the same as those heretofore described can be obtained. In this case, the steering wheel 10 and the CPU 61 provided in the vehicle 50 configure a vehicle control device that is mounted in the vehicle 50, and controls the vehicle 50.

Also, in the present embodiment, it has been described that the steering wheel 10 has the operating levers 3 and 4 as an operating portion for causing the vehicle 50 to accelerate or decelerate, but the present disclosure not being limited to this, a configuration wherein a button or a switch is provided as an operating portion may be adopted. That is, even when a configuration is such that, for example, a button acting as an operating portion and a sensor that detects an operation amount of the button are provided in the steering wheel 10, and the CPU 61 carries out controls the same as the heretofore described controls when the operating levers 3 and 4 are operated in accordance with a result of a detection by the touch sensors 1a1 and 1b1 and the operation amount of the button, advantages the same as those heretofore described can be obtained. Similarly, even when a configuration is such that a switch acting as an operating portion and a sensor that detects an operation amount of the switch are provided in the steering wheel 10, and the CPU 61 carries out controls the same as the heretofore described controls when the operating levers 3 and 4 are operated in accordance with a result of a detection by the touch sensors 1a1 and 1b1 and the operation amount of the switch, advantages the same as those heretofore described can be obtained.

Second Embodiment

Hereafter, firstly, an overall configuration of a vehicle control device D according to a second embodiment of the present disclosure will be described. The scope of the present disclosure is not limited to dimensions, materials, forms, and relative dispositions of components described hereafter, unless otherwise stated.

Figure 9:
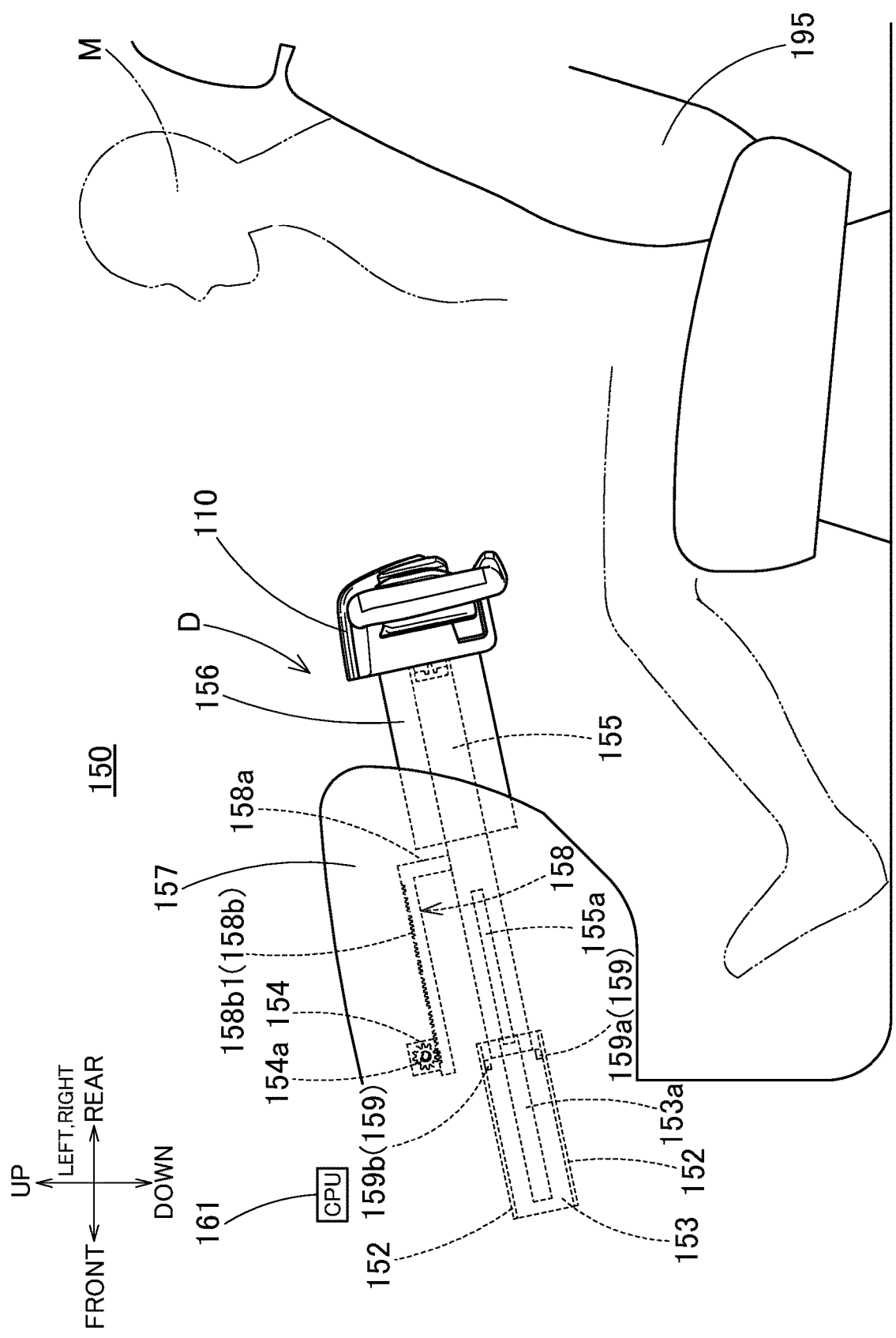
FIG. 9 is a view, seen from a left side, of a periphery of a driver's seat of a vehicle in which a vehicle control device is mounted.
Figure 10:
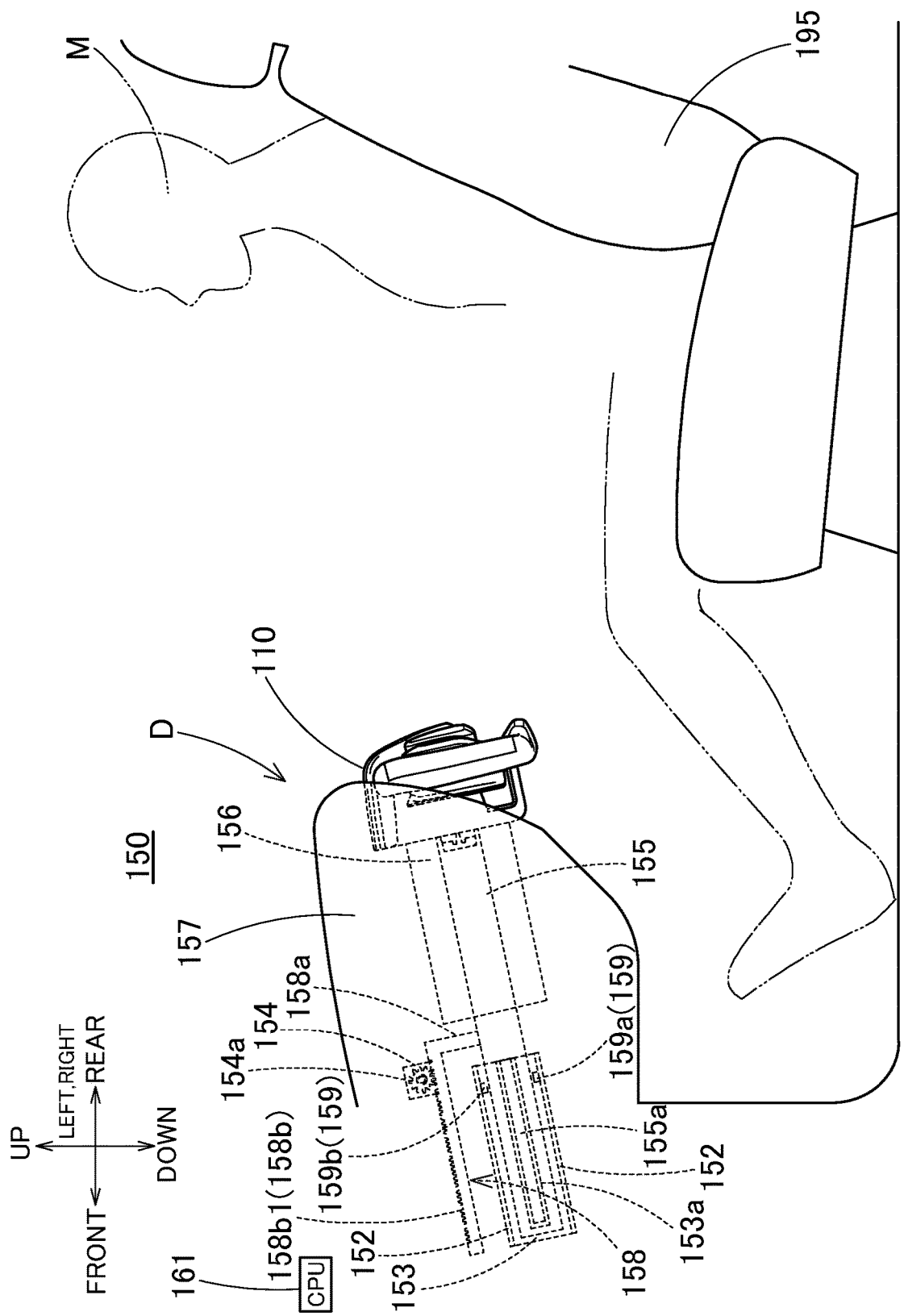
FIG. 10 is a view, seen from a left side, of a periphery of a driver's seat of a vehicle in which a vehicle control device is mounted.

FIGS. 9 and 10 are views, seen from the left side, of a periphery of a driver's seat 195 of a vehicle 150 in which the vehicle control device D is mounted. Herein, FIG. 9 shows a state in which a steering wheel 110 included in the vehicle control device D is positioned in an extended position, and FIG. 10 shows a state in which the steering wheel 110 is positioned in a retracted position.

In the following description, each direction mentioned in relation to the steering wheel 110 refers to a direction in a state wherein the steering wheel 110 is mounted in the vehicle 150 shown in FIGS. 9 and 10. That is, left and right directions refer to a left direction and a right direction of the vehicle 150 in which the steering wheel 110 is mounted, and refer specifically to a left direction and a right direction as seen from the driver M. Forward and rearward directions refer to a forward direction and a rearward direction of the vehicle 150, and refer specifically to a forward direction and a rearward direction as seen from the driver M. Upward and downward directions refer to vertically upward and vertically downward directions.

As shown in FIGS. 9 and 10, the vehicle control device D includes the steering wheel 110, which is for changing a direction of travel of the vehicle 150. The steering wheel 110 is mounted in the vehicle 150 by being coupled to a steering shaft 155 that acts as a steering axle. The steering wheel 110 is attached to a leading end of the steering shaft 155, which protrudes rearward from an instrument panel 157. Of a portion of the steering shaft 155 protruding rearward from the instrument panel 157, a portion other than a portion to which the steering wheel 110 is attached is covered by a column cover 156 of the vehicle 150.

A front end portion of the steering shaft 155 is supported by a storage box 153. The storage box 153 is a box-form member whose rear end face is opened, has a slide rail 153a on left and right side walls, and supports the steering shaft 155 via the slide rail 153a in a state movable in the forward and rearward directions. That is, the slide rail 153a, which acts as an outer rail, is attached to the left and right side walls of the storage box 153, a slide rail 155a acting as an inner rail is attached to left and right side faces of the steering shaft 155, and the steering shaft 155 is supported in a state movable in the forward and rearward directions by the slide rails 153a and 155a engaging. Also, the storage box 153 is supported in a state able to rotate by a bearing 152 in an outer peripheral portion thereof. This means that when the steering wheel 110 is operated, the steering shaft 155 rotates in a state integrated with the storage box 153.

Also, a movement bracket 158 is coupled with an unshown screw to the steering shaft 155. The bracket 158 has a coupling portion 158a, which extends in a direction perpendicular to a direction of an axis of rotation of the steering shaft 155 and is coupled to the steering shaft 155, and a gear meshing portion 158b, which extends forward from an upper end portion of the coupling portion 158a in the direction of the axis of rotation of the steering shaft 155 and in which a rack gear portion 158b1 is formed. A pinion gear 154a of a motor 154 provided in the vehicle 150 meshes with the rack gear portion 158b1.

The motor 154 is electrically connected to a CPU 161 (a control unit) provided in the vehicle 150, and rotates forward or rotates in reverse in accordance with a control by the CPU 161. When the motor 154 rotates forward, a driving force thereof is transmitted to the bracket 158 via the pinion gear 154a and the rack gear portion 158b1, and the bracket 158 moves rearward together with the steering shaft 155 and steering wheel 110 integrated with the bracket 158. Also, when the motor 154 rotates in reverse, the driving force thereof is transmitted to the bracket 158 via the pinion gear 154a and the rack gear portion 158b1, and the bracket 158 moves forward together with the steering shaft 155 and steering wheel 110 integrated with the bracket 158. In this way, the steering wheel 110 is configured in such a way as to be able to move in the forward and rearward directions.

The CPU 161 controls the motor 154 in accordance with an unshown button mounted in the vehicle 150 being operated, causing the steering wheel 110 to move forward or rearward. When operating the steering wheel 110, the driver M operates the unshown button, thereby causing the steering wheel 110 to move to the extended position shown in FIG. 9, which is a position for allowing the driver M to operate the steering wheel 110. Also, when not operating the steering wheel 110, such as when the vehicle 150 is stopped or while an automatic driving function is being executed, the driver M operates the unshown button, thereby causing the steering wheel 110 to move to the retracted position shown in FIG. 10, which is a position wherein the steering wheel 110 is retracted forward from the extended position. That is, the steering shaft 155, the bracket 158, and the motor 154 are a movement unit that causes the steering wheel 110 to move to the extended position and the retracted position, and the movement unit and the CPU 161 are included in the vehicle control device D.

Herein, the extended position is a position in which the steering wheel 110 is disposed in order for the driver M to operate the steering wheel 110 when driving normally, is commonly a rearward position when the steering wheel 110 is configured in such a way as to be able to move in the forward and rearward directions, and in the present embodiment, is the rearmost position to which the steering wheel 110 is moved. Also, the retracted position is a position in which the steering wheel 110 is disposed when the driver M does not normally operate the steering wheel 110 except in times of emergency, such as when the vehicle 150 is stopped or while an automatic driving function is being executed, is commonly a forward position when the steering wheel 110 is configured in such a way as to be able to move in the forward and rearward directions, and in the present embodiment, is the forwardmost position to which the steering wheel 110 is moved.

Also, the steering wheel 110 positioned in the retracted position is housed in an unshown storage space in an interior of the instrument panel 157 in a state in which approximately a rear half thereof is exposed to the exterior. A configuration wherein a whole of the steering wheel 110 positioned in the retracted position is exposed to the exterior may be adopted, or a configuration wherein the whole thereof is covered and not exposed to the exterior may be adopted. However, in order for the driver M to swiftly grip the steering wheel 110 at a time of emergency or the like, or to operate the operating levers 103 and 104, to be described hereafter, a configuration wherein at least one portion is exposed to the exterior is preferable.

Also, the vehicle control device D has a position sensor 159 (a position detecting portion) for detecting that the steering wheel 110 is positioned in a position other than the extended position. The position sensor 159 is configured of a light emitting unit 159a, which is attached to a lower face of the storage box 153 and emits infrared light, and a light receiving unit 159b, which is attached to an upper face of the storage box 153 and receives infrared light emitted from the light emitting unit 159a. The light receiving unit 159b is electrically connected to the CPU 161 via an unshown cable. When the steering wheel 110 is positioned in the extended position, infrared light emitted from the light emitting unit 159a reaches the light receiving unit 159b without being interrupted by the steering shaft 155, and the light receiving unit 159b receiving the infrared light outputs a high level signal. Meanwhile, when the steering wheel 110 is positioned in a position other than the extended position, that is, in the retracted position or in a position between the retracted position and the extended position, infrared light emitted from the light emitting unit 159a is interrupted by the steering shaft 155 and does not reach the light receiving unit 159b, because of which the light receiving unit 159b outputs a low level signal. The CPU 161 determines that the steering wheel 110 is positioned in the extended position when the light receiving unit 159b is outputting a high level signal, and determines that the steering wheel 110 is positioned in a position other than the extended position when the light receiving unit 159b is outputting a low level signal. Although an infrared light sensor is used as the position sensor 159 in the present embodiment, a configuration wherein another kind of sensor is used may be adopted.

Figure 11:
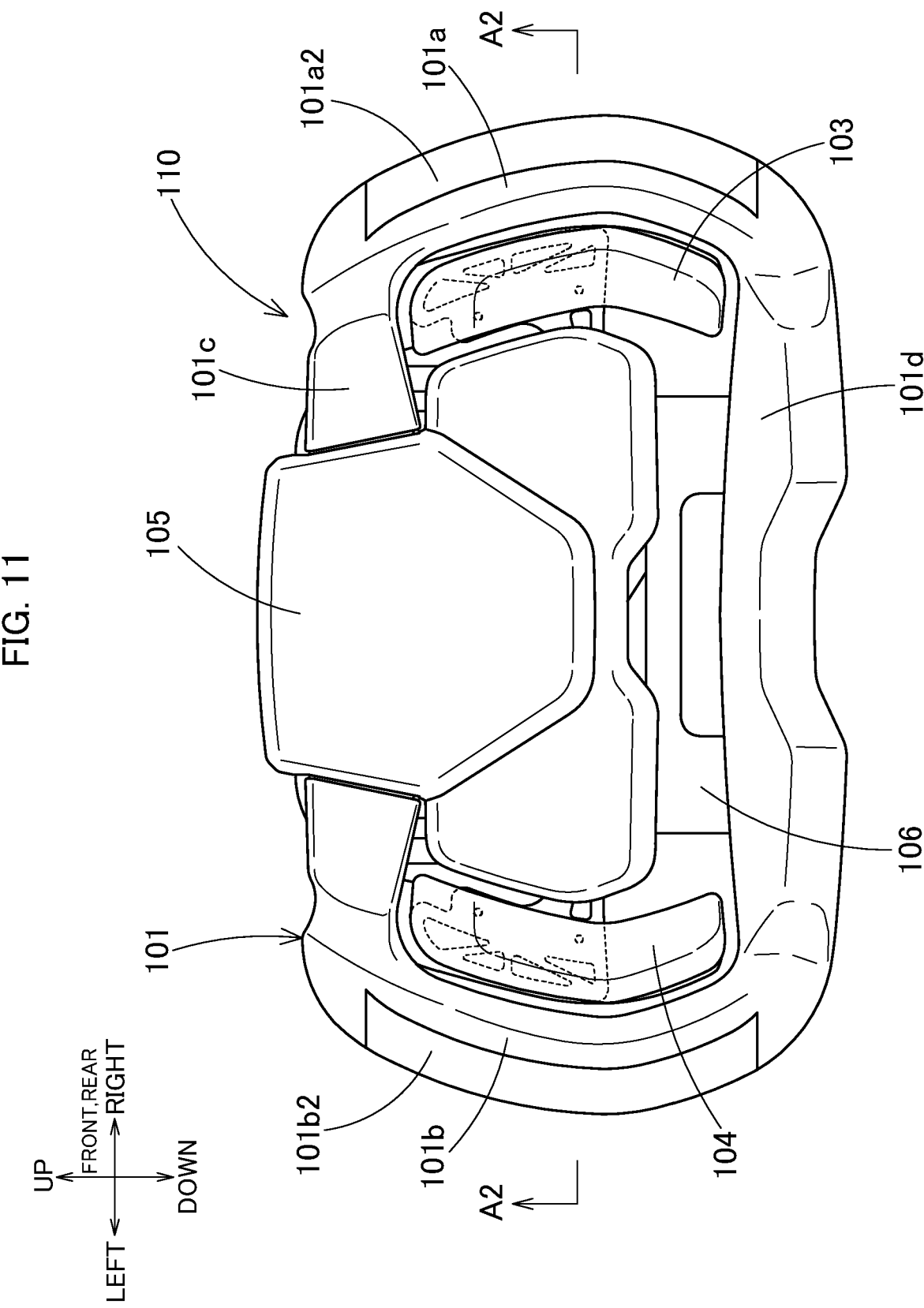
FIG. 11 is a front view of a steering wheel.
Figure 12:
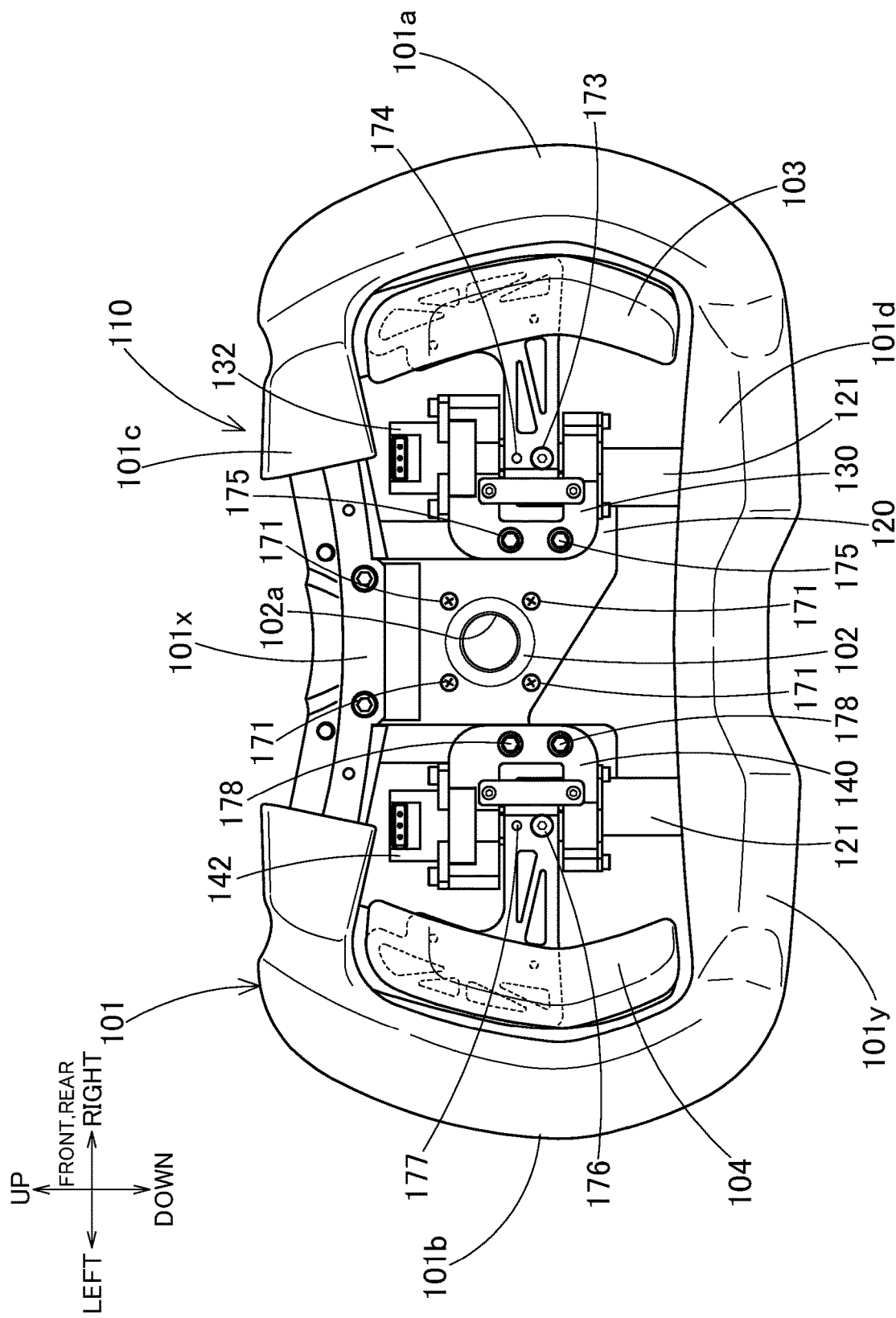
FIG. 12 is a front view of the steering wheel in a state in which a pad and a lower cover have been removed.
Figure 13:
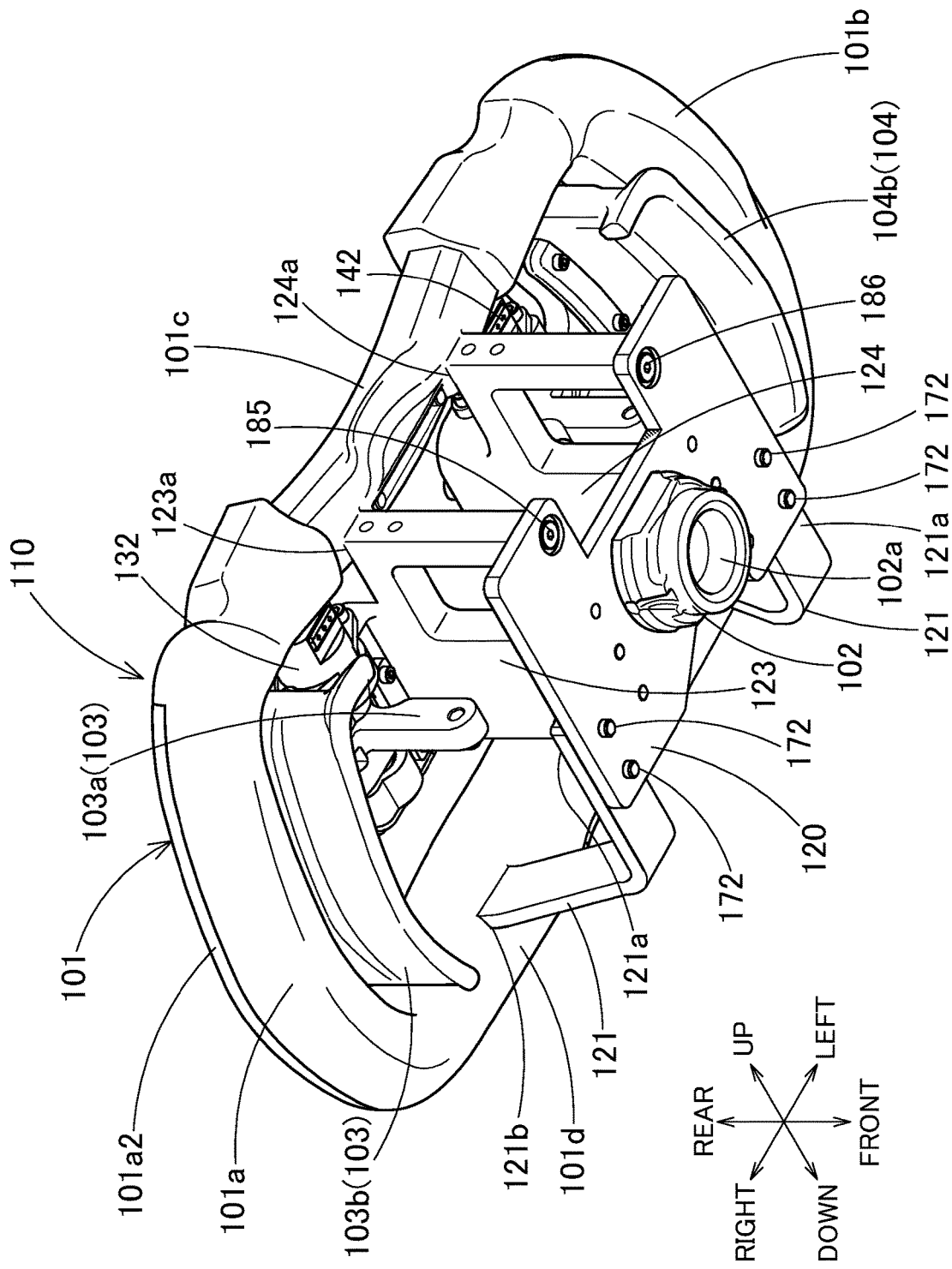
FIG. 13 is a perspective view of the steering wheel in a state in which the pad and the lower cover have been removed.
Figure 14:
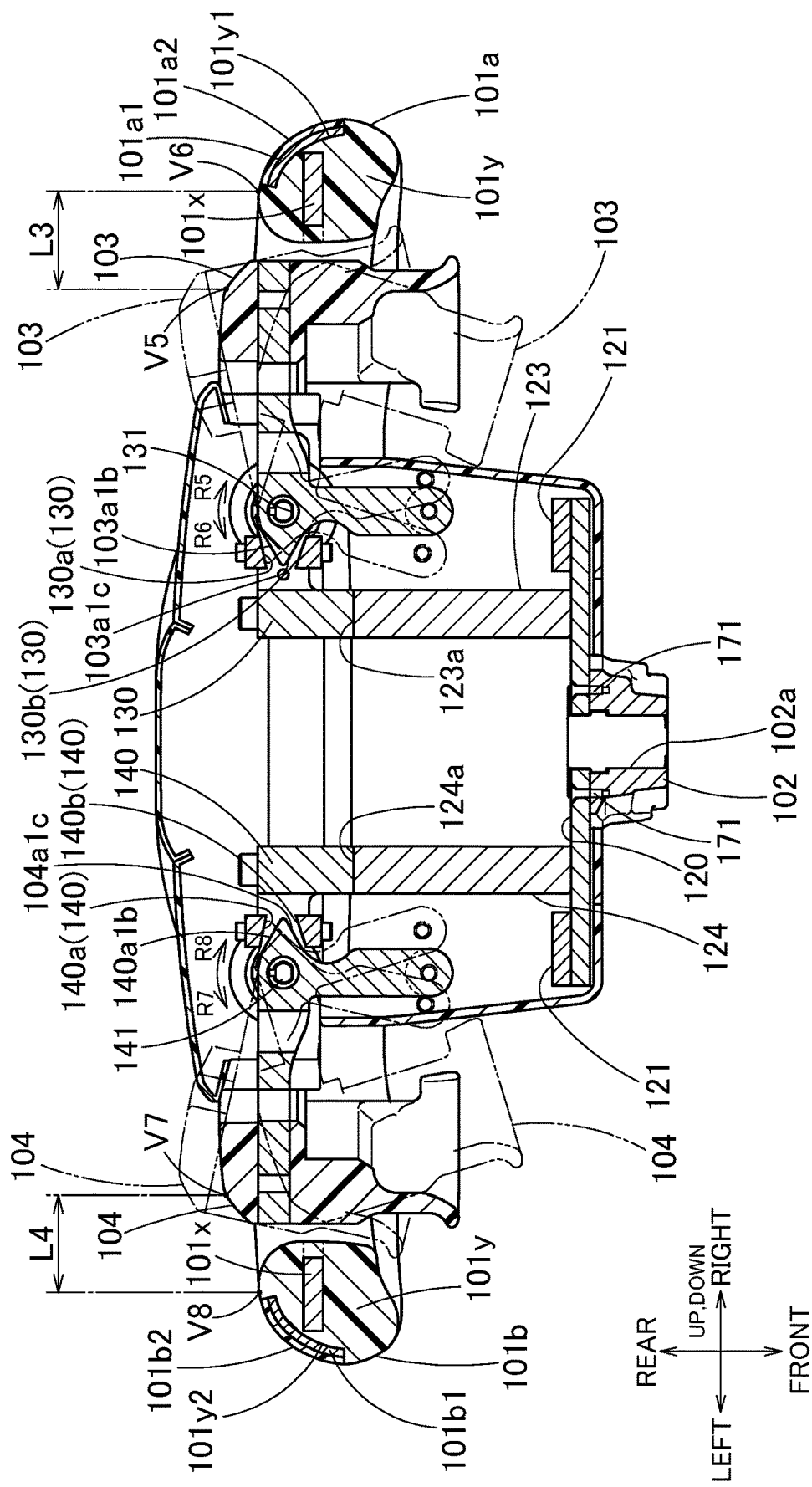
FIG. 14 is a sectional view wherein the steering wheel is cut along an A2-A2 cross-section shown in FIG. 11.
Figure 15:
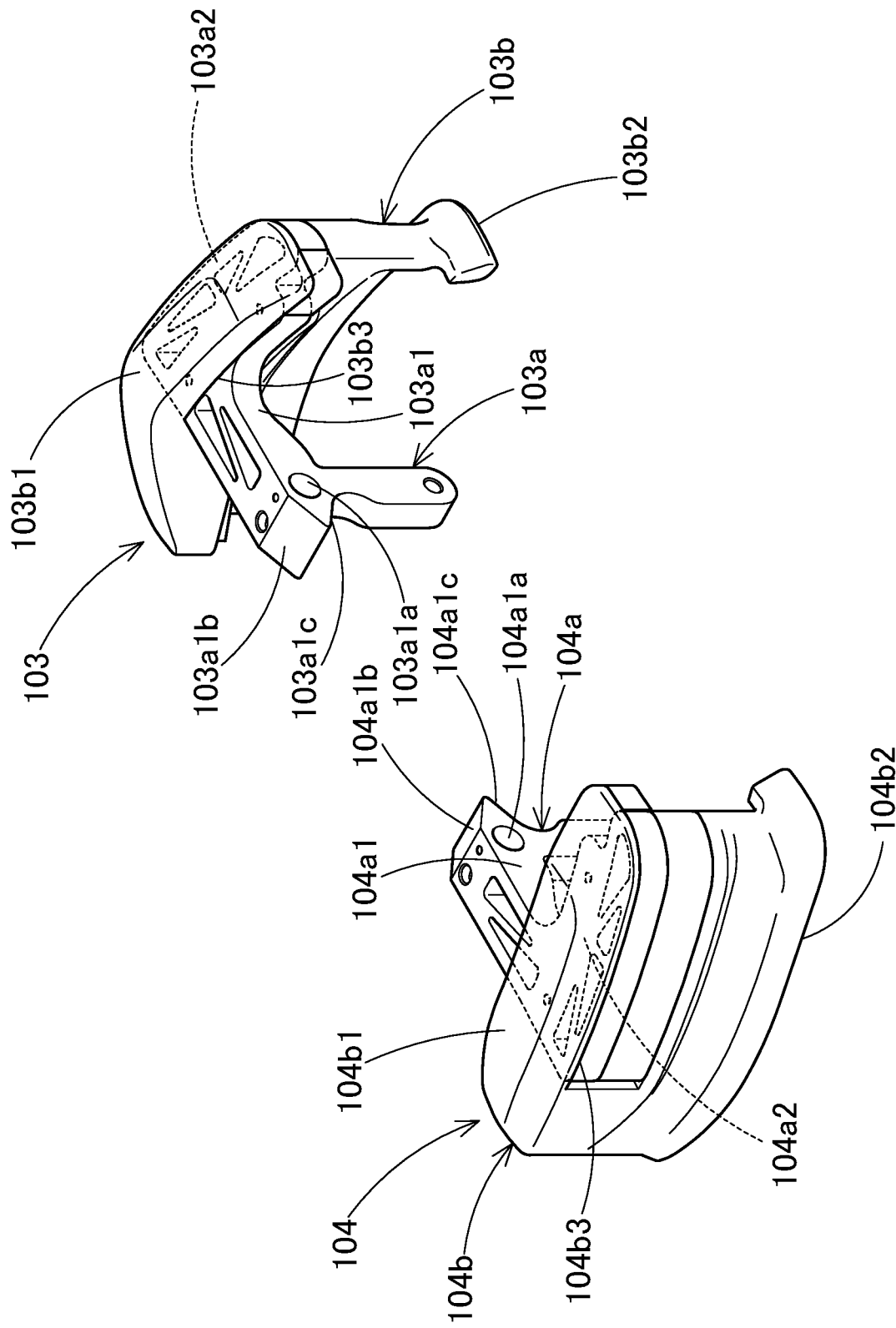
FIG. 15 is a perspective view of operating levers included in the steering wheel.

Next, a configuration of the steering wheel 110 will be described. FIG. 11 is a front view of the steering wheel 110. FIG. 12 is a front view of the steering wheel 110 in a state in which a pad 105 and a lower cover 106 have been removed. FIG. 13 is a perspective view of the steering wheel 110 in a state in which the pad 105 and the lower cover 106 have been removed. FIG. 14 is a sectional view wherein the steering wheel 110 is cut along an A2-A2 cross-section shown in FIG. 11. FIG. 15 is a perspective view of operating levers 103 and 104 included in the steering wheel 110.

As shown in FIGS. 11 to 15, the steering wheel 110 includes a boss portion 102, which is to be coupled to the steering shaft 155, and a steering portion 101, which is disposed in a periphery of the boss portion 102, and is rotationally operated by being gripped by the driver M. Also, the steering wheel 110 includes the pad 105, which covers a region behind the boss portion 102, and the lower cover 106, which is disposed on a front face side of the steering wheel 110. Also, the steering wheel 110 includes the operating levers 103 and 104, which are disposed one each on a left and a right of the boss portion 102, and are operated by the driver M in order to cause the vehicle 150 to accelerate or decelerate.

The steering portion 101 is a member of an approximately elliptical form having a left-right direction as a long axis, and, except for a portion of an upper coupling portion 101c, to be described hereafter, covered by the pad 105, is formed of a core metal 101x made of metal and a resin cover 101y that covers the core metal 101x. A region of the steering portion 101 on the right side of the boss portion 102 is a gripping portion 101a (a first gripping portion) gripped by the right hand of the driver M when driving normally. A region of the steering portion 101 on the left side of the boss portion 102 is a gripping portion 101b (a second gripping portion) gripped by the left hand of the driver M when driving normally. The gripping portion 101a and the gripping portion 101b are coupled by the upper coupling portion 101c, which extends in the left and right directions in an upper portion of the steering portion 101, and are coupled by a lower coupling portion 101d, which extends in the left and right directions in a lower portion of the steering portion 101. The portion of the upper coupling portion 101c covered by the pad 105 is formed of only the core metal 101x with no resin cover 101y.

A touch sensor 101a1 (a contact detecting portion, a first contact detecting portion), which detects contact with the gripping portion 101a by the driver M, is provided in the gripping portion 101a. The touch sensor 101a1 is affixed with an adhesive to an outer peripheral portion of a recessed portion 101y1 formed in the gripping portion 101a portion of the resin cover 101y. A cover member 101a2 made of resin is affixed with an adhesive to an outer peripheral portion of the touch sensor 101a1 in order that the touch sensor 101a1 is not exposed to the exterior. In the present embodiment, a capacitive type of sensor is used as the touch sensor 101a1, and the touch sensor 101a1 is configured of an electrode, a detection circuit that detects a capacitance, a sheet-form substrate that holds the electrode and the detection circuit, and the like. The detection circuit of the touch sensor 101a1 is electrically connected to the CPU 161 shown in FIG. 9 via an unshown cable. A configuration wherein another type of sensor, such as a pressure sensor or an infrared sensor, is used as the touch sensor 101a1 may be adopted.

A touch sensor 101b1 (a contact detecting portion, a second contact detecting portion), which detects contact with the gripping portion 101b by the driver M, is provided in the gripping portion 101b. The touch sensor 101b1 is affixed with an adhesive to an outer peripheral portion of a recessed portion 101y2 formed in the gripping portion 101b portion of the resin cover 101y. A cover member 101b2 made of resin is affixed with an adhesive to an outer peripheral portion of the touch sensor 101b1 in order that the touch sensor 101b1 is not exposed to the exterior. In the present embodiment, a capacitive type of sensor is used as the touch sensor 101b1, and the touch sensor 101b1 is configured of an electrode, a detection circuit that detects a capacitance, a sheet-form substrate that holds the electrode and the detection circuit, and the like. The detection circuit of the touch sensor 101b1 is electrically connected to the CPU 161 shown in FIG. 9 via an unshown cable. A configuration wherein another type of sensor, such as a pressure sensor or an infrared sensor, is used as the touch sensor 101b1 may be adopted.

The boss portion 102 is a metal member disposed in an approximate center of the steering wheel 110, is supported in a supporting metal plate 120 by being fitted into an unshown boss supporting hole in the supporting metal plate 120, which is a flat metal plate, and is fixed to the supporting metal plate 120 with a screw 171. The boss portion 102 has a shaft hole 102a into which the steering shaft 155 is fully inserted and fitted. The boss portion 102 and the steering shaft 155 are coupled by the leading end of the steering shaft 155 being fixed with a nut in a state in which the leading end of the steering shaft 155 is inserted through and fitted into the shaft hole 102a of the boss portion 102.

Also, the boss portion 102 is coupled to the steering portion 101 across the supporting metal plate 120, two coupling members 121, and supporting stands 123 and 124. The coupling member 121 is a metal plate that has been bent into an L-form, one end portion 121a thereof is fixed to the supporting metal plate 120 with a screw 172, and an other end portion 121b is fixed to a lower face of the core metal 101x of the steering portion 101 with an unshown screw. The supporting stands 123 and 124 are metal members that extend in the forward and rearward directions, front end portions thereof are fixed to the supporting metal plate 120 with screws 185 and 186 respectively, and rear end portions are fixed to a lower face of the upper coupling portion 101c of the steering portion 101 with unshown screws. In this way, the boss portion 102 and the steering portion 101 are coupled. The supporting stand 123 is coupled to the upper coupling portion 101c of the steering portion 101 in a portion on an upper side of the rear end portion thereof, and is coupled to a lever supporting member 130, to be described hereafter, in a portion on a lower side. Similarly, the supporting stand 124 is coupled to the upper coupling portion 101c of the steering portion 101 in a portion on an upper side of the rear end portion thereof, and is coupled to a lever supporting member 140, to be described hereafter, in a portion on a lower side.

The driver M changes a direction of travel of the vehicle 150 by gripping the gripping portion 101a with the right hand, gripping the gripping portion 101b with the left hand, and rotationally operating the steering portion 101, centered on the steering shaft 155 coupled to the boss portion 102. In the present embodiment, the vehicle 150 is such that a steer-by-wire system is mounted, an angle of rotation of the steering shaft 155, which rotates in accordance with a rotational operating of the steering portion 101, is detected by an unshown sensor, and the vehicle 150 changes the direction of travel by causing wheels to turn in accordance with a result of the detection. The vehicle 150 may also be of a configuration such that the wheels are mechanically caused to turn via the steering shaft 155 when the steering wheel 110 is rotationally operated.

The operating lever 103 (an operating portion, a first operating portion) is disposed in a vicinity of the gripping portion 101a, and is configured in such a way as to be able to pivot with respect to the gripping portion 101a. Specifically, the operating lever 103 is disposed in a position to the right of the boss portion 102 and neighboring the gripping portion 101a on an inner side of the steering portion 101. Also, in order that the operating lever 103 can be operated with the right hand in a state in which the driver M grips the gripping portion 101a with the right hand, a distance L3 between a switching point V5 between an upper face and an inclined face of the operating lever 103 and an apex V6 on the rear side of the gripping portion 101a is set to be within 40 mm. Provided that the operating lever 103 is disposed in a vicinity of the steering portion 101, the operating lever 103 may also be disposed on an outer side of the steering portion 101. Owing to the operating lever 103 being disposed on the inner side of the steering portion 101, however, the operating lever 103 does not protrude to the outer side of the steering portion 101, and a freedom of disposition of members in a periphery of the steering wheel 110 can be increased, meaning that the operating lever 103 is preferably disposed on the inner side of the steering portion 101.

The operating lever 103 is configured of a metal core metal 103a and a resin operating cover 103b, and is supported by the lever supporting member 130. The lever supporting member 130 is fixed to a rear end portion 123a of the supporting stand 123 with a screw 175, supports a pivot shaft 131 in a state able to rotate in an interior of the lever supporting member 130, and supports the operating lever 103 across the pivot shaft 131. The core metal 103a has a supported portion 103a1, which extends in the left and right directions and is supported by the pivot shaft 131, and a cover attachment portion 103a2, which extends in the upward and downward directions from a right end portion of the supported portion 103a1 and to which the operating cover 103b is attached. A shaft hole 103a1a is formed in the supported portion 103a1 of the core metal 103a, and the pivot shaft 131 is inserted through the shaft hole 103a1a. The supported portion 103a1 and the pivot shaft 131 are fixed with a screw 173 and a positioning pin 174 in such a way as not to move relative to each other. In this way, the operating lever 103 is configured in such a way as to be able to pivot in an arrow R5 direction shown in FIG. 14, and in an arrow R6 direction opposite to the arrow R5 direction, centered on the pivot shaft 131.

Also, a pivoting in the arrow R5 direction of the operating lever 103 is regulated to a predetermined pivoting angle by a regulating face 103a1b formed in the supported portion 103a1 of the core metal 103a coming into contact with a pivot regulating portion 130a of the lever supporting member 130. Also, a pivoting in the arrow R6 direction of the operating lever 103 is regulated to a predetermined angle of pivot by a regulating face 103a1c formed in the supported portion 103a1 of the core metal 103a coming into contact with a pivot regulating portion 130b of the lever supporting member 130. Also, a magnetic lever sensor 132 (an operation detecting portion, a first operation detecting portion) that detects an angle of rotation of the pivot shaft 131 is attached to the lever supporting member 130 in a vicinity of the pivot shaft 131. By detecting the angle of rotation of the pivot shaft 131, the lever sensor 132 detects that the operating lever 103 has been operated by the driver M, and detects an angle of pivot, which is an operation amount, of the operating lever 103. The lever sensor 132 is electrically connected to the CPU 161 shown in FIG. 9 via an unshown cable. Although a magnetic rotation angle sensor is used as the lever sensor 132 in the present embodiment, a configuration wherein another sensor that can detect an operation amount of the operating lever 103 is used may be adopted.

The operating cover 103b has an accelerator operating face 103b1, which is a region on a rear face side of the operating cover 103b and is a region pressed by the palm or the thumb of the right hand when the driver M carries out an operation of causing the vehicle 150 to accelerate, a brake operating face 103b2, which is a region on a front face side and is pressed by the four fingers other than the thumb when the driver M causes the vehicle 150 to decelerate, and a fitting hole 103b3 into which the cover attachment portion 103a2 of the core metal 103a is fitted, and fixed with an unshown screw. In order to improve operability for the driver M, at least one portion of the accelerator operating face 103b1 of the operating cover 103b is positioned rearward with respect to a rear end face of the gripping portion 101a, and at least one portion of the brake operating face 103b2 is positioned forward with respect to a front end face of the gripping portion 101a.

The driver M carries out an acceleration operation, causing the vehicle 150 to accelerate, by pressing the accelerator operating face 103b1 of the operating lever 103 forward with the palm or the thumb of the right hand, causing the operating lever 103 to pivot in the arrow R5 direction (a first direction). Also, the driver M carries out a braking operation, causing the vehicle 150 to decelerate, by pressing the brake operating face 103b2 of the operating lever 103 rearward with the four fingers other than the thumb, causing the operating lever 103 to pivot in the arrow R6 direction (a second direction). A method of controlling speed of the vehicle 150 when an acceleration operation or a braking operation is carried out will be described hereafter.

The operating lever 104 (an operating portion, a second operating portion) is a member having bilateral symmetry with the operating lever 103, is disposed in a position bilaterally symmetrical to the operating lever 103 with the boss portion 102 as a reference, and carries out an operation bilaterally symmetrical to that of the operating lever 103. That is, the operating lever 104 is disposed in a vicinity of the gripping portion 101b, and is configured in such a way as to be able to pivot with respect to the gripping portion 101b. Specifically, the operating lever 104 is disposed in a position to the left of the boss portion 102 and neighboring the gripping portion 101b on the inner side of the steering portion 101. Also, in order that the operating lever 104 can be operated with the left hand in a state in which the driver M grips the gripping portion 101b with the left hand, a distance L4 between a switching point V7 between an upper face and an inclined face of the operating lever 104 and an apex V8 on the rear side of the gripping portion 101b is set to be within 40 mm. Provided that the operating lever 104 is disposed in a vicinity of the steering portion 101, the operating lever 104 may also be disposed on the outer side of the steering portion 101. Owing to the operating lever 104 being disposed on the inner side of the steering portion 101, however, the operating lever 104 does not protrude to the outer side of the steering portion 101, and a freedom of disposition of members in the periphery of the steering wheel 110 can be increased, meaning that the operating lever 104 is preferably disposed on the inner side of the steering portion 101.

The operating lever 104 is configured of a metal core metal 104a and a resin operating cover 104b, and is supported by the lever supporting member 140. The lever supporting member 140 is fixed to a rear end portion 124a of the supporting stand 124 with a screw 178, supports a pivot shaft 141 in a state able to rotate in an interior of the lever supporting member 140, and supports the operating lever 104 across the pivot shaft 141. The core metal 104a has a supported portion 104*a*l, which extends in the left and right directions and is supported by the pivot shaft 141, and a cover attachment portion 104*a*2, which extends in the upward and downward directions from a right end portion of the supported portion 104*a*l and to which the operating cover 104*b* is attached. A shaft hole 104*a*1*a* is formed in the supported portion 104*a*l of the core metal 104*a*, and the pivot shaft 141 is inserted through the shaft hole 104*a*1*a*. The supported portion 104*a*l and the pivot shaft 141 are fixed with a screw 176 and a positioning pin 177 in such a way as not to move relative to each other. In this way, the operating lever 104 is configured in such a way as to be able to pivot in an arrow R7 direction shown in FIG. 14, and in an arrow R8 direction opposite to the arrow R7 direction, centered on the pivot shaft 141.

Also, a pivoting in the arrow R7 direction of the operating lever 104 is regulated to a predetermined pivoting angle by a regulating face 104*a*1*b* formed in the supported portion 104*a*l of the core metal 104*a* coming into contact with a pivot regulating portion 140*a* of the lever supporting member 140. Also, a pivoting in the arrow R8 direction of the operating lever 104 is regulated to a predetermined angle of pivot by a regulating face 104*a*1*c* formed in the supported portion 104*a*l of the core metal 104*a* coming into contact with a pivot regulating portion 140*b* of the lever supporting member 140. Also, a magnetic lever sensor 142 (an operation detecting portion, a second operation detecting portion) that detects an angle of rotation of the pivot shaft 141 is attached to the lever supporting member 140 in a vicinity of the pivot shaft 141. By detecting the angle of rotation of the pivot shaft 141, the lever sensor 142 detects that the operating lever 104 has been operated by the driver M, and detects an angle of pivot, which is an operation amount, of the operating lever 104. The lever sensor 142 is electrically connected to the CPU 161 shown in FIG. 9 via an unshown cable. Although a magnetic rotation angle sensor is used as the lever sensor 142 in the present embodiment, a configuration wherein another sensor that can detect an operation amount of the operating lever 104 is used may be adopted.

The operating cover 104*b* has an accelerator operating face 104*b*1, which is a region on a rear face side of the operating cover 104*b* and is a region pressed by the palm or the thumb of the left hand when the driver M carries out an operation of causing the vehicle 150 to accelerate, a brake operating face 104*b*2, which is a region on a front face side and is pressed by the four fingers other than the thumb when the driver M causes the vehicle 150 to decelerate, and a fitting hole 104*b*3 into which the cover attachment portion 104*a*2 of the core metal 104*a* is fitted, and fixed with an unshown screw. In order to improve operability for the driver M, at least one portion of the accelerator operating face 104*b*1 of the operating cover 104*b* is positioned rearward with respect to a rear end face of the gripping portion 101*b*, and at least one portion of the brake operating face 104*b*2 is positioned forward with respect to a front end face of the gripping portion 101*b*.

The driver M carries out an acceleration operation, causing the vehicle 150 to accelerate, by pressing the accelerator operating face 104*b*1 of the operating lever 104 forward with the palm or the thumb of the left hand, causing the operating lever 104 to pivot in the arrow R7 direction (a third direction). Also, the driver M carries out a braking operation, causing the vehicle 150 to decelerate, by pressing the brake operating face 104*b*2 of the operating lever 104 rearward with the four fingers other than the thumb, causing the operating lever 104 to pivot in the arrow R8 direction (a fourth direction). A method of controlling speed of the vehicle 150 when an acceleration operation or a braking operation is carried out will be described hereafter.

In this way, the steering wheel 110 of the present embodiment is such that an acceleration operation for causing the vehicle 150 to accelerate is carried out by the operating lever 103 being pivoted in the arrow R5 direction, and a braking operation for causing the vehicle 150 to decelerate is carried out by the operating lever 103 being pivoted in the arrow R6 direction. Similarly, an acceleration operation for causing the vehicle 150 to accelerate is carried out by the operating lever 104 being pivoted in the arrow R7 direction, and a braking operation for causing the vehicle 150 to decelerate is carried out by the operating lever 104 being pivoted in the arrow R8 direction. Because of this, the driver M can carry out both an acceleration operation and a braking operation without changing a grip between the operating levers 103 and 104, meaning that a driving operation by the driver M can be restricted from becoming more complex.

In the present embodiment, a description has been given of a configuration wherein an acceleration operation is carried out by the operating levers 103 and 104 being pivoted in the arrow R5 direction and the arrow R7 direction, and a braking operation is carried out by the operating levers 103 and 104 being pivoted in the arrow R6 direction and the arrow R8 direction opposite to the arrow R5 direction and the arrow R7 direction. The present disclosure not being limited to this, however, pivoting directions of the operating levers 103 and 104 when an acceleration operation is carried out and when a braking operation is carried out may be reversed. This is decided by, for example, the following points being considered. That is, when driving, a frequency of an acceleration operation is generally greater than a frequency of a braking operation. Also, as the driver M drives with a forward leaning posture, utilizing his or her own weight to press the operating levers 103 and 104 using a palm or a thumb causes pivoting more easily than pressing the operating levers 103 and 104 using the four fingers other than the thumb. Consequently, by adopting the pivoting directions of the present embodiment, the driver M can comfortably carry out an acceleration operation, whose frequency is relatively high, because of which an operating burden on the driver M can be reduced. Meanwhile, for example, when the vehicle 150 has a constant speed control function of traveling at a speed set by the driver M, the frequency of a braking operation becomes greater than the frequency of an acceleration operation during the control. In this case, the driver M can comfortably carry out a braking operation, whose frequency is relatively high, by the pivoting directions when an acceleration operation is carried out and when a braking operation is carried out being reversed with respect to the directions of the present embodiment, because of which an operating burden on the driver M can be reduced. Taking these points and the like into consideration, a relationship between the pivoting directions of the operating levers 103 and 104 and an acceleration operation and braking operation is decided.

Figure 16:
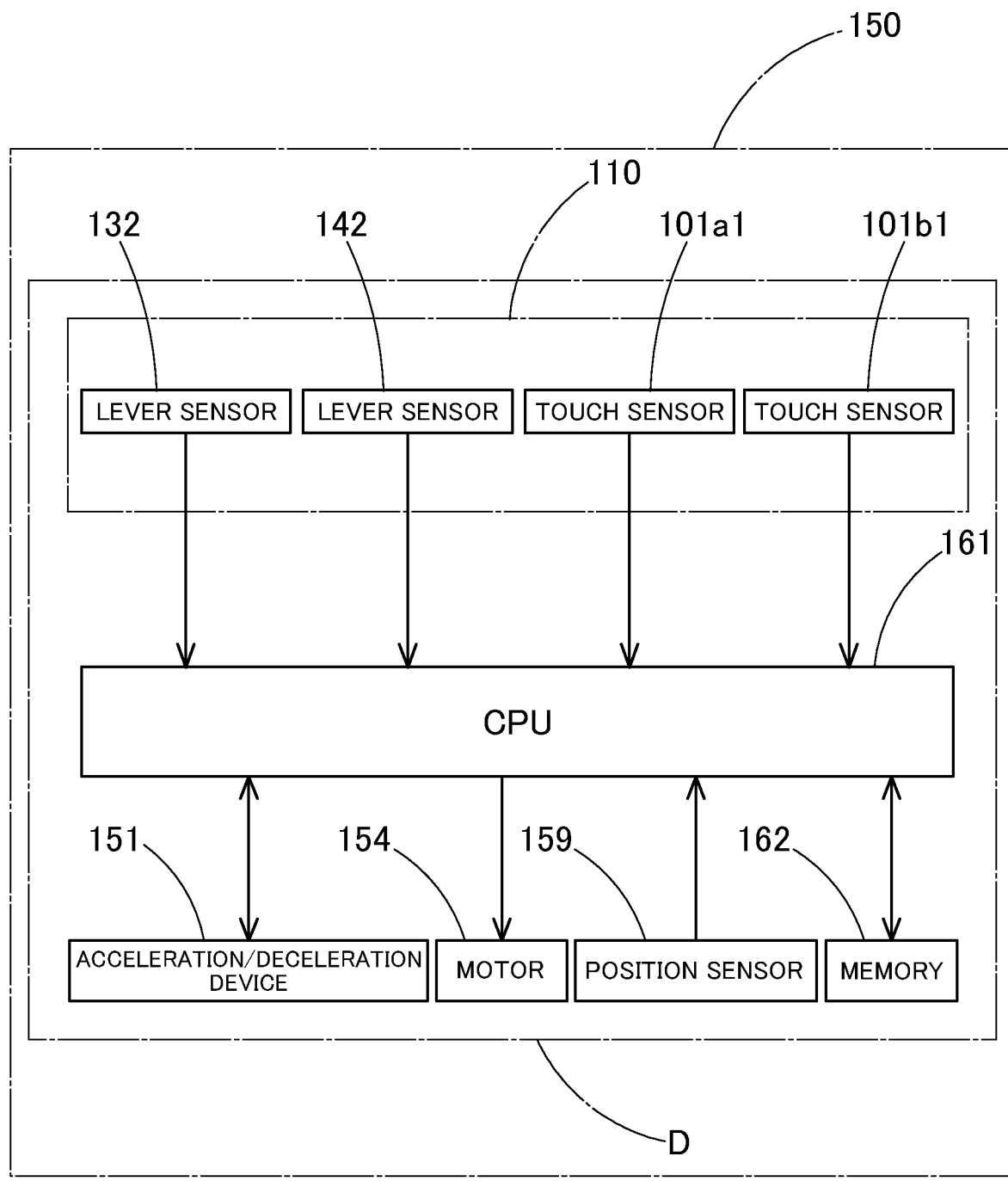
FIG. 16 is a block diagram showing a system configuration of the vehicle control device.

Next, a system configuration of the vehicle control device D will be described. FIG. 16 is a block diagram showing a system configuration of the vehicle control device D. As shown in FIG. 16, the vehicle control device D includes a memory 162, in which various kinds of control program, data, and the like are stored, and the CPU 161, which is electrically connected to the memory 162 and controls each member in accordance with a control program stored in the memory 162. Although the CPU 161 and the memory 162 are provided in the vehicle 150 in the present embodiment, a configuration wherein the CPU 161 and the memory 162 are provided in the steering wheel 110 may be adopted.

The touch sensors 101a1 and 101b1 of the steering wheel 110 are electrically connected to the CPU 161. The touch sensors 101a1 and 101b1 output a low level signal when a capacitance detected by a detection circuit thereof is less than a threshold, and output a high level signal when the capacitance is equal to or greater than the threshold. When the driver M comes into contact with the gripping portions 101a and 101b, the capacitance detected by the detection circuit of the touch sensors 101a1 and 101b1 rises. This means that the touch sensors 101a1 and 101b1 output a low level signal in a state in which the driver M is not in contact with the gripping portions 101a and 101b, and output a high level signal in a state in which the driver M is in contact with the gripping portions 101a and 101b. The CPU 161 determines that the driver M is not in contact with the gripping portion 101a when receiving a low level signal from the touch sensor 101a1, and determines that the driver M is in contact with the gripping portion 101a when receiving a high level signal. Similarly, the CPU 161 determines that the driver M is not in contact with the gripping portion 101b when receiving a low level signal from the touch sensor 101b1, and determines that the driver M is in contact with the gripping portion 101b when receiving a high level signal. In other words, a state in which the touch sensor 101a1 is outputting a high level signal is a state in which the touch sensor 101a1 is detecting contact by the driver M with the gripping portion 101a, and a state in which the touch sensor 101a1 is outputting a low level signal is a state in which the touch sensor 101a1 is not detecting contact by the driver M with the gripping portion 101a. Similarly, a state in which the touch sensor 101b1 is outputting a high level signal is a state in which the touch sensor 101b1 is detecting contact by the driver M with the gripping portion 101b, and a state in which the touch sensor 101b1 is outputting a low level signal is a state in which the touch sensor 101b1 is not detecting contact by the driver M with the gripping portion 101b.

Also, the lever sensors 132 and 142 of the steering wheel 110 are electrically connected to the CPU 161. The lever sensor 132 transmits an angle of rotation of the pivot shaft 131 when the operating lever 103 is pivoted in the arrow R5 direction or the arrow R6 direction shown in FIG. 14 to the CPU 161 as a signal. Similarly, the lever sensor 142 transmits an angle of rotation of the pivot shaft 141 when the operating lever 104 is pivoted in the arrow R7 direction or the arrow R8 direction shown in FIG. 14 to the CPU 161 as a signal. The CPU 161 determines that the operating lever 103 or 104 has been operated, and determines an angle of pivot, which is an operation amount, of the operating lever 103 or 104, based on a signal received from the lever sensor 132 or 142.

Also, the motor 154 and position sensor 159 provided in the vehicle 150 are electrically connected to the CPU 161. As heretofore described, the CPU 161 causes the steering wheel 110 to move to the rearward extended position by causing the motor 154 to rotate forward, and causes the steering wheel 110 to move to the forward retracted position by causing the motor 154 to rotate in reverse. Also, the CPU 161 determines that the steering wheel 110 is positioned in the extended position when the light receiving unit 159b of the position sensor 159 is outputting a high level signal, and determines that the steering wheel 110 is positioned in a position other than the extended position when the light receiving unit 159b is outputting a low level signal. In other words, a state in which the position sensor 159 is outputting a high level signal is a state in which the position sensor 159 is detecting that the steering wheel 110 is positioned in the extended position, and a state in which the position sensor 159 is outputting a low level signal is a state in which the position sensor 159 is detecting that the steering wheel 110 is positioned in a position other than the extended position.

Also, an acceleration/deceleration device 151, which is mounted in the vehicle 150 and carries out an acceleration or a deceleration of the vehicle 150, is electrically connected to the CPU 161. The acceleration/deceleration device 151 includes a driving force control device and a braking force control device. The braking force control device is, for example, an unshown brake pad of the vehicle 150. Also, the driving force control device is a motor or the like when the vehicle 150 is an electric vehicle, an engine or the like when the vehicle 150 is a gasoline-powered vehicle, and a hydrogen engine or the like when the vehicle 150 is a hydrogen-powered vehicle. The CPU 161 executes an acceleration control, causing the vehicle 150 to accelerate, or a deceleration control, causing the vehicle 150 to decelerate, via a control by the acceleration/deceleration device 151.

Next, a control by the CPU 161 when the operating levers 103 and 104 are operated in a state in which the steering wheel 110 is positioned in the extended position will be described. When the operating lever 103 is pivoted in the arrow R5 direction shown in FIG. 14 in a state in which the position sensor 159 is detecting that the steering wheel 110 is positioned in the extended position, the CPU 161 controls the vehicle 150 in such a way as to accelerate by controlling the acceleration/deceleration device 151 in accordance with an angle of rotation of the pivot shaft 131 detected by the lever sensor 132. Specifically, the CPU 161 controls the vehicle 150 in such a way as to accelerate via the acceleration/deceleration device 151 in such a way that the greater the angle of rotation of the pivot shaft 131 detected by the lever sensor 132, the greater the acceleration of the vehicle 150. Also, when the operating lever 103 is pivoted in the arrow R6 direction shown in FIG. 14 in a state in which the position sensor 159 is detecting that the steering wheel 110 is positioned in the extended position, the CPU 161 controls the vehicle 150 in such a way as the to decelerate by controlling acceleration/deceleration device 151 in accordance with an angle of rotation of the pivot shaft 131 detected by the lever sensor 132. Specifically, the CPU 161 controls the vehicle 150 in such a way as to decelerate via the acceleration/deceleration device 151 in such a way that the greater the angle of rotation of the pivot shaft 131 detected by the lever sensor 132, the greater the deceleration of the vehicle 150.

Similarly, when the operating lever 104 is pivoted in the arrow R7 direction shown in FIG. 14 in a state in which the position sensor 159 is detecting that the steering wheel 110 is positioned in the extended position, the CPU 161 controls the vehicle 150 in such a way as to accelerate by controlling the acceleration/deceleration device 151 in accordance with an angle of rotation of the pivot shaft 141 detected by the lever sensor 142. Specifically, the CPU 161 controls the vehicle 150 in such a way as to accelerate via the acceleration/deceleration device 151 in such a way that the greater the angle of rotation of the pivot shaft 141 detected by the lever sensor 142, the greater the acceleration of the vehicle 150. Also, when the operating lever 104 is pivoted in the arrow R8 direction shown in FIG. 14 in a state in which the position sensor 159 is detecting that the steering wheel 110 is positioned in the extended position, the CPU 161 controls the vehicle 150 in such a way as to decelerate by controlling the acceleration/deceleration device 151 in accordance with an angle of rotation of the pivot shaft 141 detected by the lever sensor 142. Specifically, the CPU 161 controls the vehicle 150 in such a way as to decelerate via the acceleration/deceleration device 151 in such a way that the greater the angle of rotation of the pivot shaft 141 detected by the lever sensor 142, the greater the deceleration of the vehicle 150.

Next, a control by the CPU 161 when the operating levers 103 and 104 are operated in a state in which the steering wheel 110 is positioned in a position other than the extended position, that is, in the retracted position or in a position between the extended position and the retracted position, will be described.

Although it is not normally expected that the driver M will operate the steering wheel 110 or operate the operating levers 103 and 104 when the steering wheel 110 is positioned in a position other than the extended position, it is desirable to arrange that steering or an operation of the operating levers 103 and 104 can be carried out in a time of emergency. Meanwhile, when the steering wheel 110 is positioned in a position other than the extended position, it is expected that awareness of the driver M with respect to the steering wheel 110 is lower than when the steering wheel 110 is positioned in the extended position, which can be said to be a situation in which the driver M is liable to unexpectedly touch the operating levers 103 and 104. This means that when the CPU 161 executes an acceleration control and a deceleration control in accordance with an operation of the operating levers 103 and 104 in the same way as when the steering wheel 110 is positioned in the extended position when the steering wheel 110 is positioned in a position other than the extended position, there is concern that the vehicle 150 will carry out an operation unintended by the driver M when the driver M unexpectedly touches the operating levers 103 and 104.

Therefore, in order to restrict the vehicle 150 from carrying out an operation unintended by the driver M when the steering wheel 110 is positioned in a position other than the extended position, the CPU 161 executes a misoperation prevention sequence. Specifically, the CPU 161 executes a misoperation prevention sequence when determining that the steering wheel 110 is positioned in a position other than the extended position based on a signal received from the position sensor 159, in addition to determining that the operating lever 103 or the operating lever 104 has been operated based on a signal received from the lever sensor 132 or 142. Hereafter, the misoperation prevention sequence will be described, using a flowchart shown in FIG. 17.

Figure 17:
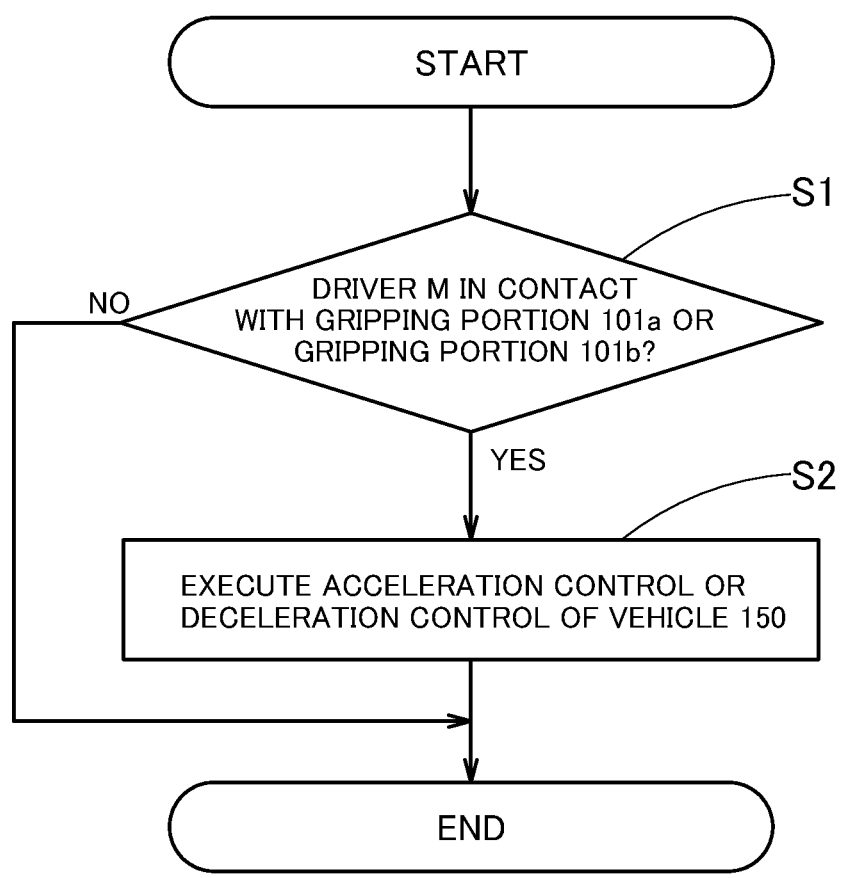
FIG. 17 is a flowchart showing a misoperation prevention sequence.

Firstly, as shown in FIG. 17, the CPU 161 determines whether the driver M is in contact with the gripping portion 101a or the gripping portion 101b based on a signal received from the touch sensor 101a1 or 101b1 (S1). When determining that the driver M is in contact with neither the gripping portion 101a nor the gripping portion 101b, the CPU 161 ends the misoperation prevention sequence without executing an acceleration control or a deceleration control of the vehicle 150 based on an operation of the operating lever 103 or 104.

Meanwhile, when determining that the driver M is in contact with the gripping portion 101a or the gripping portion 101b, the CPU 161 executes an acceleration control or a deceleration control of the vehicle 150 by controlling the acceleration/deceleration device 151 in accordance with an angle of rotation of the pivot shaft 131 or 141 detected by the lever sensor 132 or 142 (S2). Subsequently, the CPU 161 ends the misoperation prevention sequence.

In this way, when the operating lever 103 or 104 is operated in a state in which the steering wheel 110 is positioned in a position other than the extended position and the driver M is in contact with neither the gripping portion 101a nor the gripping portion 101b, the CPU 161 does not execute an acceleration control or a deceleration control of the vehicle 150. This is for the following reason. That is, when the steering wheel 110 is positioned in a position other than the extended position, it is not normally expected that the driver M will operate the operating lever 103 or 104, but rather it is expected that an operation of the operating lever 103 or 104 by the driver M will be an operation in a time of emergency. It is expected that when the driver M operates the operating lever 103 or 104 in a time of emergency, the driver M will operate the operating lever 103 or 104 in a state in which the driver M is in contact with the gripping portion 101a or the gripping portion 101b. Conversely, when the operating lever 103 or 104 is operated in a situation in which this condition is not fulfilled, there is a possibility of a misoperation such as the driver M unexpectedly touches the operating lever 103 or 104. This means that by the CPU 161 executing the heretofore described control, the vehicle 150 can be restricted from carrying out an operation unintended by the driver M when the driver M unexpectedly touches the operating lever 103 or 104 in a state in which the steering wheel 110 is positioned in a position other than the extended position Also, when the operating lever 103 or 104 is operated in a state in which the steering wheel 110 is positioned in a position other than the extended position and the driver M is in contact with the gripping portion 101a or the gripping portion 101b, the CPU 161 executes an acceleration control or a deceleration control of the vehicle 150. This means that even when the steering wheel 110 is positioned in a position other than the extended position, the driver M can cause the vehicle 150 to accelerate or decelerate, because of which the driver M can react to a time of emergency or the like.

Third Embodiment

Next, the vehicle control device D according to a third embodiment of the present disclosure will be described. A description of portions duplicating the description of the second embodiment will be abbreviated, using identical reference signs.

The vehicle control device D according to the present embodiment differs from the vehicle control device D according to the second embodiment only in the details of the misoperation prevention sequence, while other configurations are identical. Because of this, only the details of the misoperation prevention sequence according to the present embodiment will be described hereafter, and a description of other configurations will be omitted.

In the same way as in the second embodiment, the CPU 161 executes a misoperation prevention sequence when determining that the steering wheel 110 is positioned in a position other than the extended position based on a signal received from the position sensor 159, in addition to determining that the operating lever 103 or the operating lever 104 has been operated based on a signal received from the lever sensor 132 or 142. Hereafter, the misoperation prevention sequence of the present embodiment will be described, using a flowchart shown in FIG. 18. In the following description, the same reference sign will be allotted to a process wherein the CPU 161 carries out a control the same as in the misoperation prevention sequence of the second embodiment.

Figure 18:
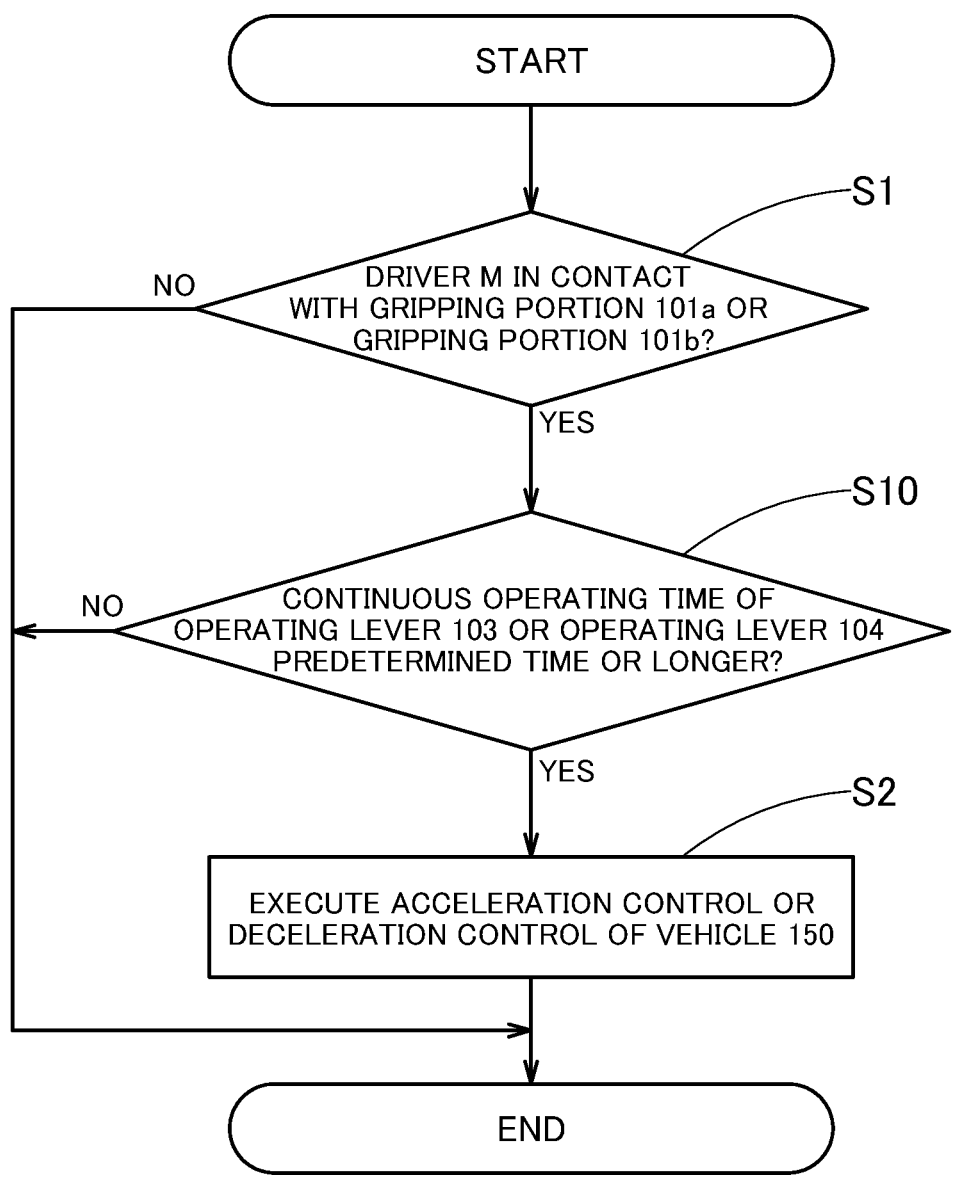
FIG. 18 is a flowchart showing a misoperation prevention sequence.

Firstly, as shown in FIG. 18, the CPU 161 determines whether the driver M is in contact with the gripping portion 101a or the gripping portion 101b based on a signal received from the touch sensor 101a1 or 101b1 (S1). When determining that the driver M is in contact with neither the gripping portion 101a nor the gripping portion 101b, the CPU 161 ends the misoperation prevention sequence without executing an acceleration control or a deceleration control of the vehicle 150 based on an operation of the operating lever 103 or 104.

Meanwhile, when determining that the driver M is in contact with the gripping portion 101a or the gripping portion 101b, the CPU 161 determines whether a continuous operating time of the operating lever 103 or 104 is a predetermined time or greater based on a signal received from the lever sensor 132 or 142 (S10). Herein, a continuous operating time is a time from the driver M starting a movement from an initial position of the operating lever 103 or 104 (a position in which no acceleration control or deceleration control is carried out) until returning the operating lever 103 or 104 to the initial position. In the present embodiment, the CPU 161 determines in step S10 whether a continuous operating time of the operating lever 103 or 104 is one second or longer, but the operating time threshold may be fixed as desired.

Next, when determining that the continuous operating time of the operating lever 103 or 104 is less than one second, the CPU 161 ends the misoperation prevention sequence without executing an acceleration control or a deceleration control of the vehicle 150 based on an operation of the operating lever 103 or 104. Meanwhile, when determining that the continuous operating time of the operating lever 103 or 104 is one second or longer, the CPU 161 executes an acceleration control or a deceleration control of the vehicle 150 by controlling the acceleration/deceleration device 151 in accordance with an angle of rotation of the pivot shaft 131 or 141 detected by the lever sensor 132 or 142, in the same way as when the steering wheel 110 is positioned in the extended position (S2). Subsequently, the CPU 161 ends the misoperation prevention sequence.

In this way, when the operating lever 103 or 104 is operated in a state in which the steering wheel 110 is positioned in a position other than the extended position and the driver M is in contact with neither the gripping portion 101a nor the gripping portion 101b, the CPU 161 does not execute an acceleration control or a deceleration control of the vehicle 150. Also, even when the operating lever 103 or 104 is operated in a state in which the driver M is in contact with the gripping portion 101a or the gripping portion 101b, the CPU 161 does not execute an acceleration control or a deceleration control of the vehicle 150 based on an operation of the operating lever 103 or 104 when a continuous operating time of the operating lever 103 or 104 is less than a predetermined time.

This is for the following reason. That is, when the steering wheel 110 is positioned in a position other than the extended position, it is not normally expected that the driver M will operate the operating lever 103 or 104, but rather it is expected that an operation of the operating lever 103 or 104 by the driver M will be an operation in a time of emergency. It is expected that when the driver M operates the operating lever 103 or 104 in a time of emergency, the driver M will operate the operating lever 103 or 104 continuously for a predetermined time or longer in a state in which the driver M is in contact with the gripping portion 101a or the gripping portion 101b. Conversely, when the operating lever 103 or 104 is operated in a situation in which these conditions are not fulfilled, there is a possibility of a misoperation such as the driver M unexpectedly touches the operating lever 103 or 104. This means that by the CPU 161 executing the heretofore described control, the vehicle 150 can be restricted from carrying out an operation unintended by the driver M when the driver M unexpectedly touches the operating lever 103 or 104 in a state in which the steering wheel 110 is positioned in a position other than the extended position.

Also, when the operating lever 103 or 104 is operated continuously for a predetermined time or longer in a state in which the steering wheel 110 is positioned in a position other than the extended position and the driver M is in contact with the gripping portion 101a or the gripping portion 101b, the CPU 161 executes an acceleration control or a deceleration control of the vehicle 150. This means that even when the steering wheel 110 is positioned in a position other than the extended position, the driver M can cause the vehicle 150 to accelerate or decelerate, because of which the driver M can react to a time of emergency or the like.

Fourth Embodiment

Next, the vehicle control device D according to a fourth embodiment of the present disclosure will be described. A description of portions duplicating the description of the second embodiment and the third embodiment will be abbreviated, using identical reference signs.

The vehicle control device D according to the present embodiment differs from the vehicle control device D according to the second embodiment only in the details of the misoperation prevention sequence, while other configurations are identical. Because of this, only the details of the misoperation prevention sequence according to the present embodiment will be described hereafter, and a description of other configurations will be omitted.

In the same way as in the second embodiment, the CPU 161 executes a misoperation prevention sequence when determining that the steering wheel 110 is positioned in a position other than the extended position based on a signal received from the position sensor 159, in addition to determining that the operating lever 103 or the operating lever 104 has been operated based on a signal received from the lever sensor 132 or 142. Hereafter, the misoperation prevention sequence of the present embodiment will be described, using a flowchart shown in FIG. 19. In the following description, the same reference sign will be allotted to a process wherein the CPU 161 carries out a control the same as in the misoperation prevention sequence of the second embodiment or the third embodiment.

Figure 19:
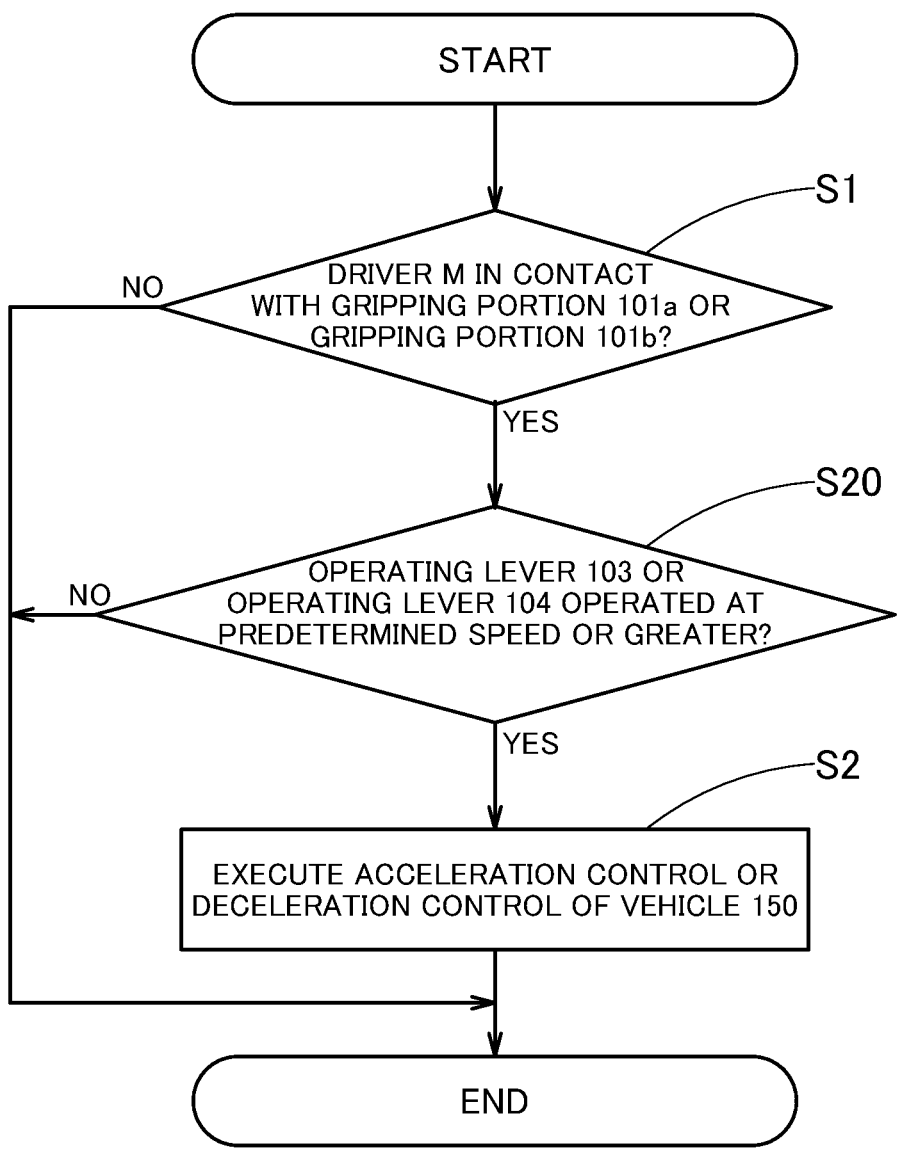
FIG. 19 is a flowchart showing a misoperation prevention sequence.

Firstly, as shown in FIG. 19, the CPU 161 determines whether the driver M is in contact with the gripping portion 101a or the gripping portion 101b based on a signal received from the touch sensor 101a1 or 101b1 (S1). When determining that the driver M is in contact with neither the gripping portion 101a nor the gripping portion 101b, the CPU 161 ends the misoperation prevention sequence without executing an acceleration control or a deceleration control of the vehicle 150 based on an operation of the operating lever 103 or 104.

Meanwhile, when determining that the driver M is in contact with the gripping portion 101a or the gripping portion 101b, the CPU 161 determines whether the operating lever 103 or 104 has been operated at a predetermined operating speed or greater based on a signal received from the lever sensor 132 or 142 (S20). In other words, the CPU 161 determines whether a pivoting velocity (a moving velocity) of the operating lever 103 or the operating lever 104 is a predetermined velocity or greater. In the present embodiment, the CPU 161 determines in step S20 whether a rotational angular velocity of the pivot shaft 131 or 141 is 0.4n/s or greater as an operating velocity of the operating lever 103 or 104, but the operating velocity threshold may be fixed as desired.

Next, when determining that the operating velocity of the operating lever 103 or 104 is less than the predetermined velocity, the CPU 161 ends the misoperation prevention sequence without executing an acceleration control or a deceleration control of the vehicle 150 based on an operation of the operating lever 103 or 104. Meanwhile, when determining that the operating velocity of the operating lever 103 or 104 is equal to or greater than the predetermined velocity, the CPU 161 executes an acceleration control or a deceleration control of the vehicle 150 by controlling the acceleration/deceleration device 151 in accordance with an angle of rotation of the pivot shaft 131 or 141 detected by the lever sensor 132 or 142, in the same way as when the steering wheel 110 is positioned in the extended position (S2). Subsequently, the CPU 161 ends the misoperation prevention sequence.

In this way, when the operating lever 103 or 104 is operated in a state in which the steering wheel 110 is positioned in a position other than the extended position and the driver M is in contact with neither the gripping portion 101a nor the gripping portion 101b, the CPU 161 does not execute an acceleration control or a deceleration control of the vehicle 150. Also, even when the operating lever 103 or 104 is operated in a state in which the driver M is in contact with the gripping portion 101a or the gripping portion 101b, the CPU 161 does not execute an acceleration control or a deceleration control of the vehicle 150 based on an operation of the operating lever 103 or 104 when the operating lever 103 or 104 is not being operated at a predetermined operating velocity or greater.

This is for the following reason. That is, when the steering wheel 110 is positioned in a position other than the extended position, it is not normally expected that the driver M will operate the operating lever 103 or 104, but rather it is expected that an operation of the operating lever 103 or 104 by the driver M will be an operation in a time of emergency. It is expected that when the driver M operates the operating lever 103 or 104 in a time of emergency, the driver M will operate the operating lever 103 or 104 at a predetermined operating velocity or greater in a state in which the driver M is in contact with the gripping portion 101a or the gripping portion 101b. Conversely, when the operating lever 103 or 104 is operated in a situation in which these conditions are not fulfilled, there is a possibility of a misoperation such as the driver M unexpectedly touches the operating lever 103 or 104. This means that by the CPU 161 executing the heretofore described control, the vehicle 150 can be restricted from carrying out an operation unintended by the driver M when the driver M unexpectedly touches the operating lever 103 or 104 in a state in which the steering wheel 110 is positioned in a position other than the extended position.

Also, when the operating lever 103 or 104 is operated at a predetermined operating velocity or greater in a state in which the steering wheel 110 is positioned in a position other than the extended position and the driver M is in contact with the gripping portion 101a or the gripping portion 101b, the CPU 161 executes an acceleration control or a deceleration control of the vehicle 150. This means that even when the steering wheel 110 is positioned in a position other than the extended position, the driver M can cause the vehicle 150 to accelerate or decelerate, because of which the driver M can react to a time of emergency or the like.

Fifth Embodiment

Next, the vehicle control device D according to a fifth embodiment of the present disclosure will be described. A description of portions duplicating the description of the second embodiment, the third embodiment, and the fourth embodiment will be abbreviated, using identical reference signs.

The vehicle control device D according to the present embodiment differs from the vehicle control device D according to the second embodiment only in the details of the misoperation prevention sequence, while other configurations are identical. Because of this, only the details of the misoperation prevention sequence according to the present embodiment will be described hereafter, and a description of other configurations will be omitted.

In the same way as in the second embodiment, the CPU 161 executes a misoperation prevention sequence when determining that the steering wheel 110 is positioned in a position other than the extended position based on a signal received from the position sensor 159, in addition to determining that the operating lever 103 or the operating lever 104 has been operated based on a signal received from the lever sensor 132 or 142. Hereafter, the misoperation prevention sequence of the present embodiment will be described, using a flowchart shown in FIG. 20. In the following description, the same reference sign will be allotted to a process wherein the CPU 161 carries out a control the same as in the misoperation prevention sequence of the second embodiment, the third embodiment, or the fourth embodiment.

Figure 20:
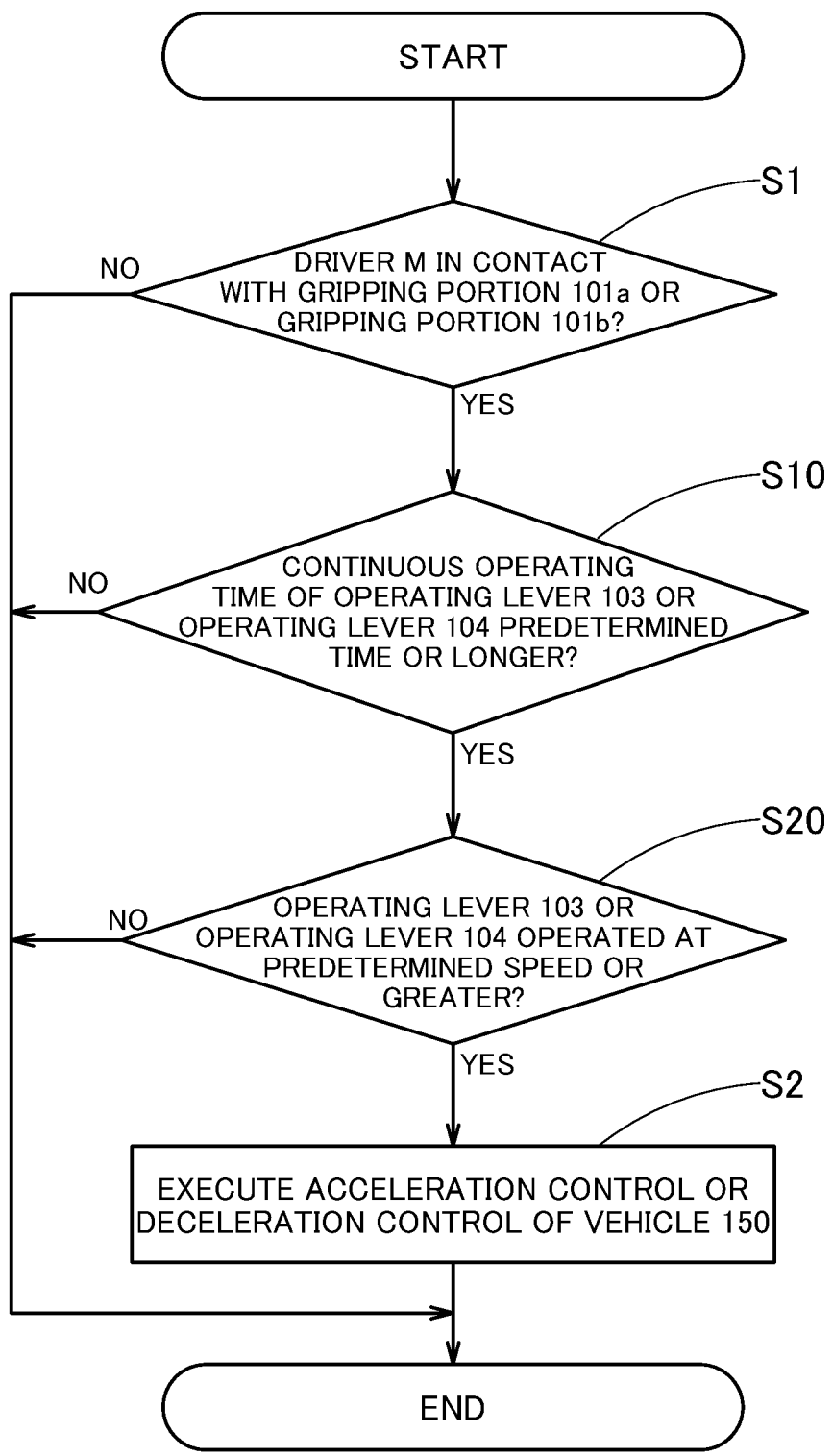
FIG. 20 is a flowchart showing a misoperation prevention sequence.

Firstly, as shown in FIG. 20, the CPU 161 determines whether the driver M is in contact with the gripping portion 101a or the gripping portion 101b based on a signal received from the touch sensor 101a1 or 101b1 (S1). When determining that the driver M is in contact with neither the gripping portion 101a nor the gripping portion 101b, the CPU 161 ends the misoperation prevention sequence without executing an acceleration control or a deceleration control of the vehicle 150 based on an operation of the operating lever 103 or 104.

Meanwhile, when determining that the driver M is in contact with the gripping portion 101a or the gripping portion 101b, the CPU 161 determines whether a continuous operating time of the operating lever 103 or 104 is a predetermined time or greater based on a signal received from the lever sensor 132 or 142 (S10). In the present embodiment, the CPU 161 determines in step S10 whether a continuous operating time of the operating lever 103 or 104 is one second or longer, but the operating time threshold may be fixed as desired.

Next, when determining that the continuous operating time of the operating lever 103 or 104 is less than one second, the CPU 161 ends the misoperation prevention sequence without executing an acceleration control or a deceleration control of the vehicle 150 based on an operation of the operating lever 103 or 104. Meanwhile, when determining that the continuous operating time of the operating lever 103 or 104 is one second or longer, the CPU 161 determines whether the operating lever 103 or 104 has been operated at a predetermined operating speed or greater based on a signal received from the lever sensor 132 or 142 (S20). In the present embodiment, the CPU 161 determines in step S20 whether a rotational angular velocity of the pivot shaft 131 or 141 is 0.4n/s or greater as an operating velocity of the operating lever 103 or 104, but the operating velocity threshold may be fixed as desired.

Next, when determining that the operating velocity of the operating lever 103 or 104 is less than the predetermined velocity, the CPU 161 ends the misoperation prevention sequence without executing an acceleration control or a deceleration control of the vehicle 150 based on an operation of the operating lever 103 or 104. Meanwhile, when determining that the operating velocity of the operating lever 103 or 104 is equal to or greater than the predetermined velocity, the CPU 161 executes an acceleration control or a deceleration control of the vehicle 150 by controlling the acceleration/deceleration device 151 in accordance with an angle of rotation of the pivot shaft 131 or 141 detected by the lever sensor 132 or 142, in the same way as when the steering wheel 110 is positioned in the extended position (S2). Subsequently, the CPU 161 ends the misoperation prevention sequence.

In this way, when the operating lever 103 or 104 is operated in a state in which the steering wheel 110 is positioned in a position other than the extended position and the driver M is in contact with neither the gripping portion 101a nor the gripping portion 101b, the CPU 161 does not execute an acceleration control or a deceleration control of the vehicle 150. Also, even when the operating lever 103 or 104 is operated in a state in which the driver M is in contact with the gripping portion 101a or the gripping portion 101b, the CPU 161 does not execute an acceleration control or a deceleration control of the vehicle 150 based on an operation of the operating lever 103 or 104 when the operating lever 103 or 104 is not being operated at a predetermined operating velocity or greater. Also, even when the operating lever 103 or 104 has been operated continuously for a predetermined time or longer in a state in which the driver M is in contact with the gripping portion 101a or the gripping portion 101b, the CPU 161 does not execute an acceleration control or a deceleration control of the vehicle 150 based on an operation of the operating lever 103 or 104 when the operating lever 103 or 104 is not being operated at a predetermined operating velocity or greater.

This is for the following reason. That is, when the steering wheel 110 is positioned in a position other than the extended position, it is not normally expected that the driver M will operate the operating lever 103 or 104, but rather it is expected that an operation of the operating lever 103 or 104 by the driver M will be an operation in a time of emergency. It is expected that when the driver M operates the operating lever 103 or 104 in a time of emergency, the driver M will operate the operating lever 103 or 104 continuously for a predetermined time or longer, and at a predetermined operating velocity or greater, in a state in which the driver M is in contact with the gripping portion 101a or the gripping portion 101b. Conversely, when the operating lever 103 or 104 is operated in a situation in which these conditions are not fulfilled, there is a possibility of a misoperation such as the driver M unexpectedly touches the operating lever 103 or 104. This means that by the CPU 161 executing the heretofore described control, the vehicle 150 can be restricted from carrying out an operation unintended by the driver M when the driver M unexpectedly touches the operating lever 103 or 104 in a state in which the steering wheel 110 is positioned in a position other than the extended position.

Also, when the operating lever 103 or 104 is operated continuously for a predetermined time or longer, and at a predetermined operating velocity or greater, in a state in which the steering wheel 110 is positioned in a position other than the extended position and the driver M is in contact with the gripping portion 101a or the gripping portion 101b, the CPU 161 executes an acceleration control or a deceleration control of the vehicle 150. This means that even when the steering wheel 110 is positioned in a position other than the extended position, the driver M can cause the vehicle 150 to accelerate or decelerate, because of which the driver M can react to a time of emergency or the like.

In the second to fifth embodiments, a configuration wherein the steering wheel 110 has the operating lever 103 and the operating lever 104, and the operating levers 103 and 104 can execute both an acceleration operation and a braking operation, has been described, but the present disclosure is not limited to this. That is, even when adopting a configuration wherein only one operating lever of the operating levers 103 and 104 is provided, advantages the same as those heretofore described can be obtained by the CPU 161 carrying out the heretofore described controls. Also, even when adopting a configuration wherein the operating levers 103 and 104 can execute only one operation of an acceleration operation and a braking operation, advantages the same as those heretofore described can be obtained by the CPU 161 carrying out the heretofore described controls. However, adopting a configuration wherein the steering wheel 110 has the operating lever 103 and the operating lever 104, and the operating levers 103 and 104 can execute both an acceleration operation and a braking operation, as is the case with the configuration of the present embodiments, is preferable, as the driver M operates the operating levers 103 and 104 with the right hand and the left hand respectively, and can carry out an acceleration operation and a braking operation without changing a grip between the operating levers 103 and 104, meaning that a driving operation can be restricted from becoming more complex.

Also, in the second to fifth embodiments, a configuration wherein the CPU 161 carries out the same control when the operating lever 103 or 104 is operated in order to cause the vehicle 150 to accelerate and when the operating lever 103 or 104 is operated in order to cause the vehicle 150 to decelerate has been described, but the present disclosure is not limited to this. That is, from the point of view of accident prevention or the like, a sudden deceleration operation is necessary more frequently than a sudden acceleration operation, because of which it is often the case that being able to carry out a sudden deceleration operation relatively easily when the steering wheel 110 is positioned in a position other than the extended position is convenient. Because of this, a configuration wherein the misoperation prevention sequences of the second to fifth embodiments are combined as appropriate, and a deceleration operation can be carried out more easily than an acceleration operation when the steering wheel 110 is positioned in a position other than the extended position, may be adopted.

For example, a configuration may be such that, when the steering wheel 110 is positioned in a position other than the extended position, the CPU 161 executes the misoperation prevention sequence of the second embodiment when the operating levers 103 and 104 are pivoted in the arrow R6 direction and the arrow R8 direction in order to cause the vehicle 150 to decelerate, and the CPU 161 executes the misoperation prevention sequence of the third embodiment, the fourth embodiment, or the fifth embodiment when the operating levers 103 and 104 are pivoted in the arrow R5 direction and the arrow R7 direction in order to cause the vehicle 150 to accelerate. Also, a configuration may be such that, when the steering wheel 110 is positioned in a position other than the extended position, the CPU 161 executes the misoperation prevention sequence of the second embodiment, the third embodiment, or the fourth embodiment when the operating levers 103 and 104 are pivoted in the arrow R6 direction and the arrow R8 direction in order to cause the vehicle 150 to decelerate, and the CPU 161 executes the misoperation prevention sequence of the fifth embodiment when the operating levers 103 and 104 are pivoted in the arrow R5 direction and the arrow R7 direction in order to cause the vehicle 150 to accelerate.

Also, in the second to fifth embodiments, it has been described that the steering wheel 110 has the operating levers 103 and 104 as an operating portion for causing the vehicle 150 to accelerate or decelerate, but the present disclosure not being limited to this, a configuration wherein a button or a switch is provided as an operating portion may be adopted. That is, even when a configuration is such that, for example, a button acting as an operating portion and a sensor that detects an operation amount of the button are provided in the steering wheel 110, and the CPU 161 carries out controls the same as the heretofore described controls when the operating levers 103 and 104 are operated in accordance with a result of a detection by the position sensor 159 or the touch sensors 101a1 and 101b1 and the operation amount of the button, advantages the same as those heretofore described can be obtained. Similarly, even when a configuration is such that a switch acting as an operating portion and a sensor that detects an operation amount of the switch are provided in the steering wheel 110, and the CPU 161 carries out controls the same as the heretofore described controls when the operating levers 103 and 104 are operated in accordance with a result of a detection by the position sensor 159 or the touch sensors 101a1 and 101b1 and the operation amount of the switch, advantages the same as those heretofore described can be obtained.

Sixth Embodiment

Hereafter, the vehicle control device D according to a sixth embodiment of the present disclosure will be described. In the present embodiment, unless particularly stated otherwise, a direction following an axis of rotation C of a steering wheel 225 is a front-rear direction, a direction perpendicular to the axis of rotation C and approximately following an up-down direction of a vehicle is an up-down direction, and a direction perpendicular to the axis of rotation C and approximately following a left-right direction of the vehicle is a left-right direction, with a state in which the steering wheel 225 is operated straight ahead as a reference.

Figure 21:
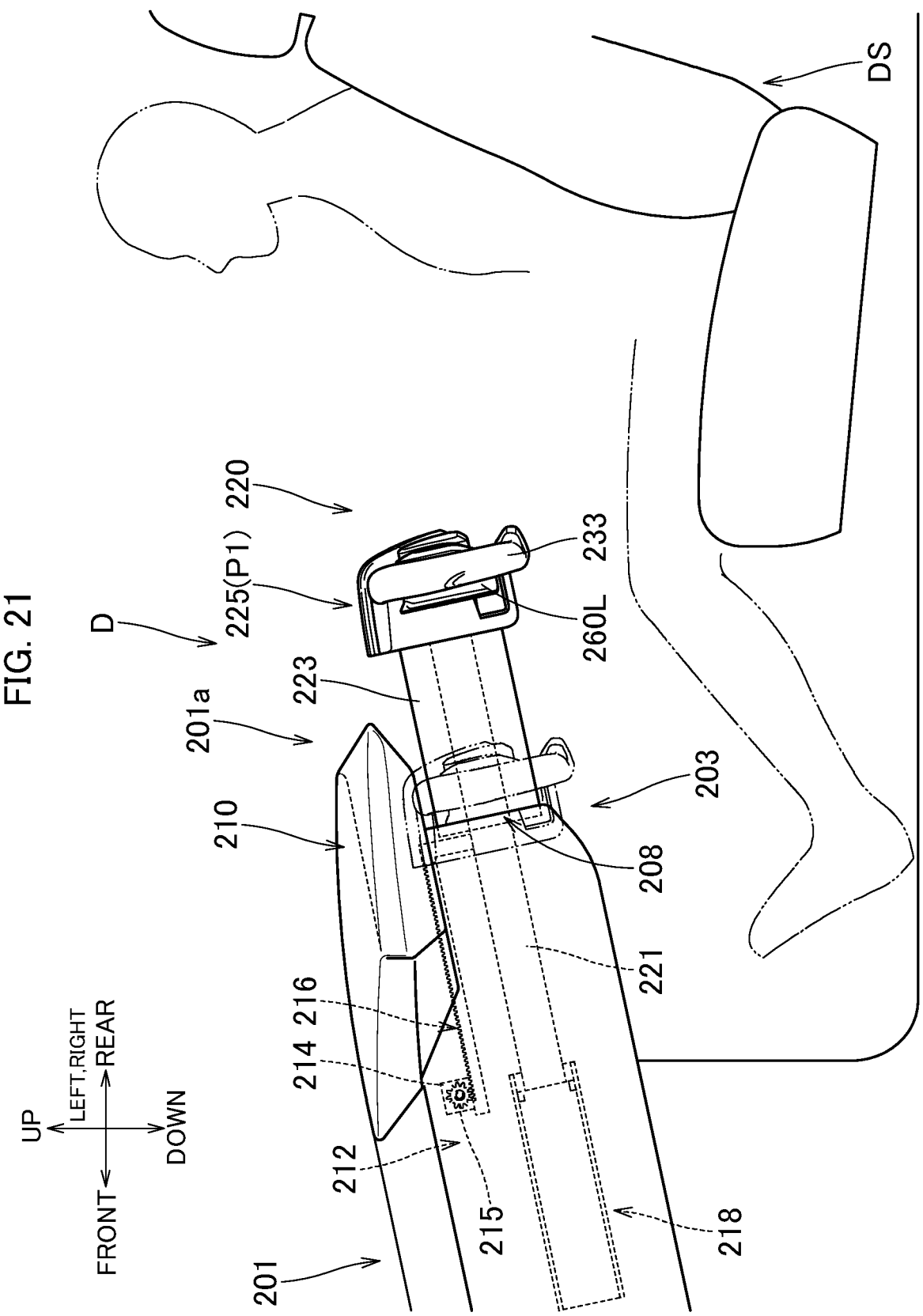
FIG. 21 is a schematic side view of a vehicle control device.
Figure 22:
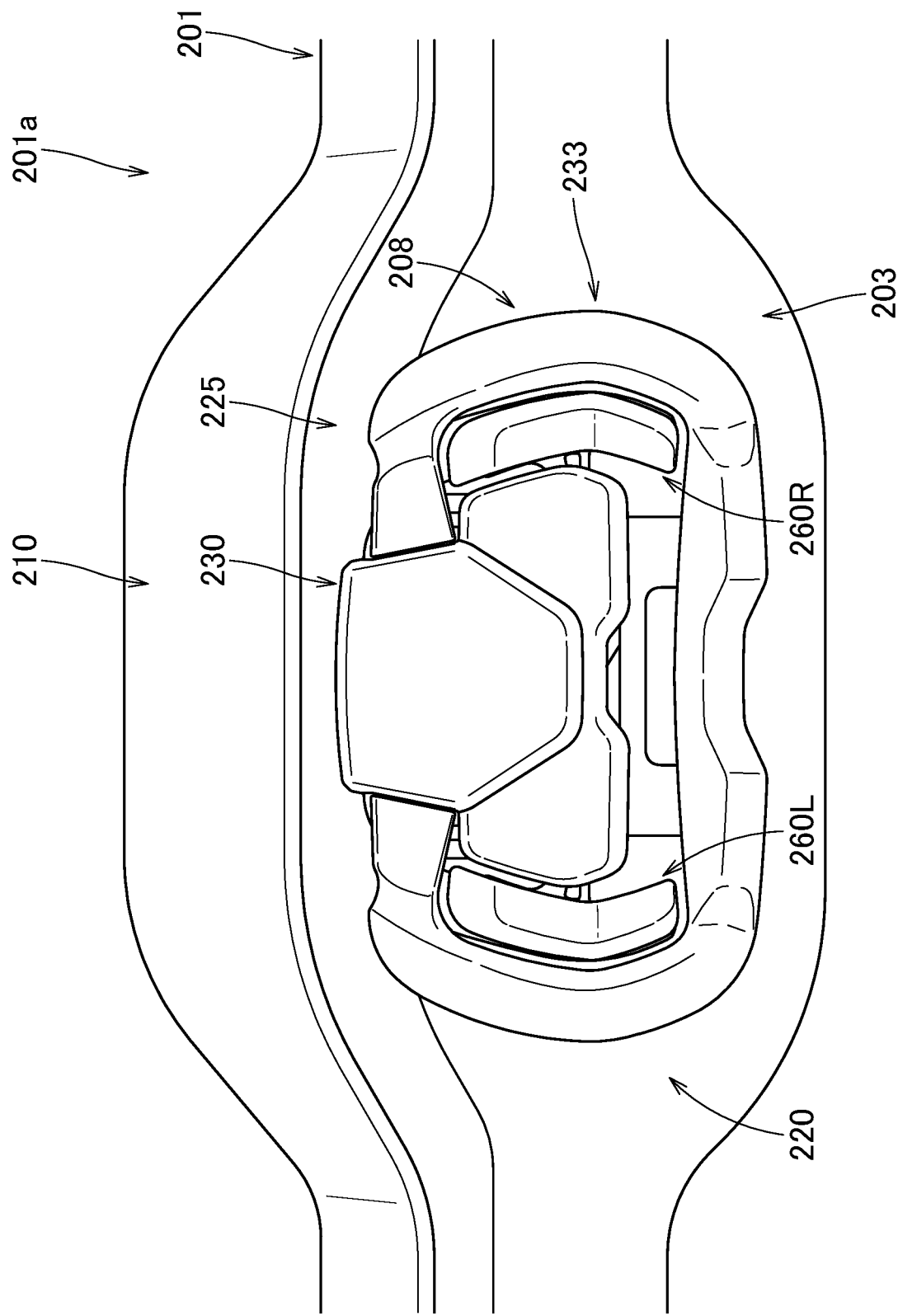
FIG. 22 is a view of an instrument panel and a steering device seen from a rear side of a vehicle.
Figure 29:
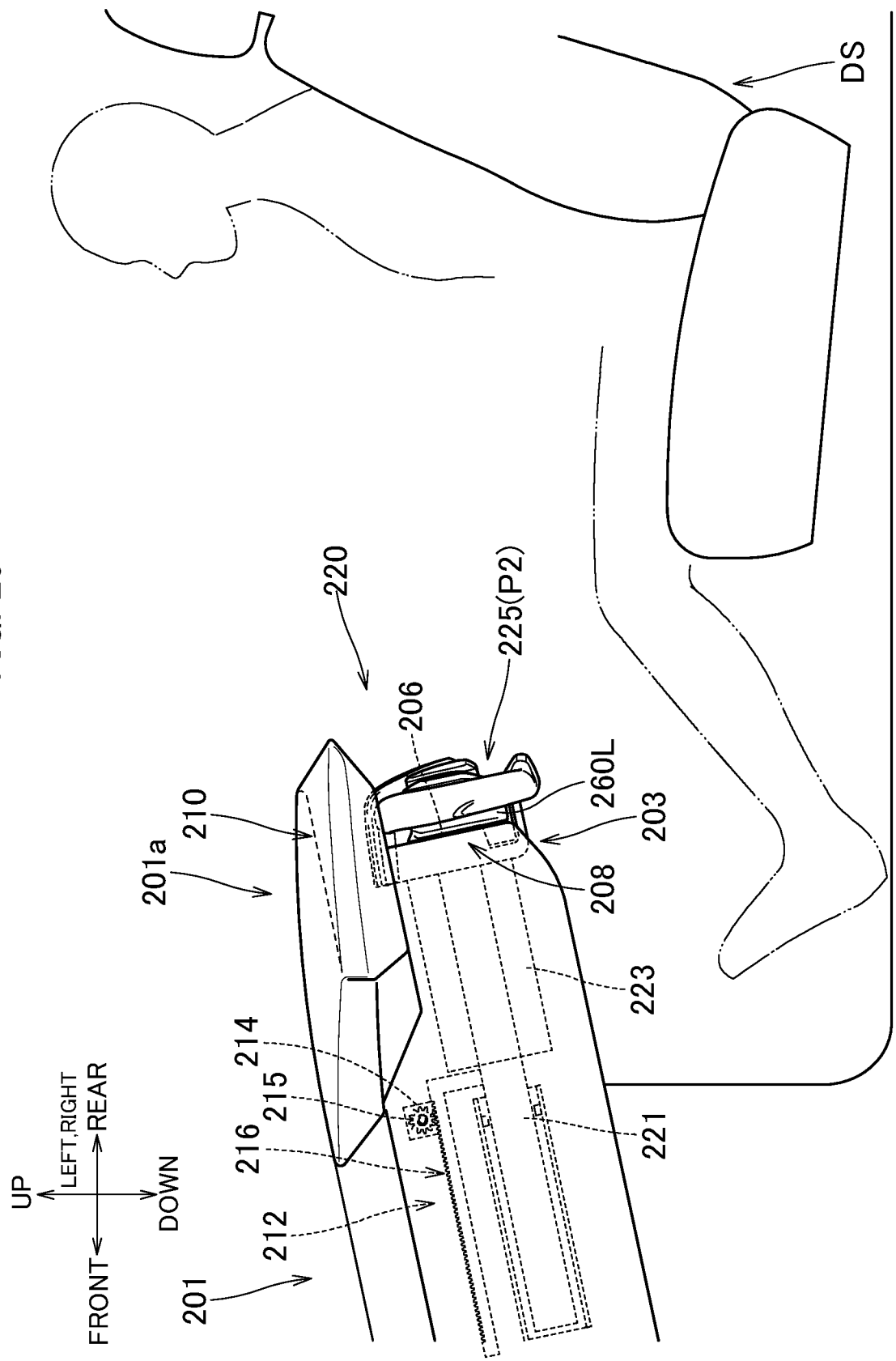
FIG. 29 is a schematic side view of the vehicle control device.

FIG. 21 is a schematic side view of the vehicle control device D, FIG. 22 is a view of an instrument panel 201 and a steering device 220 seen from the rear side of a vehicle, and FIG. 29 is a schematic side view of the vehicle control device D, and shows a state in which the steering device 220 is housed in a housing portion 203.

As shown in FIGS. 21, 22, and 29, the vehicle control device D includes the steering device 220, which is disposed in front of a driver's seat DS, the housing portion 203, which is formed in the instrument panel 201 and configured in such a way that the steering device 220 can be housed therein, and a movement mechanism 212 (a movement unit) that causes the steering device 220 move to a using position P1 shown in FIG. 21 and a storage position P2 shown in FIG. 29. The steering device 220 is configured of the steering wheel 225, a steering column 221, and a column cover 223 that covers an outer peripheral side of the steering column 221.

The housing portion 203 is formed in a driver's seat side region 201a of the instrument panel 201 in front of the driver's seat DS. In the present embodiment, the instrument panel 201 is made of a hard synthetic resin such as polypropylene (PP). A detailed configuration of the housing portion 203 will be described hereafter.

A protruding portion 210 that protrudes rearward is formed in a region of the instrument panel 201 on an upper end side of the driver's seat side region 201a. A width dimension in the left-right direction of the protruding portion 210 is set to be greater than a width dimension in the left-right direction of the steering wheel 225. Also, an amount of rearward protrusion of the protruding portion 210 is a dimension such that the protruding portion 210 protrudes farther rearward than the steering wheel 225 when the steering device 220 is positioned in the storage position P2. That is, when the steering device 220 is positioned in the storage position P2, an upper side of the steering wheel 225 is practically wholly covered by the protruding portion 210. In this way, a rotational operation of the steering wheel 225 is regulated.

The movement mechanism 212 is disposed in an interior of the instrument panel 201, and includes a drive motor 214 held in a vehicle body, a pinion 215, which is attached to a shaft of the drive motor 214 and is rotated by a driving force of the drive motor 214, a rack portion 216 that meshes with the pinion 215, and a slide rail portion 218 to which the steering column 221 is attached. The rack portion 216 extends from an intermediate region to the front and rear of the steering column 221, and extends in the front and rear directions along the axis of rotation C (a rotational operation central axis) of the steering wheel 225. The slide rail portion 218 is attached to the vehicle body, and a whole of the steering device 220 is caused to slide by causing the steering column 221 to slide when the drive motor 214 is driving.

When the movement mechanism 212 causes the steering device 220 to move, the pinion 215 is caused to rotate by causing the drive motor 214 to rotate forward or rotate in reverse. Because of this, the steering device 220 including the steering wheel 225 moves along the axis of rotation C between the using position P1 shown in FIG. 21 and the storage position P2 shown in FIG. 29. Also, this movement of the steering device 220 by the movement mechanism 212 is executed by a driver (an occupant) operating an unshown switch provided in a predetermined position, such as the instrument panel 201 or the steering device 220.

The steering column 221 configures a rotational operation central axis when the steering wheel 225 is rotationally operated. The steering column 221 is coupled to the steering wheel 225, and is attached in such a way as to be able to slide with respect to the slide rail portion 218 of the movement mechanism 212.

The column cover 223 is a cylindrical member that covers an outer peripheral portion of a region on a rear portion side of the steering column 221 protruding rearward from the instrument panel 201 in a state in which the steering device 220 is not housed in the housing portion 203. In a state in which the steering device 220 is not housed in the housing portion 203, a front end side of the column cover 223 is inserted through an aperture portion 204 (FIG. 30) formed in the instrument panel 201.

Figure 23:
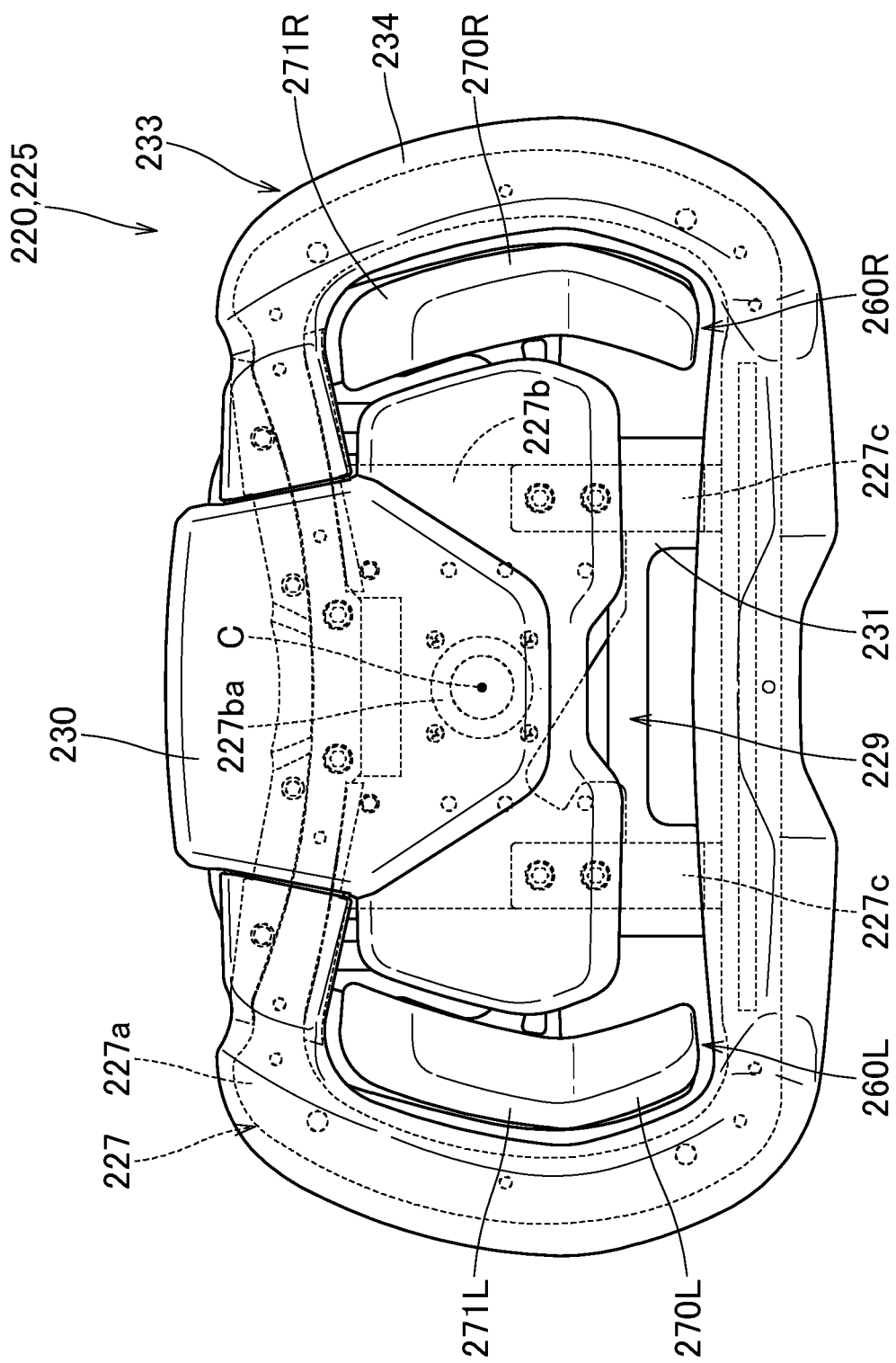
FIG. 23 is a schematic front view of a steering wheel.
Figure 24:
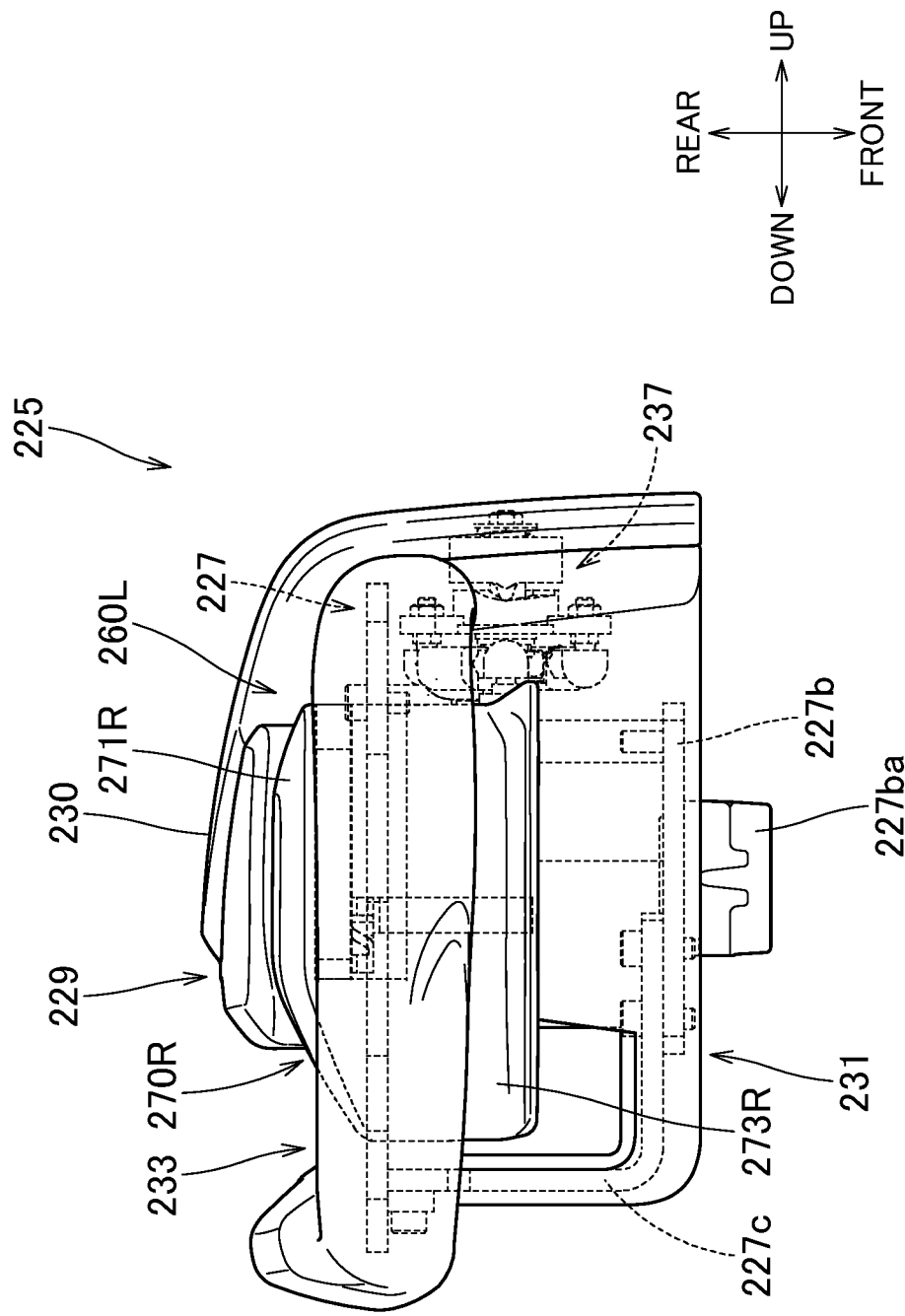
FIG. 24 is a schematic side view of the steering wheel.
Figure 25:
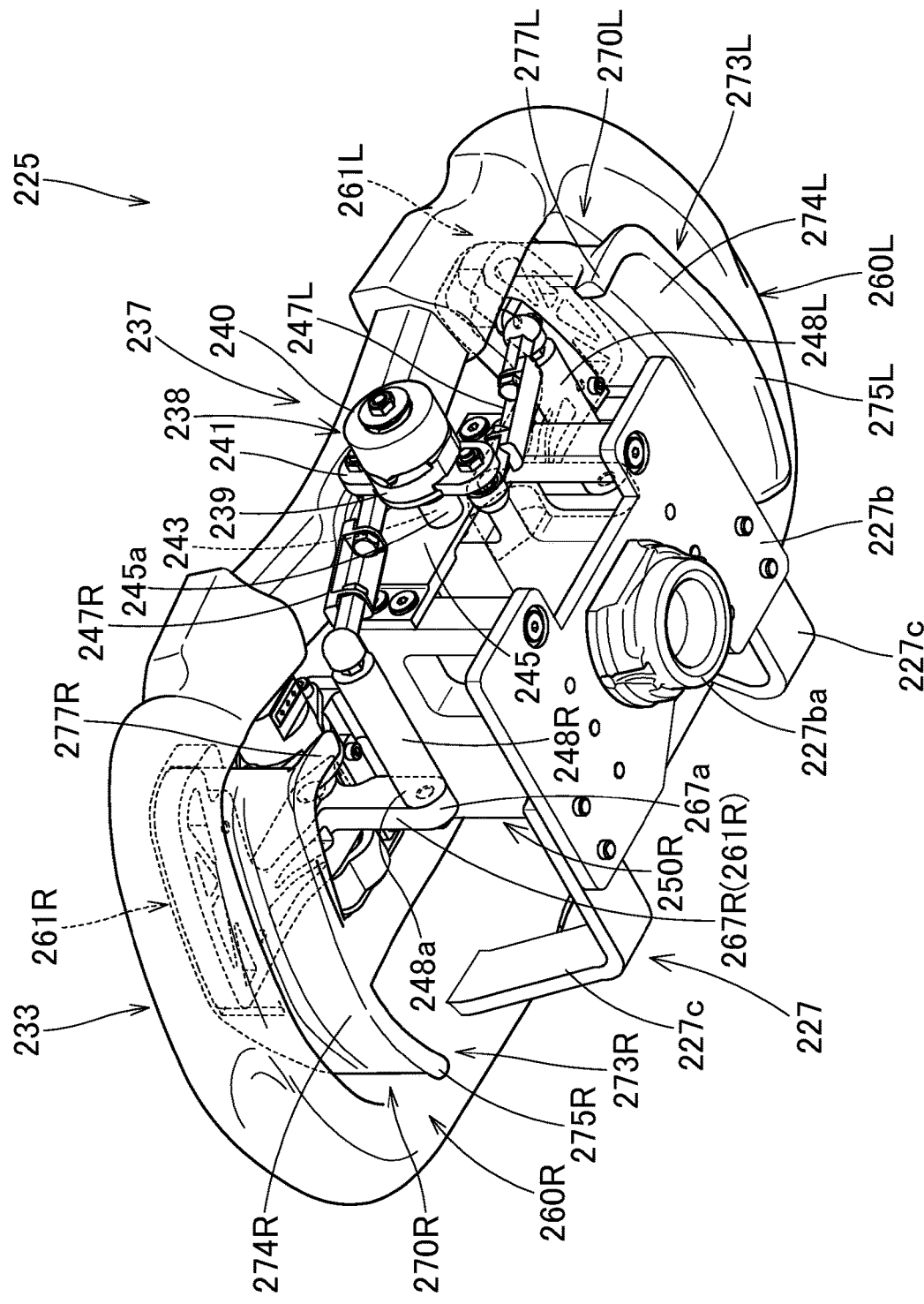
FIG. 25 is a schematic perspective view of the steering wheel in a state in which a pad and a lower cover have been removed.
Figure 26:
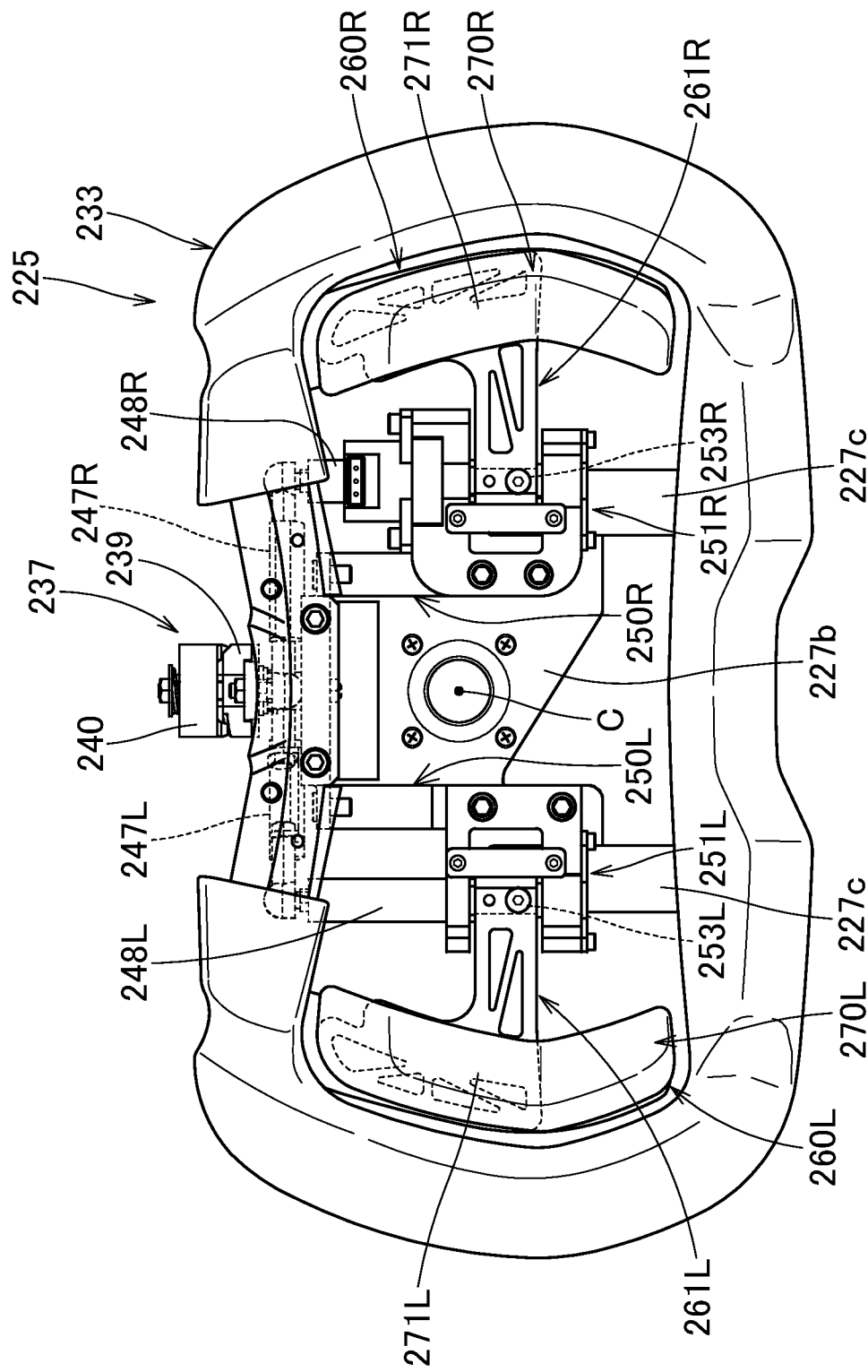
FIG. 26 is a schematic front view of the steering wheel in a state in which the pad and the lower cover have been removed.
Figure 27:
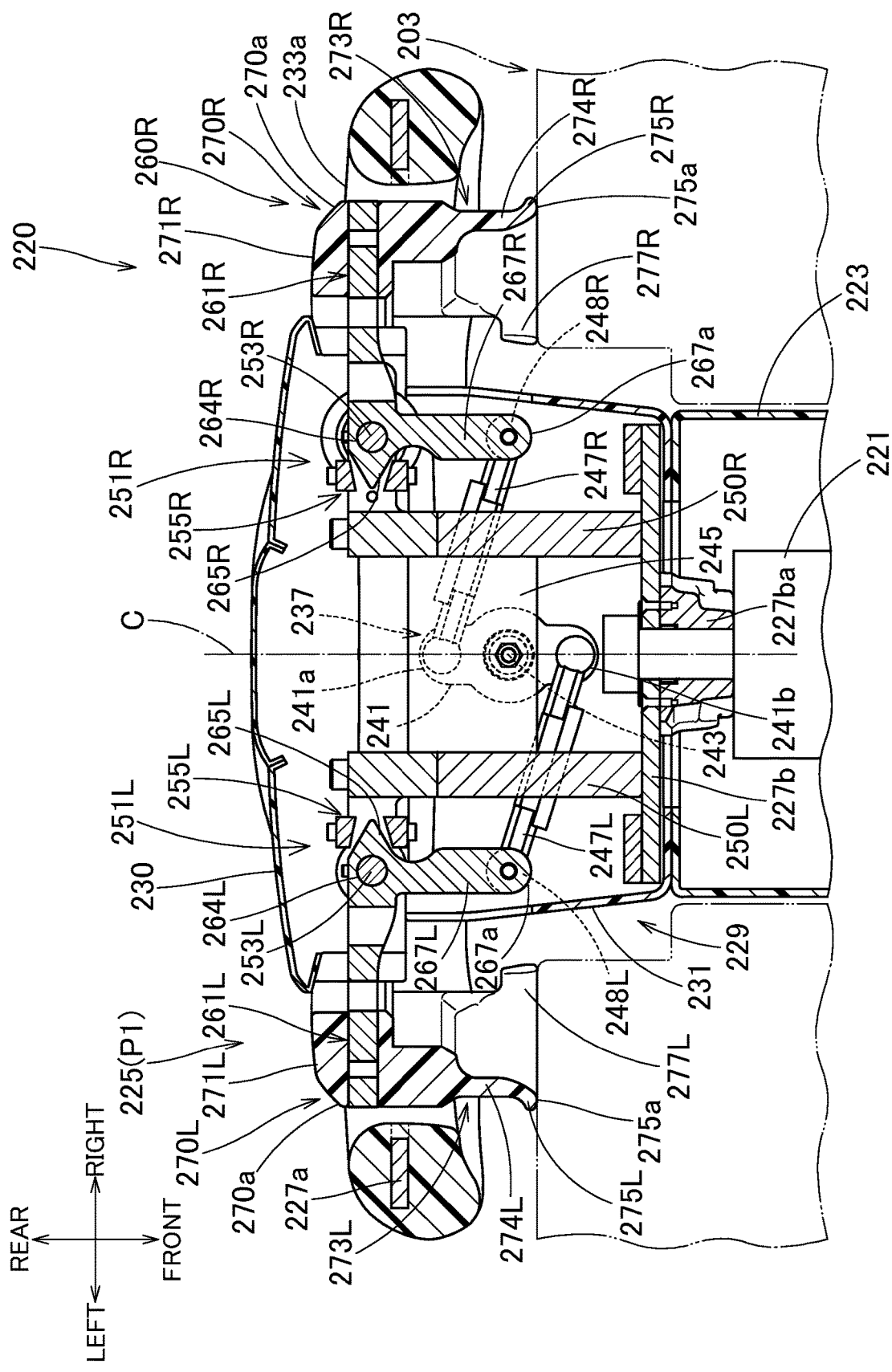
FIG. 27 is a schematic longitudinal sectional view of the steering wheel.

FIG. 23 is a schematic front view of the steering wheel 225. FIG. 24 is a schematic side view of the steering wheel 225. FIG. 25 is a schematic perspective view of the steering wheel 225 in a state in which a pad 230 and a lower cover 231 have been removed. FIG. 26 is a schematic front view of the steering wheel 225 in a state in which the pad 230 and the lower cover 231 have been removed. FIG. 27 is a schematic longitudinal sectional view in the left-right direction of the steering wheel 225.

As shown in FIGS. 23 to 27, the steering wheel 225 includes a boss portion 229, a gripping portion 233 gripped when carrying out a rotational operation, and a core material 227 that couples the boss portion 229 and the gripping portion 233 to each other. Also, the steering wheel 225 includes operating lever portions 260L and 260R (operating portions), which are disposed in a region between the boss portion 229 and the gripping portion 233, or more specifically, disposed one each on the left and the right of the boss portion 229, and a linking mechanism 237 that synchronizes rotational operations of the operating lever portions 260L and 260R. In the present embodiment, the steering wheel 225 is of a steer-by-wire type, and is of a configuration that causes unshown wheels to turn.

The core material 227 is formed of a metal plate of an aluminum alloy or the like. The core material 227 includes a gripping portion side core material 227a disposed in a region of the gripping portion 233, a boss portion side core material 227b disposed in a region of the boss portion 229, and a coupling member 227c that couples the gripping portion side core material 227a and the boss portion side core material 227b. The coupling member 227c is disposed in two places on left-right direction sides in such a way as to couple a lower edge side of the boss portion side core material 227b and a region on a lower side of the gripping portion side core material 227a.

The boss portion 229 includes the boss portion side core material 227b of the core material 227, the pad 230, which is made of a synthetic resin and covers the boss portion side core material 227b from the rear, and the lower cover 231, which is made of a synthetic resin and covers the boss portion side core material 227b from the sides and the front. The boss portion side core material 227b is of an approximate flat plate form, and is disposed in a vicinity of a front end of the boss portion 229. A boss 227ba, which is a region coupled with the steering column 221, is provided in a vicinity of a center of the boss portion side core material 227b. An unshown airbag device is housed in a region of the boss portion 229 between the boss portion side core material 227b and the pad 230.

The gripping portion 233 is of an approximate quadrilateral ring form wider to the left and right in a state of being operated straight ahead, and is of a form having approximate bilateral symmetry. The gripping portion 233 is formed by a covering layer 234, which is made of a soft synthetic resin and has cushioning properties, being provided on a periphery of the gripping portion side core material 227a, which is of an approximate quadrilateral ring form. In the present embodiment, the covering layer 234 is formed of a soft foam material such as polyurethane foam. An upper side central portion of the gripping portion 233 in plan view (in a state seen from the rear) is covered by the pad 230 and the lower cover 231.

The operating lever portions 260L and 260R are supported in such a way as to be able to rotate by rotary shaft portions 253L and 253R provided on the boss portion 229 side. The operating lever portions 260L and 260R input an acceleration operation owing to a depressing operation of being pressed downward (to the front of the vehicle), and input a braking operation owing to an elevating operation of being lifted upward (to the rear of the vehicle). Provided that a configuration is such that the operating lever portions 260L and 260R input a braking operation or an acceleration operation owing to a movement operation, a configuration such that, for example, a braking operation is input owing to a depressing operation and an acceleration operation is input owing to an elevating operation may be adopted. Rotational operations of the operating lever portions 260L and 260R are synchronized by the linking mechanism 237.

The operating lever portions 260L and 260R are attached to base portions 250L and 250R disposed inside the boss portion 229. The operating lever portions 260L and 260R include attachment base materials 261L and 261R and lever main bodies 270L and 270R. The operating lever portions 260L and 260R are a left and right pair, and the base portions 250L and 250R are also of bilaterally symmetrical forms. Hereafter, details will be described with the operating lever portion 260R, disposed on the right side, and the base portion 250R given as examples, and with regard to the operating lever portion 260L, disposed on the left side, and the base portion 250L, "L" will be suffixed to the same reference signs, and a detailed description will be omitted.

The base portion 250R to which the operating lever portion 260R is attached is made of metal, and is formed in such a way as to extend rearward from the boss portion side core material 227b. The base portion 250R is disposed in such a way as to approximately follow the up-down direction to the right of the boss 227ba, and has an attachment portion 251R that protrudes laterally outward (rightward) on a rear end side. The rotary shaft portion 253R, which supports the operating lever portion 260R, is disposed in the attachment portion 251R. The rotary shaft portion 253R is inserted through a shaft bearing portion 264R formed in the attachment base material 261R of the operating lever portion 260R, thereby supporting the operating lever portion 260R. The rotary shaft portion 253R is disposed in such a way as to approximately follow the up-down direction, while approximately following a gripping face 233a of the gripping portion 233. A stopper 255R that regulates an angle of rotation when the operating lever portion 260R is operated is provided farther than the rotary shaft portion 253R to a base portion side of the attachment portion 251R (on the left side, and centrally in the left-right direction). The stopper 255R regulates the angle of rotation of the operating lever portion 260R when operated by coming into contact with a leading end portion 265R of a crossbar portion 263R, to be described hereafter, of the attachment base material 261R of the operating lever portion 260R (refer to FIGS. 28A and 28B).

The attachment base material 261R of the operating lever portion 260R is a member that is made of metal and is of an approximate reverse L form when seen from a front-rear direction side. The attachment base material 261R includes, on a leading end side on a left-right direction inner side, the shaft bearing portion 264R formed penetrating in such a way that the rotary shaft portion 253R can be inserted therethrough. Also, as heretofore described, the leading end portion 265R, which is farther to a leading end side than the shaft bearing portion 264R, is of a configuration that comes into contact with the stopper 255R formed in the base portion 250R. Also, a coupling piece 267R that extends forward is formed on a leading end side of the crossbar portion 263R. An end portion 248a of a coupling bar 248R is coupled to a front end 267a side of the coupling piece 267R.

The lever main body 270R is of an approximate reverse L form in cross-section, and is a member made of metal or a hard synthetic resin such as PP. The lever main body 270R is disposed on a left-right inner side of the gripping portion 233, over approximately a whole up-down length of the gripping portion 233, in such a way as to extend upwards and downwards between the pad 230 and the gripping portion 233. The lever main body 270R has a depression operation portion 271R, which is disposed in such a way as to approximately follow the gripping face 233a, and an elevation operation portion 273R that extends downward from an end portion side on the gripping portion 233 side of the depression operation portion 271R.

The depression operation portion 271R is disposed on the inner side of the gripping portion 233, neighboring the gripping portion 233 while maintaining a slight gap with the gripping portion 233. The elevation operation portion 273R is disposed in such a way as to extend in the front and rear directions approximately following the axis of rotation C, and is configured in such a way that a front end side thereof is positioned farther forward than a front end face of the gripping portion 233. Specifically, the elevation operation portion 273R is such that a region of an approximate thin plate form approximately following the front-rear direction on a front end side extending from the depression operation portion 271R is configured as an operating main body 274R. The operating main body 274R is formed on an outer edge 270a side of the lever main body 270R. Also, the operating main body 274R is formed in such a way that a leading end portion 275R on a front end side protrudes slightly outward laterally. The elevation operation portion 273R (the operating main body 274R) is formed continuously over approximately a whole up-down region of the lever main body 270R.

Also, an extended portion 277R that extends toward the boss portion 229 side (to the left, and centrally left to right) is provided on an upper end side of the elevation operation portion 273R. The extended portion 277R is formed in such a way as to extend a region that is approximately a front half portion of the operation main body 274R, and is formed over approximately a whole of the lever main body 270R in a width direction. Also, the elevation operation portion 273R (the operating main body 274R) is configured in such a way that a front end face 275a of the leading end portion 275R is approximately perpendicular to the axis of rotation C and approximately follows the gripping face 233a. Also, the front end face 275a of the leading end portion 275R of the elevation operation portion 273R (the operating main body 274R) is configured in such a way as to come into contact over approximately a whole length with a rear face 206a (a lever operation regulating portion 208) of a front wall portion 206 of the housing portion 203 in a state in which the steering wheel 225 is housed in the housing portion 203.

The linking mechanism 237 is disposed in a region on an upper end side of the boss portion 229, and is attached to an attachment bracket 245 attached to the base portions 250L and 250R. The linking mechanism 237 includes a cam unit 238, a pair of links 247L and 247R, which extend from the cam unit 238 and are coupled on the operating lever portion 260L and 260R sides, and the coupling bars 248L and 248R, which cause the links 247L and 247R and the operating lever portions 260L and 260R to be coupled. The cam unit 238 is supported by a rotary shaft portion 243, which is disposed in such a way as to follow an approximate up-down direction while being approximately perpendicular to the axis of rotation C, and is coupled to the attachment bracket 245.

An insertion cylinder portion 245a in which the rotary shaft portion 243 can be inserted is formed in such a way as protrude upward in the attachment bracket 245. The cam unit 238 includes a cam member 239, a pusher 240, and a cam holder 241. The pusher 240 is attached in such a way as to be unable to pivot with respect to the rotary shaft portion 243, and has an unshown compression coil spring in an interior. The cam member 239 and the cam holder 241 are configured in such a way as to pivot freely with respect to the rotary shaft portion 243. The cam holder 241 causes the cam member 239 and the links 247L and 247R to be coupled, and can rotate, integrated with the cam member 239, with respect to the rotary shaft portion 243. The cam holder 241 is supported in a vicinity of a center thereof by the rotary shaft member 243.

The pair of links 247L and 247R are provided corresponding to the operating lever portions 260L and 260R. One end sides of the links 247L and 247R are coupled to longitudinal direction end portion 241a and 241b sides of the cam holder 241, and are disposed in such a way as to extend leftward or rightward with point symmetry, centered on the rotary shaft portion 243. The coupling bars 248L and 248R, which couple the links 247L and 247R and the operating lever portions 260L and 260R, are disposed in such a way as to extend downward from other end sides of the links 247L and 247R. The end portion 248a sides of the coupling bars 248L and 248R are coupled to the front end 267a sides of the coupling pieces 267L and 267R formed in the attachment base materials 261L and 261R of the operating lever portions 260L and 260R. The cam holder 241 is disposed in such a way that a longitudinal direction is caused to approximately follow the front-rear direction in a state in which the operating lever portions 260L and 260R are not being operated (an intermediate state, a free state). The links 247L and 247R are configured in such a way as to extend from the end portions 241a and 241b on the front and rear direction sides of the cam holder 241 (the front and the rear of the rotary shaft portion 243).

Figure 28A:
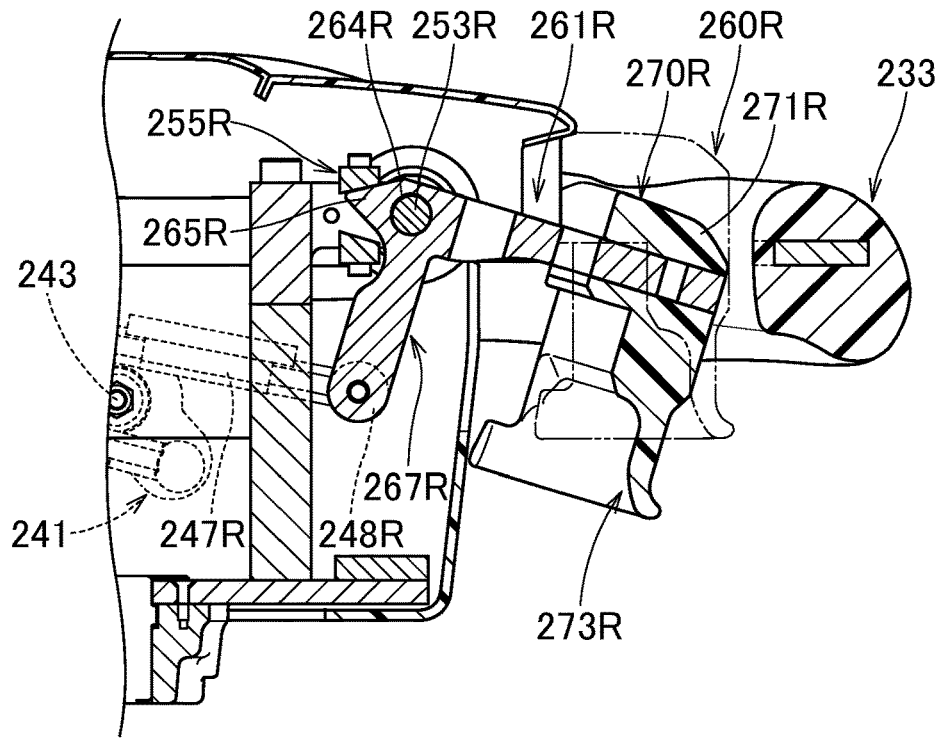
FIGS. 28A and 28B are partially enlarged longitudinal sectional views showing operating lever portions of the steering wheel in a state of a depression operation and a state of an elevation operation.
Figure 28B:
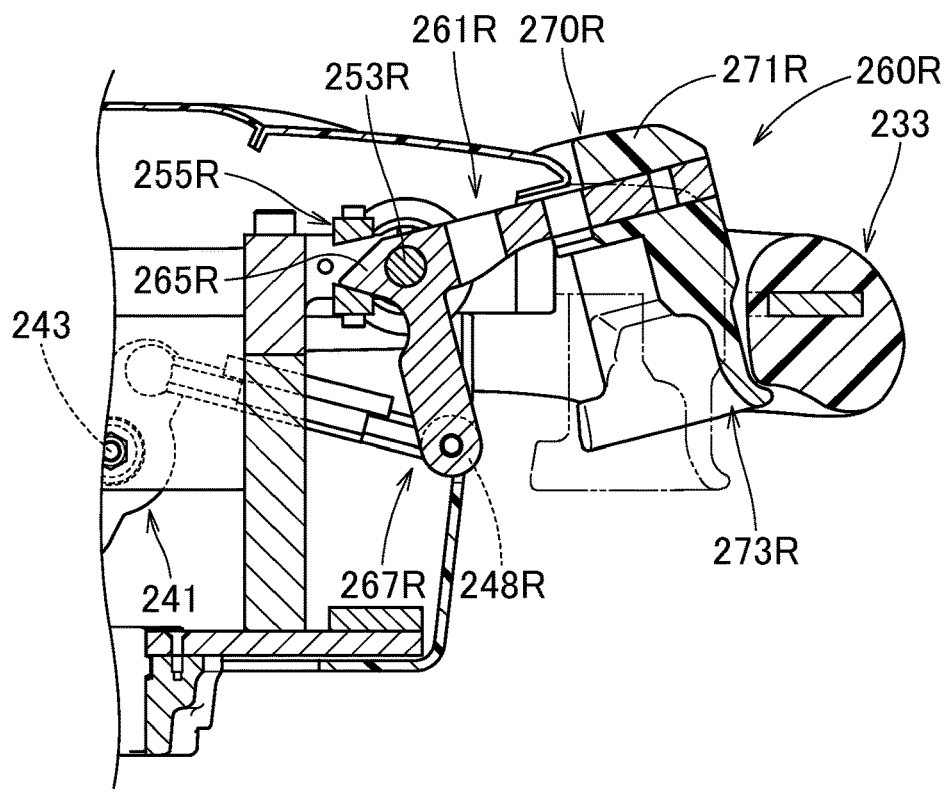

FIGS. 28A and 28B are partially enlarged longitudinal sectional views showing the operating lever portions 260L and 260R of the steering wheel 225 in a state of a depression operation and a state of an elevation operation. When a depression operation is carried out on the operating lever portions 260L and 260R, the links 247L and 247R move in accompaniment to a rotation of the operating lever portions 260L and 260R, and the cam holder 241 rotates leftward together with the cam member 239, centered on the rotary shaft portion 243, as shown in FIG. 28A. Meanwhile, when an elevation operation is carried out on the operating lever portions 260L and 260R, the cam holder 241 rotates rightward together with the cam member 239, centered on the rotary shaft portion 243, owing to a movement of the links 247L and 247R accompanying a rotation of the operating lever portions 260L and 260R, as shown in FIG. 28B. Even supposing that only the operating lever portion 260R on the right side is operated when carrying out a depression operation or an elevation operation, the link 247L that causes the operating lever portion 260L on the left side to be coupled also moves in accompaniment to a rotational movement of the cam holder 241. Because of this, the operating lever portion 260L on the left side also moves in synchrony. Also, the compression coil spring in the interior of the pusher 240 is compressed in accompaniment to a rotational movement of the cam member 239 when a depression operation or an elevation operation is carried out. This means that when an operation is stopped by removing a hand from the operating lever portions 260L and 260R, the non-operational state is restored by a resilience of the compression coil spring.

Figure 30:
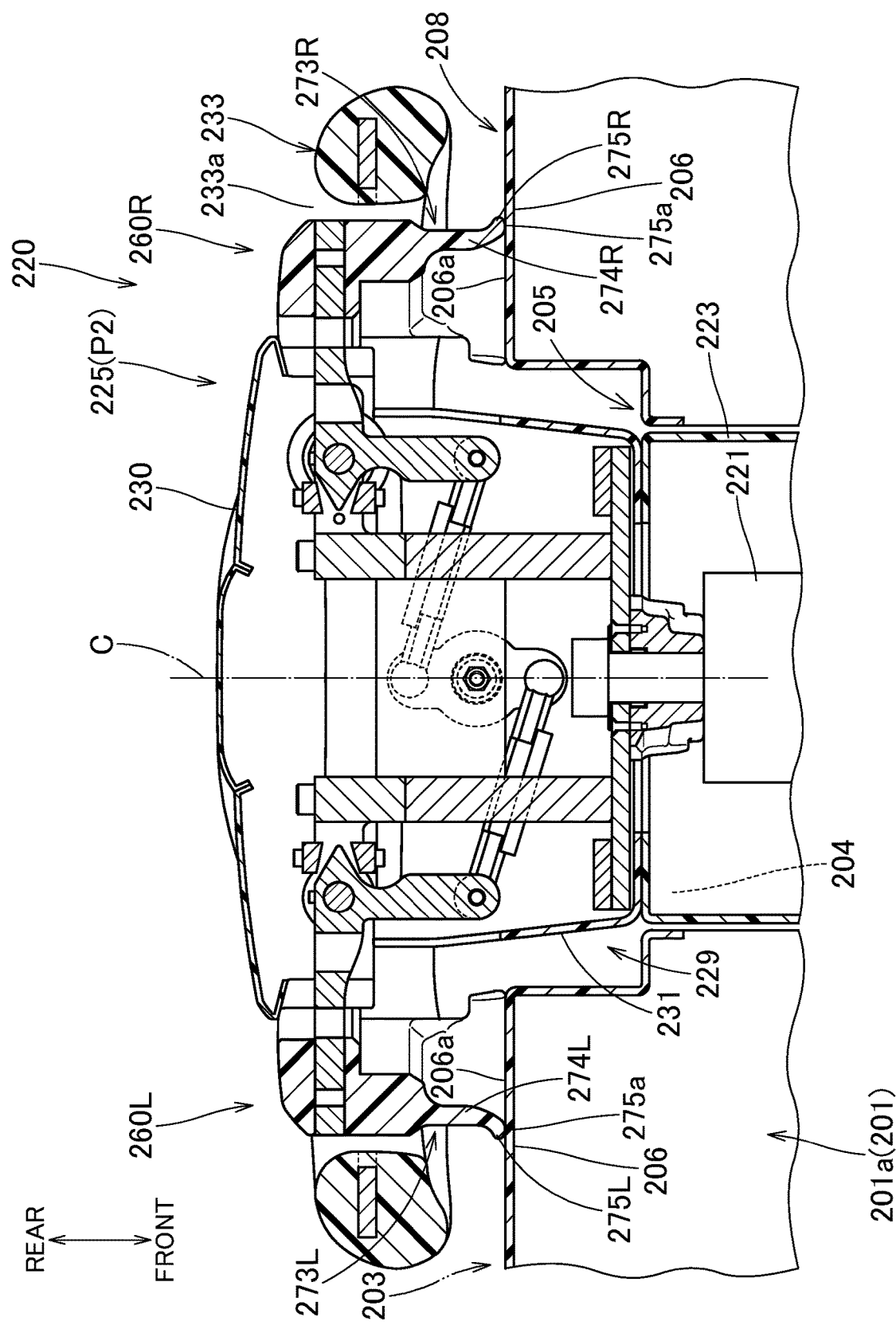
FIG. 30 is a schematic sectional view of a housing portion and a steering device housed in the housing portion.

FIG. 30 is a schematic longitudinal sectional view in the left-right direction of the housing portion 203 and the steering device 220 housed in the housing portion 203. As shown in FIG. 30, the housing portion 203 has the aperture portion 204, which is formed penetrating in such a way that the column cover 223 can be inserted therethrough. Also, the housing portion 203 has, in a periphery of the aperture portion 204, a housing recessed portion 205 in which a region on a front side of the lower cover 231 of the steering wheel 225 in a state housed in the housing portion 203 is housed. The housing recessed portion 205 houses a region of the lower cover 231 farther than the operating lever portions 260L and 260R (the lever main bodies 270L and 270R) to the front side.

Also, the front wall portion 206, which covers the steering wheel 225 in a state housed in the housing portion 203 from the front, is formed on a peripheral edge of the housing recessed portion 205 of the housing portion 203. The front wall portion 206 is a wall portion that extends in the up-down and left-right directions, while being approximately perpendicular to the axis of rotation C of the steering wheel 225, and extends in such a way as to approximately follow the gripping face 233a of the gripping portion 233.

The rear face 206a of the front wall portion 206 is configured in such a way as to be able to come into contact with leading ends (front ends) of the operating lever portions 260L and 260R of the steering wheel 225 in a state housed in the housing portion 203. Specifically, the rear face 206a is configured in such a way as to be able to come into contact over approximately a whole length with leading ends of the operating main bodies 274L and 274R (more specifically still, the front end face 275a of the leading end portions 275L and 275R) of the elevation operation portions 273L and 273R of the lever main bodies 270L and 270R. That is, the front wall portion 206 is disposed in such a way as to cover a front side, which is an operating direction side (a depression direction side) of the operating lever portions 260L and 260R when a depression operation is carried out, and is the lever operation regulating portion 208 (a regulating portion), which regulates a movement of the operating lever portions 260L and 260R by coming into contact with the operating lever portions 260L and 260R.

The vehicle control device D of the present embodiment is configured in such a way that the steering device 220 can be housed in the housing portion 203 formed in the instrument panel 201 when not being used, such as when automatic driving is being carried out. Because of this, a large in-vehicle space is secured when the steering device 220 is not being used, and a driver can be provided with a comfortable in-vehicle space.

Also, movement of the operating lever portions 260L and 260R of the steering wheel 225 is regulated by the lever operation regulating portion 208 in a state in which the steering device 220 is housed in the housing portion 203. Because of this, misoperation of the operating lever portions 260L and 260R is prevented in a state in which the steering device 220 is housed in the housing portion 203. Consequently, according to the vehicle control device D of the present embodiment, the steering device 220 can be housed in the instrument panel 201 in a state in which misoperation is prevented when the steering device 220 is not being used.

Also, the lever operation regulating portion 208 (the front wall portion 206) is disposed in front of the operating lever portions 260L and 260R, which is an operating direction of the operating lever portions 260L and 260R, and regulates movement of the operating lever portions 260L and 260R by the operating lever portions 260L and 260R being brought into contact. This means that a misoperation of the operating lever portions 260L and 260R can easily be prevented simply by the operating lever portions 260L and 260R being brought into contact with the lever operation regulating portion 208 formed in the housing portions 203. When such a point is not taken into consideration, a configuration wherein, for example, a lever operation regulating portion is provided in the steering device 220, and movement of the operating lever portions 260L and 260R is regulated by carrying out a predetermined operation after the steering device 220 is housed in the housing portion 203, may be adopted.

Figure 31:
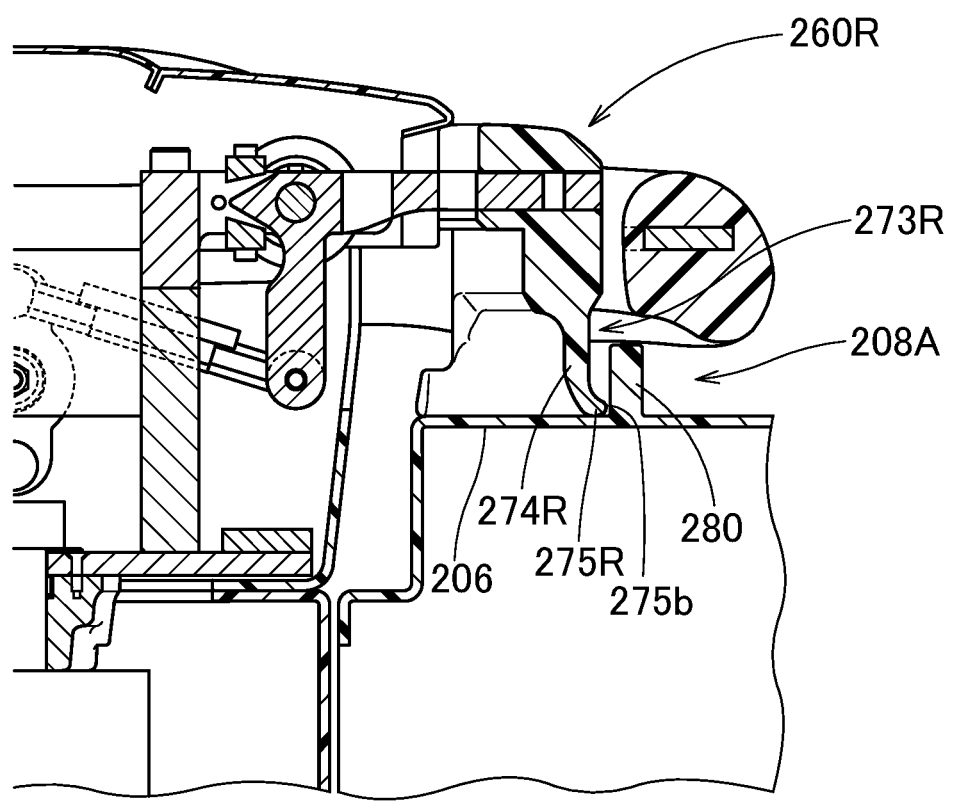
FIG. 31 is a partially enlarged longitudinal sectional view showing a modification of a lever operation regulating portion.

A lever operation regulating portion not being limited to the configuration of the present embodiment, a configuration wherein contact can be made in two or three neighboring directions in a periphery of an operating lever portion may be adopted. For example, a configuration may be such that in addition to the front wall portion 206, an outer wall portion 280 that partially covers a lateral exterior (an outer side) of the operating lever portion 260R (the elevation operation portion 273R) is disposed in such a way as to partially protrude from the front wall portion 206, and a lever operation regulating portion 208A is configured of the front wall portion 206 and the outer wall portion 280 extending from the front wall portion 206, as shown in FIG. 31. The outer wall portion 280 is configured in such a way as to be able to come into contact with an outer side face 275b of the leading end portion 275R of the operating main body 274R of the elevation operation portion 273R.

Figure 32:
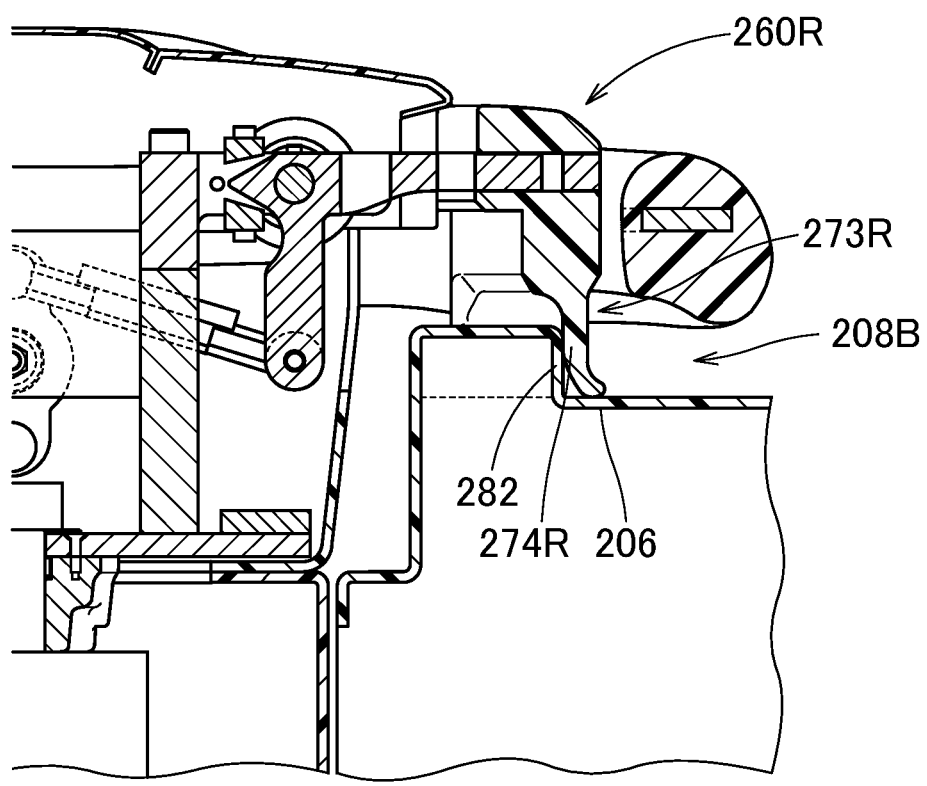
FIG. 32 is a partially enlarged longitudinal sectional view showing a modification of the lever operation regulating portion.

Also, a configuration may be such that in addition to the front wall portion 206, an inner wall portion 282 that partially covers a lateral interior (an inner side) of the operating lever portion 260R (the elevation operation portion 273R) is disposed in such a way as to partially protrude from the front wall portion 206, and a lever operation regulating portion 208B is configured of the front wall portion 206 and the inner wall portion 282 extending from the front wall portion 206, as shown in FIG. 32. The inner wall portion 282 is configured in such a way as to be able to come into contact with an inner side face of the operating main body 274R of the elevation operation portion 273R.

Figure 33:
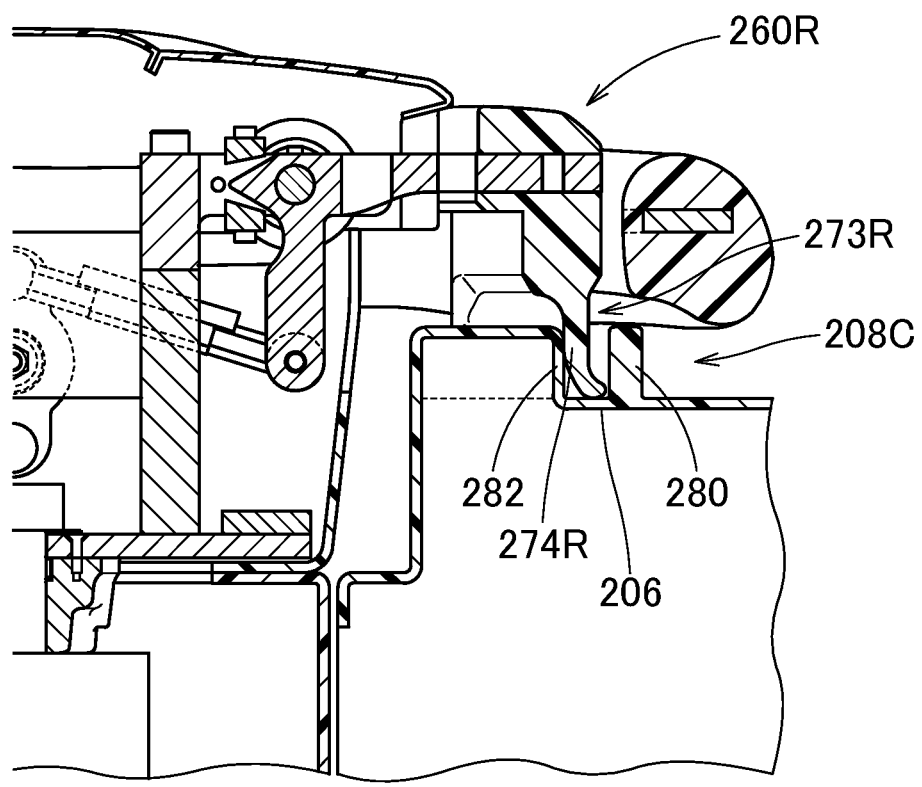
FIG. 33 is a partially enlarged longitudinal sectional view showing a modification of the lever operation regulating portion.

Also, as shown in FIG. 33, a lever operation regulating portion 208C may be configured in such a way as to enclose the elevation operation portion 273R (specifically, the operating main body 274R) of the operating lever portion 260R from three directions using the front wall portion 206, the inner wall portion 282, and the outer wall portion 280.

Note that when adopting a configuration wherein the lever operation regulating portion 208 is brought into contact with only the front face sides of the operating lever portions 260L and 260R, as in the present embodiment, there is no partially protruding region, meaning that a simple design can be adopted. Meanwhile, by adopting a configuration wherein the lever operation regulating portions 208A, 208B, and 208C are brought into contact from two directions or three directions in the periphery of the operating lever portions 260L and 260R, as in the modifications shown in FIGS. 31 to 33, movement of the operating lever portions 260L and 260R when housed can be more accurately regulated.

Figure 34A:
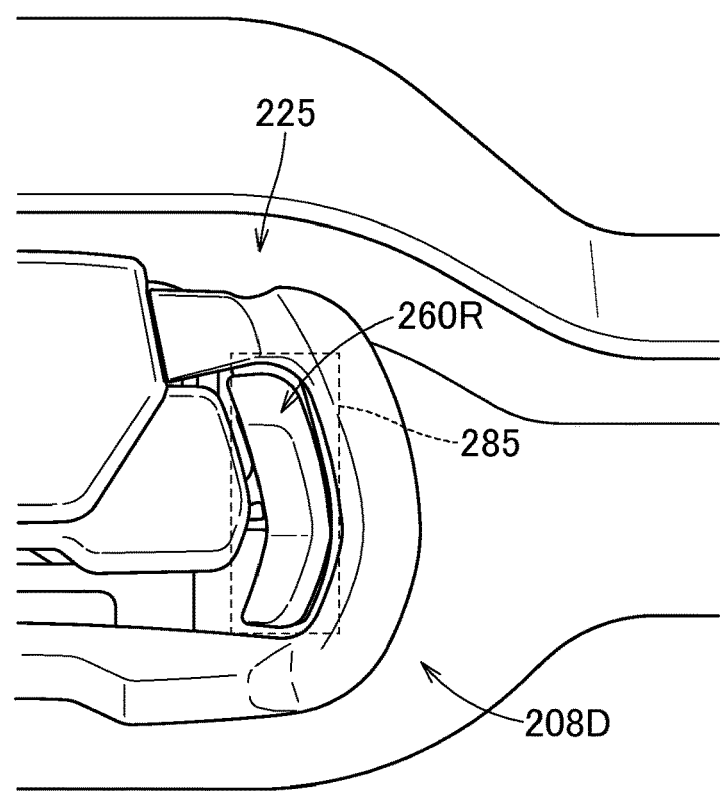
FIGS. 34A and 34B are a partially enlarged plan view and a partially enlarged longitudinal sectional view showing a modification of the lever operation regulating portion.
Figure 34B:
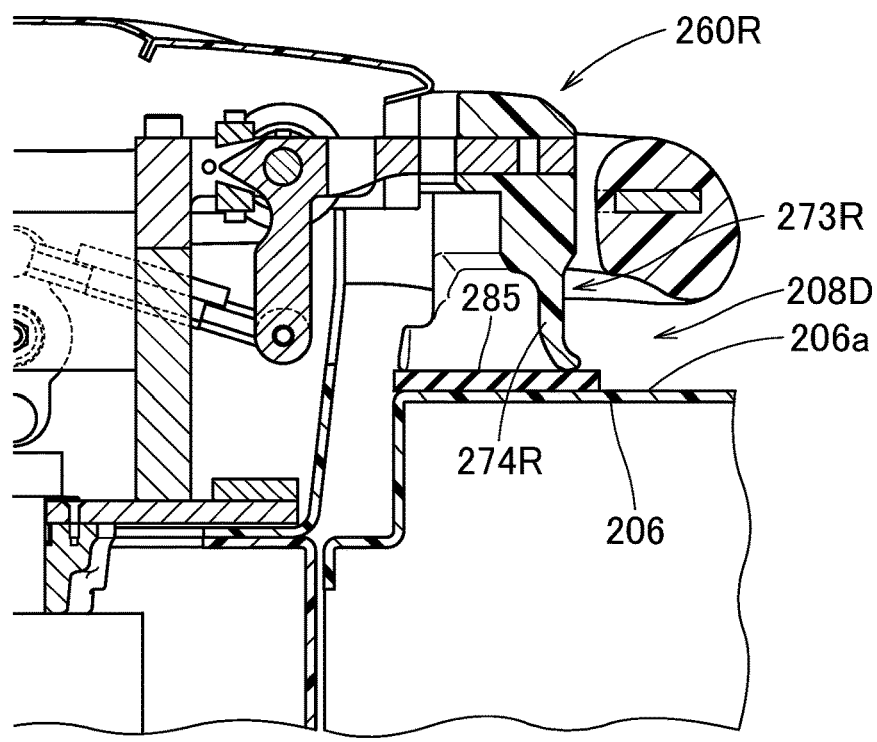

Also, as shown in FIGS. 34A and 34B, a configuration may be such that a lever operation regulating portion 208D includes a buffering member 285 that can restrict direct contact with the operating lever portion 260R on the rear face 206a on the operating lever portion 260R side of the front wall portion 206. Specifically, the buffering member 285 (an elastic body) is formed of a sheet body formed of a soft synthetic resin or a rubber elastic body, and is configured in such a way as to cover approximately a whole of a region in which the operating lever portion 260R is disposed when seen from the rear.

According to this kind of configuration, the operating lever portion 260R (the lever main body 270R) comes into contact with the lever operation regulating portion 208D (the housing portion 203) across the buffering member 285 rather than coming into contact directly, because of which an occurrence of an abnormal noise or the like is restricted. Also, even when a gap occurs between the operating lever portion 260R and the lever operation regulating portion 208D due to an assembly error or the like, the gap can be filled with the buffering member 285. The buffering member 285 is preferably disposed over a whole contact region of the operating lever portions 260R and 260L in the housing portion 203. That is, when adopting a configuration that includes an inner wall portion or an outer wall portion, as heretofore described, the buffering member 285 is preferably disposed on an operating lever portion side surface of the inner wall portion or the outer wall portion.

A configuration wherein the steering wheel 225 includes the gripping portion 233 of an approximate quadrilateral ring form, and includes the operating lever portions 260L and 260R, which can rotate in such a way as to intersect the gripping face 233a of the gripping portion 233, has been described in the present embodiment. However, a form of the steering wheel 225 of the present disclosure is not limited to this form. For example, an operating lever portion that rotates (moves to up-down direction sides) in such a way as to approximately follow a gripping face of a gripping portion may be provided. In this case, the lever operation regulating portion 208 is configured in such a way as to be able to come into contact with an upper side and a lower side of the operating lever portion. Also, a form of the gripping portion 233 is not limited to a ring form.

What is claimed is:

1. A steering wheel mounted in a vehicle, comprising:
   a first gripping portion configured to be gripped by a driver;
   a first contact detecting portion configured to detect contact by the driver with the first gripping portion;
   a first operating portion that is disposed in a vicinity of the first gripping portion and is configured to be operated by the driver in order to cause the vehicle to accelerate or decelerate;
   a first operation detecting portion that detects that the first operating portion has been operated;
   a second gripping portion that is disposed in a position differing from that of the first gripping portion and is configured to be gripped by the driver;
   a second contact detecting portion configured to detect contact by the driver with the second gripping portion;
   a second operating portion that is disposed in a vicinity of the second gripping portion and is configured to be operated by the driver in order to cause the vehicle to accelerate or decelerate;
   a second operation detecting portion that detects that the second operating portion has been operated; and
   a control unit configured to execute an acceleration control or a deceleration control of the vehicle based on results of detections by the first contact detecting portion, the second contact detecting portion, the first operation detecting portion, and the second operation detecting portion,
   wherein the control unit is configured not to execute the acceleration control or the deceleration control of the vehicle based on an operation of the first operating portion when the first contact detecting portion does not detect contact by the driver with the first gripping portion, and
   wherein the control unit is configured not to execute the acceleration control or the deceleration control of the vehicle based on an operation of the second operating portion when the second contact detecting portion does not detect contact by the driver with the second gripping portion.

2. The steering wheel according to claim 1, wherein the control unit is configured to execute the acceleration control or the deceleration control of the vehicle based on an operation of the first operating portion when the first contact detecting portion detects contact by the driver with the first gripping portion, and is configured to execute the acceleration control or the deceleration control of the vehicle based on an operation of the second operating portion when the second contact detecting portion detects contact by the driver with the second gripping portion.

3. The steering wheel according to claim 2, wherein the control unit is configured to execute the acceleration control or the deceleration control of the vehicle in accordance with an operation amount of the first operating portion when the first contact detecting portion detects contact by the driver with the first gripping portion, and is configured to execute the acceleration control or the deceleration control of the vehicle in accordance with an operation amount of the second operating portion when the second contact detecting portion detects contact by the driver with the second gripping portion.

4. A vehicle control device mounted in a vehicle, comprising:
   a steering wheel including
   a first gripping portion configured to be gripped by a driver,
   a first contact detecting portion configured to detect contact by the driver with the first gripping portion,
   a first operating portion that is disposed in a vicinity of the first gripping portion and is configured to be operated by the driver in order to cause the vehicle to accelerate or decelerate,
   a first operation detecting portion that detects that the first operating portion has been operated,
   a second gripping portion that is disposed in a position differing from that of the first gripping portion and is configured to be gripped by the driver,
   a second contact detecting portion configured to detect contact by the driver with the second gripping portion,
   a second operating portion that is disposed in a vicinity of the second gripping portion and is configured to be operated by the driver in order to cause the vehicle to accelerate or decelerate, and
   a second operation detecting portion that detects that the second operating portion has been operated; and
   a control unit configured to execute an acceleration control or a deceleration control of the vehicle based on results of detections by the first contact detecting portion, the second contact detecting portion, the first operation detecting portion, and the second operation detecting portion,
   wherein the control unit is configured not to execute the acceleration control or the deceleration control of the vehicle based on an operation of the first operating portion when the first contact detecting portion does not detect contact by the driver with the first gripping portion, and
   wherein the control unit is configured not to execute the acceleration control or the deceleration control of the vehicle based on an operation of the second operating portion when the second contact detecting portion does not detect contact by the driver with the second gripping portion.

5. The vehicle control device according to claim 4, wherein
the control unit is configured to execute the acceleration control or the deceleration control of the vehicle based on an operation of the first operating portion when the first contact detecting portion detects contact by the driver with the first gripping portion, and is configured to execute the acceleration control or the deceleration control of the vehicle based on an operation of the second operating portion when the second contact detecting portion detects contact by the driver with the second gripping portion.

6. The vehicle control device according to claim 5, wherein
the control unit is configured to execute the acceleration control or the deceleration control of the vehicle in accordance with an operation amount of the first operating portion when the first contact detecting portion detects contact by the driver with the first gripping portion, and is configured to execute the acceleration control or the deceleration control of the vehicle in accordance with an operation amount of the second operating portion when the second contact detecting portion detects contact by the driver with the second gripping portion.

* * * * *